(12) United States Patent
Gilliam et al.

(10) Patent No.: US 11,377,363 B2
(45) Date of Patent: *Jul. 5, 2022

(54) METHODS AND SYSTEMS FOR FORMING VATERITE FROM CALCINED LIMESTONE USING ELECTRIC KILN

(71) Applicant: Arelac, Inc., San Jose, CA (US)

(72) Inventors: Ryan J Gilliam, San Jose, CA (US); Michael Joseph Weiss, Los Gatos, CA (US)

(73) Assignee: Arelac, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/363,537

(22) Filed: Jun. 30, 2021

(65) Prior Publication Data

US 2021/0403335 A1    Dec. 30, 2021

Related U.S. Application Data

(60) Provisional application No. 63/046,239, filed on Jun. 30, 2020.

(51) Int. Cl.
*C01F 11/18* (2006.01)
*C01F 11/06* (2006.01)

(52) U.S. Cl.
CPC ............. *C01F 11/18* (2013.01); *C01F 11/06* (2013.01)

(58) Field of Classification Search
CPC ...................................................... C01F 11/18
See application file for complete search history.

(56) References Cited

U.S. PATENT DOCUMENTS

| | | | |
|---|---|---|---|
| 4,108,752 A | 8/1978 | Pohto et al. | |
| 4,111,779 A | 9/1978 | Seko et al. | |
| 4,623,433 A | 11/1986 | Streichenberger | |
| 4,643,818 A | 2/1987 | Seko et al. | |
| 5,275,651 A | 1/1994 | Minayoshi et al. | |
| 5,290,353 A | 3/1994 | Goffin et al. | |
| 5,376,343 A | 12/1994 | Fouche | |
| 5,494,651 A | 2/1996 | Minayoshi et al. | |
| 5,792,440 A | 8/1998 | Huege | |
| 5,846,500 A | 12/1998 | Bunger et al. | |
| 5,997,833 A | 12/1999 | Bunger et al. | |
| 6,132,696 A | 10/2000 | Porter et al. | |
| 6,251,356 B1 | 6/2001 | Mathur | |
| 6,310,129 B1 | 10/2001 | Lilly et al. | |
| 7,735,274 B2 | 6/2010 | Constantz et al. | |
| 7,744,761 B2 | 6/2010 | Constantz et al. | |
| 7,749,476 B2 | 7/2010 | Constantz et al. | |
| 7,753,618 B2 | 7/2010 | Constantz et al. | |
| 7,754,169 B2 | 7/2010 | Constantz et al. | |
| 7,771,684 B2 | 8/2010 | Constantz et al. | |
| 7,790,012 B2 | 9/2010 | Kirk et al. | |
| 7,815,880 B2 | 10/2010 | Constantz et al. | |
| 7,829,053 B2 | 11/2010 | Constantz et al. | |
| 7,875,163 B2 | 1/2011 | Gilliam et al. | |
| 7,887,694 B2 | 2/2011 | Constantz et al. | |
| 7,906,028 B2 | 3/2011 | Constantz et al. | |
| 7,914,685 B2 | 3/2011 | Constantz et al. | |
| 7,922,809 B1 | 4/2011 | Constantz et al. | |
| 7,931,809 B2 | 4/2011 | Constantz et al. | |
| 7,939,336 B2 | 5/2011 | Constantz et al. | |
| 7,966,250 B2 | 6/2011 | Constantz et al. | |
| 7,993,500 B2 | 8/2011 | Gilliam et al. | |
| 7,993,511 B2 | 8/2011 | Gilliam et al. | |
| 8,006,446 B2 | 8/2011 | Constantz et al. | |
| 8,062,418 B2 | 11/2011 | Constantz et al. | |
| 8,114,214 B2 | 2/2012 | Constantz et al. | |
| 8,137,455 B1 | 3/2012 | Constantz et al. | |
| 8,906,156 B2 | 12/2014 | Constantz et al. | |
| 8,992,875 B2 | 3/2015 | Tavakkoli et al. | |
| 9,725,330 B2 | 8/2017 | Tavakkoli et al. | |
| 9,902,652 B2 | 2/2018 | Devenney et al. | |
| 2001/0033820 A1 | 10/2001 | Yaniv | |
| 2005/0158226 A1 | 7/2005 | Misske et al. | |
| 2006/0067869 A1 | 3/2006 | De et al. | |

(Continued)

FOREIGN PATENT DOCUMENTS

| | | |
|---|---|---|
| CN | 1053642 C | 6/2000 |
| CN | 1056591 C | 9/2000 |

(Continued)

OTHER PUBLICATIONS

Andersson, et al. High power diode laser cladding. Fabricating and Metalworking. Mar. 2014; 24-26.
Bensted. Developments with oilwell cements. In Structure and Performance of Cements. 2nd ed. Bensted and Barnes. 2002; 237-525.
Cardoso, et al. Carbide lime and industrial hydrated lime characterization. Powder Technology. 2009; 195:143-149.
Chen, et al. Calcium carbonate phase transformations during the carbonation reaction of calcium heavy alkylbenzene sulfonate overbased nanodetergents preparation. Journal of Colloid and Interface Science. 2011; 359:56-67.

(Continued)

*Primary Examiner* — Stuart L Hendrickson
(74) *Attorney, Agent, or Firm* — Arelac, Inc.; Vandana Bansal

(57) ABSTRACT

Provided herein are zero carbon dioxide ($CO_2$) emission processes and systems to carry out the processes, comprising a) calcining limestone in a cement plant in an electric kiln to form a mixture comprising calcium oxide and a first gaseous stream comprising clean carbon dioxide, wherein the clean carbon dioxide comprises no gaseous or non-gaseous components from combustion of fuel; b) treating the mixture comprising calcium oxide with a N-containing salt solution under one or more dissolution conditions to produce a first aqueous solution comprising calcium salt; and c) contacting the first aqueous solution with the first gaseous stream comprising clean carbon dioxide under one or more precipitation conditions to produce a precipitation material comprising vaterite, aragonite, calcite, or combinations thereof.

18 Claims, 5 Drawing Sheets

(56) References Cited

U.S. PATENT DOCUMENTS

| | | |
|---|---|---|
| 2008/0245012 A1 | 10/2008 | Boisvert et al. |
| 2009/0001020 A1 | 1/2009 | Constantz et al. |
| 2009/0020044 A1 | 1/2009 | Constantz et al. |
| 2009/0169452 A1 | 7/2009 | Constantz et al. |
| 2009/0202410 A1 | 8/2009 | Kawatra et al. |
| 2009/0301352 A1 | 12/2009 | Constantz et al. |
| 2010/0000444 A1 | 1/2010 | Constantz et al. |
| 2010/0024686 A1 | 2/2010 | Constantz et al. |
| 2010/0051859 A1 | 3/2010 | House et al. |
| 2010/0063902 A1 | 3/2010 | Constantz et al. |
| 2010/0077691 A1 | 4/2010 | Constantz et al. |
| 2010/0077922 A1 | 4/2010 | Constantz et al. |
| 2010/0083880 A1 | 4/2010 | Constantz et al. |
| 2010/0084280 A1 | 4/2010 | Gilliam et al. |
| 2010/0093581 A1 | 4/2010 | Winston et al. |
| 2010/0108537 A1 | 5/2010 | Perego et al. |
| 2010/0111810 A1 | 5/2010 | Constantz et al. |
| 2010/0116683 A1 | 5/2010 | Gilliam et al. |
| 2010/0132556 A1 | 6/2010 | Constantz et al. |
| 2010/0132591 A1 | 6/2010 | Constantz et al. |
| 2010/0135865 A1 | 6/2010 | Constantz et al. |
| 2010/0135882 A1 | 6/2010 | Constantz et al. |
| 2010/0140103 A1 | 6/2010 | Gilliam et al. |
| 2010/0144521 A1 | 6/2010 | Constantz et al. |
| 2010/0150802 A1 | 6/2010 | Gilliam et al. |
| 2010/0154679 A1 | 6/2010 | Constantz et al. |
| 2010/0155258 A1 | 6/2010 | Kirk et al. |
| 2010/0158786 A1 | 6/2010 | Constantz et al. |
| 2010/0196104 A1 | 8/2010 | Constantz et al. |
| 2010/0200419 A1 | 8/2010 | Gilliam et al. |
| 2010/0219373 A1 | 9/2010 | Seeker et al. |
| 2010/0224503 A1 | 9/2010 | Kirk et al. |
| 2010/0229725 A1 | 9/2010 | Farsad et al. |
| 2010/0230293 A1 | 9/2010 | Gilliam et al. |
| 2010/0230830 A1 | 9/2010 | Farsad et al. |
| 2010/0236242 A1 | 9/2010 | Farsad et al. |
| 2010/0239467 A1 | 9/2010 | Constantz et al. |
| 2010/0239487 A1 | 9/2010 | Constantz et al. |
| 2010/0247410 A1 | 9/2010 | Constantz et al. |
| 2010/0258035 A1 | 10/2010 | Constantz et al. |
| 2010/0276299 A1 | 11/2010 | Kelly et al. |
| 2010/0290967 A1 | 11/2010 | Detournay et al. |
| 2010/0313793 A1 | 12/2010 | Constantz et al. |
| 2010/0313794 A1 | 12/2010 | Constantz et al. |
| 2010/0319586 A1 | 12/2010 | Blount et al. |
| 2010/0326328 A1 | 12/2010 | Constantz et al. |
| 2011/0000633 A1 | 1/2011 | Kukkamaeki et al. |
| 2011/0030586 A1 | 2/2011 | Constantz et al. |
| 2011/0030957 A1 | 2/2011 | Constantz et al. |
| 2011/0033239 A1 | 2/2011 | Constantz et al. |
| 2011/0035154 A1 | 2/2011 | Kendall et al. |
| 2011/0036728 A1 | 2/2011 | Farsad |
| 2011/0038774 A1 | 2/2011 | Zhong |
| 2011/0042230 A1 | 2/2011 | Gilliam et al. |
| 2011/0054084 A1 | 3/2011 | Constantz et al. |
| 2011/0059000 A1 | 3/2011 | Constantz et al. |
| 2011/0067600 A1 | 3/2011 | Constantz et al. |
| 2011/0067603 A1 | 3/2011 | Constantz et al. |
| 2011/0067605 A1 | 3/2011 | Constantz et al. |
| 2011/0071309 A1 | 3/2011 | Constantz et al. |
| 2011/0076587 A1 | 3/2011 | Wang et al. |
| 2011/0079515 A1 | 4/2011 | Gilliam et al. |
| 2011/0083968 A1 | 4/2011 | Gilliam et al. |
| 2011/0091366 A1 | 4/2011 | Kendall et al. |
| 2011/0091955 A1 | 4/2011 | Constantz et al. |
| 2011/0094159 A1 | 4/2011 | Moller |
| 2011/0132234 A1 | 6/2011 | Constantz et al. |
| 2011/0139628 A1 | 6/2011 | Teir et al. |
| 2011/0147227 A1 | 6/2011 | Gilliam et al. |
| 2011/0203489 A1 | 8/2011 | Constantz et al. |
| 2011/0226989 A9 | 9/2011 | Seeker et al. |
| 2011/0240916 A1 | 10/2011 | Constantz et al. |
| 2011/0247336 A9 | 10/2011 | Farsad et al. |
| 2011/0277474 A1 | 11/2011 | Constantz et al. |
| 2011/0277670 A1 | 11/2011 | Self et al. |
| 2012/0031303 A1 | 2/2012 | Constantz et al. |
| 2012/0082839 A1 | 4/2012 | Ha et al. |
| 2012/0085265 A1 | 4/2012 | Walenta et al. |
| 2012/0121488 A1 | 5/2012 | Comrie |
| 2013/0036948 A1 | 2/2013 | Fernandez et al. |
| 2013/0064752 A1 | 3/2013 | Kim et al. |
| 2013/0078168 A1 | 3/2013 | Kim et al. |
| 2013/0167756 A1 | 7/2013 | Chen et al. |
| 2013/0256939 A1 | 10/2013 | Devenney et al. |
| 2013/0336859 A1 | 12/2013 | Tavakkoli et al. |
| 2015/0183654 A1 | 7/2015 | Tavakkoli et al. |
| 2019/0275485 A1 | 9/2019 | Sceats et al. |
| 2020/0361819 A1 | 11/2020 | Bittner et al. |
| 2021/0017035 A1 | 1/2021 | Weiss et al. |
| 2021/0261428 A1 | 8/2021 | Weiss et al. |
| 2021/0261429 A1 | 8/2021 | Weiss et al. |

FOREIGN PATENT DOCUMENTS

| | | |
|---|---|---|
| CN | 1058683 C | 11/2000 |
| CN | 1334782 A | 2/2002 |
| CN | 1094900 C | 11/2002 |
| CN | 1112320 C | 6/2003 |
| CN | 1131172 C | 12/2003 |
| CN | 1165487 C | 9/2004 |
| CN | 1167620 C | 9/2004 |
| CN | 1172854 C | 10/2004 |
| CN | 1172855 C | 10/2004 |
| CN | 1195683 C | 4/2005 |
| CN | 1204052 C | 6/2005 |
| CN | 1238254 C | 1/2006 |
| CN | 1253373 C | 4/2006 |
| CN | 1854069 A | 11/2006 |
| CN | 1323947 C | 7/2007 |
| CN | 101020579 A | 8/2007 |
| CN | 100340225 C | 10/2007 |
| CN | 100371249 C | 2/2008 |
| CN | 100390064 C | 5/2008 |
| CN | 100411992 C | 8/2008 |
| CN | 100424015 C | 10/2008 |
| CN | 100447087 C | 12/2008 |
| CN | 100450932 C | 1/2009 |
| CN | 100455515 C | 1/2009 |
| CN | 100545092 C | 9/2009 |
| CN | 100551826 C | 10/2009 |
| CN | 101302026 B | 8/2010 |
| CN | 1429772 B | 12/2010 |
| CN | 101362048 B | 1/2011 |
| CN | 101993104 A | 3/2011 |
| CN | 101293663 B | 5/2011 |
| CN | 101565198 B | 6/2011 |
| CN | 101314478 B | 7/2011 |
| CN | 101668703 B | 10/2011 |
| CN | 101914312 B | 11/2011 |
| CN | 101823744 B | 12/2011 |
| CN | 101823745 B | 12/2011 |
| CN | 101823746 B | 12/2011 |
| CN | 101823747 B | 1/2012 |
| CN | 101160262 B | 2/2012 |
| CN | 101838005 B | 2/2012 |
| CN | 102602973 A | 7/2012 |
| CN | 101331084 B | 8/2012 |
| CN | 101774623 B | 9/2012 |
| CN | 101920983 B | 11/2012 |
| CN | 101913640 B | 12/2012 |
| CN | 102092757 B | 12/2012 |
| CN | 102020878 B | 5/2013 |
| CN | 102295306 B | 5/2013 |
| CN | 103170226 A | 6/2013 |
| CN | 103172100 A | 6/2013 |
| CN | 102267713 B | 7/2013 |
| CN | 102531017 B | 8/2013 |
| CN | 101218308 B | 11/2013 |
| CN | 102583483 B | 11/2013 |
| CN | 102674425 B | 12/2013 |
| CN | 102124061 B | 4/2014 |
| CN | 102482111 B | 9/2014 |
| CN | 102923749 B | 11/2014 |
| CN | 103183370 B | 11/2014 |

(56) References Cited

FOREIGN PATENT DOCUMENTS

| | | |
|---|---|---|
| CN | 103466678 B | 11/2014 |
| EP | 0558275 A1 | 9/1993 |
| EP | 2253600 A1 | 11/2010 |
| EP | 2447213 A1 | 5/2012 |
| EP | 2828434 A1 | 1/2015 |
| GB | 257084 A | 8/1926 |
| JP | H02302317 A | 12/1990 |
| JP | H08217522 A | 8/1996 |
| WO | WO-9713723 A1 | 4/1997 |
| WO | WO-9918151 A1 | 4/1999 |
| WO | WO-0034182 A1 | 6/2000 |
| WO | WO-2008018928 A2 | 2/2008 |
| WO | WO-2008148055 A1 | 12/2008 |
| WO | WO-2009006295 A2 | 1/2009 |
| WO | WO-2008018928 A3 | 3/2009 |
| WO | WO-2009086460 A1 | 7/2009 |
| WO | WO-2009006295 A3 | 12/2009 |
| WO | WO-2009146436 A1 | 12/2009 |
| WO | WO-2009155378 A1 | 12/2009 |
| WO | WO-2010006242 A1 | 1/2010 |
| WO | WO-2010008896 A1 | 1/2010 |
| WO | WO-2010009273 A1 | 1/2010 |
| WO | WO-2010030826 A1 | 3/2010 |
| WO | WO-2010039903 A1 | 4/2010 |
| WO | WO-2010039909 A1 | 4/2010 |
| WO | WO-2010048457 A1 | 4/2010 |
| WO | WO-2010051458 A1 | 5/2010 |
| WO | WO-2010055152 A1 | 5/2010 |
| WO | WO-2010068924 A1 | 6/2010 |
| WO | WO-2010074686 A1 | 7/2010 |
| WO | WO-2010074687 A1 | 7/2010 |
| WO | WO-2010087823 A1 | 8/2010 |
| WO | WO-2010091029 A1 | 8/2010 |
| WO | WO-2010093713 A1 | 8/2010 |
| WO | WO-2010093716 A1 | 8/2010 |
| WO | WO-2010101953 A1 | 9/2010 |
| WO | WO-2010104989 A1 | 9/2010 |
| WO | WO-2010132863 A1 | 11/2010 |
| WO | WO-2010136744 A1 | 12/2010 |
| WO | WO-2011008223 A1 | 1/2011 |
| WO | WO-2011017609 A1 | 2/2011 |
| WO | WO-2011038076 A1 | 3/2011 |
| WO | WO-2011038936 A1 | 4/2011 |
| WO | WO-2011049996 A1 | 4/2011 |
| WO | WO-2011066293 A1 | 6/2011 |
| WO | WO-2011075680 A1 | 6/2011 |
| WO | WO-2011081681 A1 | 7/2011 |
| WO | WO-2011097468 A2 | 8/2011 |
| WO | WO-2011102868 A1 | 8/2011 |
| WO | WO-2011121065 A1 | 10/2011 |
| WO | WO-2021016200 A1 | 1/2021 |
| WO | WO-2022006230 A1 | 1/2022 |

OTHER PUBLICATIONS

Constantz, B. "The Risk of Implementing New Regulations on Game-Changing Technology: Sequestering CO2 in the Built Environment" AGU, Sep. 2009; 90(22), Jt. Assem, Suppl., Abstract.

Eloneva, et al. Preliminary assessment of a method utilizing carbon dioxide and steelmaking slags to produce precipitated calcium carbonate. Applied Energy. 2012; 90:329-334.

Eloneva, et al. Reduction of CO2 Emissions from Steel Plants by Using Steelmaking Slags for Production of Marketable Calcium Carbonate. Steel Research Int. 2009; 80(6):415-421.

European search report and opinion dated Jul. 29, 2015 for EP Application No. 13769503.

Han, et al. Effect of flow rate and CO2 content on the phase and morphology of CaCO3 prepared by bubbling method. Journal of Crystal Growth. 2005; 276:541-548.

Han, et al. —Influence of initial CaCl2 concentration on the phase and morphology of CaCO3 prepared by carbonation. J. Mater. Sci. 2006; 41:4663-4667.

Hargis, et al., Calcium carbonate cement: A carbon capture, utilization, and storage (CCUS) technique. Materials 2021; 14(2709) 1-12 Pages.

Huan, et al. Study on pretreatment on the preparation of nanosized calcium carbonate with calcium carbide residue. Nanoscience and Nanotechnology. 2011; 8(1):70-73. (in Chinese with English abstract).

International search report and written opinion dated Jun. 3, 2013 for PCT/US2013/031670.

International search report and written opinion dated Jul. 9, 2015 for PCT/US2015/027272.

Kantiranis. Hydration of high-calcium quicklime with methanol-water mixtures. Construction and Building Materials. 2003; 17:91-96.

Kuntze. Gypsum: connecting science and technology. ASTM International. ASTM stock No. MNL67. Ch 7. 2009.

Matila, et al. Production of precipitated calcium carbonate from steel converter slag and other calcium-containing industrial wastes and residues. Advances in inorganic chemistry. 2014; vol. 66, Ch. 10. 347-384.

Matila, et al. Reduced Limestone Consumption in Steel Manufacturing Using a pseudo-catalytic calcium lixiviant. Energy Fuels. 2014; 28:4068-4074.

Mattila, et al. Chemical kinetics modeling and process parameter sensitivity for precipitated calcium carbonate production from steelmaking slags. Chemical Engineering Journal. 2012; 192:77-89.

Nippon Slag Association. "Chemical characteristics of iron and steel slag." [online] Oct. 28, 2011. Retrieved from the internet <http://www.slg.jp/e/slag/character.html>.

Notice of allowance dated Nov. 16, 2017 for U.S. Appl. No. 14/694,348.

Office action dated Jan. 29, 2016 for U.S. Appl. No. 13/804,439.
Office action dated May 29, 2015 for U.S. Appl. No. 13/804,439.
Office action dated Aug. 29, 2017 for U.S. Appl. No. 14/694,348.
Office action dated Sep. 29, 2015 for U.S. Appl. No. 13/804,439.
Office action dated Oct. 11, 2017 for U.S. Appl. No. 14/694,348.

Ostwald, W. Zeitschrift fur Physikalische Chemie, Feb. 1897: 289-330.

PCT/US2020/042810 International Search Report and Written Opinion dated Oct. 27, 2020.

PCT/US2021/019585 International Search Report and Written Opinion dated May 6, 2021.

PCT/US2021/019597 International Search Report and Written Opinion dated May 6, 2021.

PCT/US2021/039825 International Search Report and Written Opinion dated Oct. 7, 2021.

Sarkar, et al. Synthesis of All Crystalline Phases of Anhydrous Calcium Carbonate. Crystal Growth and Design. May 5, 2010; 10(5):2129-2135.

Sun, et al. Indirect CO2 mineral sequestration by steelmaking slag with NH4Cl as leaching solution. Chemical Engineering Journal. 2011; 173:437-445.

Sunagawa, et al. Strontium and aragonite-calcite precipitation. Journal of Mineralogical and Petrological Sciences. Jan. 1, 2007; 102(3):174-181.

Vucak, et al. A study of carbon dioxide absorption into aqueous monoethanolamine solution containing calcium nitrate in the gas-liquid reactive precipitation of calium carbonate. Chemical Engineering Journal. 2002; 87:171-179.

Wikipedia 'Enthalpy change of solution' Dec. 9, 2019 (Dec. 9, 2019) retrieved from 42https://en .wikipedia.org/w/index.php?title=Enthalpy_change_of_solution&oldid=929951731 entirety of document especially p. 2 para 3; p. 3 Table 2.

Wikipedia 'Calcination' Nov. 18, 2018 (Nov. 18, 2018) retrieved from https://en.wikipedia.org/w/index.php?title=Calcination&oldid=869437260 entirety of document especially p. 1 para 2.

Wikipedia 'Lime kiln' Nov. 27, 2019 (Nov. 27, 2019) retrieved from https://en.wikipedia.org/w/index.php?tille=Lime_kiln&oldid=928184598#Rotary_kilns entirety of document especially p. 8 para 1.

Yamaguchi, et al. Formation of vaterite from Calcium Methoxide with aqueous sodium carbonate solution. Bulletin of the Chemical Society of Japan. 1979; 52(4):1217-1218.

Zhang, et al. Preparation of CaCO3 superfine powder by calcium carbide residue. Energy Procedia. 2012; 17:1635-1640.

(56) References Cited

OTHER PUBLICATIONS

Zhao, et al. Post-combustion CO2 capture by aqueous ammonia: A state-of-the-art review. International Journal of Greenhouse gas control. 2012; 9:355-371.

METHODS AND SYSTEMS FOR FORMING VATERITE FROM CALCINED LIMESTONE USING ELECTRIC KILN

CROSS-REFERENCE TO RELATED APPLICATION

This application claims benefit of U.S. Provisional Application No. 63/046,239, filed Jun. 30, 2020, which is incorporated herein by reference in its entirety in the present disclosure.

BACKGROUND

Carbon dioxide ($CO_2$) emissions have been identified as a major contributor to the phenomenon of global warming. $CO_2$ is a by-product of combustion and it creates operational, economic, and environmental problems. It is known that elevated atmospheric concentrations of $CO_2$ and other greenhouse gases facilitate greater storage of heat within the atmosphere leading to enhanced surface temperatures and rapid climate change. In addition, elevated levels of $CO_2$ in the atmosphere may also further acidify the world's oceans due to the dissolution of $CO_2$ and formation of carbonic acid. The impact of climate change and ocean acidification may likely be economically expensive and environmentally hazardous if not timely handled. Reducing potential risks of climate change requires sequestration and avoidance of $CO_2$ from various anthropogenic processes.

SUMMARY

Provided herein are processes and systems that relate to using electric kilns to produce clean $CO_2$ devoid of pollutants that are emitted from the combustion of fuel, such as e.g. fossil fuel; and the sequestration of the clean $CO_2$ into commercially useful cementitious products or disposal underground.

In one aspect, there is provided a zero carbon dioxide ($CO_2$) emission process, comprising: a) calcining limestone in a cement plant in an electric kiln to form a mixture comprising calcium oxide and a first gaseous stream comprising clean carbon dioxide, wherein the clean carbon dioxide or the first gaseous stream comprises no gaseous or non-gaseous components from combustion of fuel; b) treating the mixture comprising calcium oxide with a N-containing salt solution under one or more dissolution conditions to produce a first aqueous solution comprising calcium salt; and c) contacting the first aqueous solution with the first gaseous stream comprising clean carbon dioxide under one or more precipitation conditions to produce a precipitation material comprising vaterite, aragonite, calcite, or combinations thereof.

In some embodiments of the foregoing aspect, the calcining limestone in the electric kiln produces less than 20% of at least one component selected from the group consisting of SOx; thermal NOx; carbon monoxide; metal; volatile organic matter; particulate matter; and combinations thereof. In some embodiments of the foregoing aspect and embodiments, the first gaseous stream comprises less than 20% of at least one component selected from the group consisting of SOx; thermal NOx; carbon monoxide; metal; volatile organic matter; particulate matter; and combinations thereof, thereby comprising clean carbon dioxide. In some embodiments of the foregoing aspect and embodiments, the first gaseous stream comprises less than 5% of at least one component selected from the group consisting of SOx; thermal NOx; carbon monoxide; metal; volatile organic matter; particulate matter; and combinations thereof, thereby comprising clean carbon dioxide.

In some embodiments of the foregoing aspect and embodiments, the first gaseous stream comprises more than 10 vol % or between 10-100 vol % or between 20-95 vol % or between 20-99 vol % or between 25-100 vol % clean carbon dioxide. In some embodiments of the foregoing aspect and embodiments, the first gaseous stream comprises between about 20-95 vol % clean carbon dioxide compared to a process using regular kiln. In some embodiments of the foregoing aspect and embodiments, the regular kiln is a cement kiln or rotary kiln. In some embodiments of the foregoing aspect and embodiments, the first gaseous stream comprising clean carbon dioxide does not need scrubbing or needs a smaller scrubbing vent compared to a process using regular kiln. In some embodiments of the foregoing aspect and embodiments, the first gaseous stream comprising clean carbon dioxide is more than 80% captive compared to a process using regular kiln.

In some embodiments of the foregoing aspect and embodiments, the mixture comprising calcium oxide and/or the first aqueous solution comprising calcium salt, further comprises between 1-40 wt % solids selected from the group consisting of silicate, iron oxide, aluminum oxide, other particulate matter; and combinations thereof. In some embodiments of the foregoing aspect and embodiments, the mixture comprises more than 40 wt % calcium oxide.

In some embodiments of the foregoing aspect and embodiments, the calcium oxide is an underburnt lime, low reactive lime, high reactive lime, or combinations thereof.

In some embodiments of the foregoing aspect and embodiments, the electric kiln is a top-loading electric kiln or a front-loading electric kiln.

In some embodiments of the foregoing aspect and embodiments, the N-containing salt is N-containing inorganic salt, N-containing organic salt, or combination thereof.

In some embodiments of the foregoing aspect and embodiments, the N-containing salt is N-containing inorganic salt. In some embodiments of the foregoing embodiments, the N-containing inorganic salt is selected from the group consisting of ammonium halide, ammonium sulfate, ammonium acetate, ammonium sulfite, ammonium nitrate, ammonium nitrite, and combinations thereof. In some embodiments of the foregoing embodiments, the ammonium halide is ammonium chloride.

In some embodiments of the foregoing aspect and embodiments, the N-containing salt solution is ammonium chloride solution.

In some embodiments of the foregoing aspect and embodiments, the N-containing salt is N-containing organic salt that has N-containing organic compound selected from the group consisting of aliphatic amine, alicyclic amine, heterocyclic amine, and combinations thereof.

In some embodiments of the foregoing aspect and embodiments, the treating step further comprises adding anhydrous ammonia or an aqueous solution of ammonia.

In some embodiments of the foregoing aspect and embodiments, the molar ratio of the N-containing salt: mixture is between about 0.5:1 to 3:1 by weight.

In some embodiments of the foregoing aspect and embodiments, no external source of carbon dioxide and/or ammonia is used and the process is a closed loop process or a zero emission process. In some embodiments of the foregoing aspect and embodiments, the one or more dissolution conditions are selected from the group consisting of temperature between about 20-200° C.; pressure between about 0.5-50 atm; N-containing salt wt % in water between about 0.5-50%; or combinations thereof.

In some embodiments of the foregoing aspect and embodiments, the first aqueous solution further comprises N-containing salt solution.

In some embodiments of the foregoing aspect and embodiments, wherein the treating step further produces a second gaseous stream comprising ammonia and the process further comprises removing and optionally recovering the second gaseous stream comprising ammonia.

In some embodiments of the foregoing aspect and embodiments, the recovering comprises a scrubbing process wherein the scrubbing process comprises scrubbing the second gaseous stream comprising ammonia with hydrochloric acid and water to produce a solution of ammonium chloride.

In some embodiments of the foregoing aspect and embodiments, the process further comprises contacting the first aqueous solution with the first gaseous stream comprising clean carbon dioxide and the second gaseous stream comprising ammonia.

In some embodiments of the foregoing aspect and embodiments, the process further comprises recovering the first gaseous stream comprising clean carbon dioxide and the second gaseous stream comprising ammonia and subjecting the first and the second gaseous streams to a cooling process under one or more cooling conditions to condense a second aqueous solution comprising ammonium bicarbonate, ammonium carbonate, ammonia, or combinations thereof.

In some embodiments of the foregoing aspect and embodiments, the method further comprises treating the first aqueous solution with the second aqueous solution under the one or more precipitation conditions to form the precipitation material.

In one aspect, there is provided a zero carbon dioxide ($CO_2$) emission process, comprising: a) calcining limestone in a cement plant in an electric kiln to form a mixture comprising calcium oxide and a first gaseous stream comprising clean carbon dioxide, wherein the clean carbon dioxide comprises no gaseous or non-gaseous components from combustion of fuel; b) treating the mixture comprising calcium oxide with a N-containing salt solution under one or more dissolution conditions to produce a first aqueous solution comprising calcium salt and a second gaseous stream comprising ammonia; c) recovering the first gaseous stream comprising clean carbon dioxide and the second gaseous stream comprising ammonia and subjecting the first and the second gaseous streams to a cooling process under one or more cooling conditions to condense a second aqueous solution comprising ammonium bicarbonate, ammonium carbonate, ammonia, or combinations thereof; and d) contacting the first aqueous solution comprising calcium salt with the second aqueous solution comprising ammonium bicarbonate, ammonium carbonate, ammonia, or combinations thereof under one or more precipitation conditions to form a precipitation material comprising vaterite, aragonite, calcite, or combinations thereof.

In some embodiments of the foregoing aspect, the first and/or the second gaseous streams further comprise water vapor. In some embodiments of the foregoing aspect and embodiments, the first and/or the second gaseous streams further comprise between about 20-50% water vapor.

In some embodiments of the foregoing aspect and embodiments, the no external water is added to the cooling process.

In some embodiments of the foregoing aspect and embodiments, the one or more cooling conditions comprise temperature between about 0-100° C.; pressure between about 0.5-50 atm; or combination thereof.

In some embodiments of the foregoing aspect and embodiments, the first gaseous stream comprising clean carbon dioxide has faster kinetics in the contacting step to produce the precipitation material compared to a process using regular kiln. In some embodiments of the foregoing aspect and embodiments, the kinetics of the contacting step to produce the precipitation material is more than 5 times faster compared to the process using regular kiln. In some embodiments of the foregoing aspect and embodiments, the faster kinetics of the contacting step results in high yield of the vaterite or more than 80% vaterite. In some embodiments of the foregoing aspect and embodiments, the faster kinetics of the contacting step results in the vaterite with a particle size of between about 0.05-100 microns or between about 0.05-20 microns or between about 0.05-10 microns. In some embodiments of the foregoing aspect and embodiments, the faster kinetics of the contacting step results in the formation of the vaterite with a unimodal distribution of the particles.

In some embodiments of the foregoing aspect and embodiments, the one or more precipitation conditions are selected from the group consisting of pH of the first aqueous solution of between 7-8.5, temperature of the solution between 20-80° C., residence time of between 5-60 minutes, or combinations thereof.

In some embodiments of the foregoing aspect and embodiments, the limestone is obtained from a cement plant which is a wet process plant or a dry process plant and/or is obtained from a rock quarry.

In some embodiments of the foregoing aspect and embodiments, the first aqueous solution further comprises solids. In some embodiments of the foregoing aspect and embodiments, the process further comprises separating the solids from the first aqueous solution after the treatment step by filtration and/or centrifugation. In some embodiments of the foregoing aspect and embodiments, the separated solids are added to the precipitation material as a filler. In some embodiments of the foregoing aspect and embodiments, the separated solids further comprise residual ammonium halide when the N-containing inorganic salt is the ammonium halide. In some embodiments of the foregoing aspect and embodiments, the process further comprises recovering the residual ammonium halide from the solids using a recovery process selected from the group consisting of rinsing, thermal decomposition, pH adjustment, and combinations thereof. In some embodiments of the foregoing aspect and embodiments, the solids are not separated from the first aqueous solution and the first aqueous solution is subjected to the contacting step to produce the precipitation material further comprising the solids. In some embodiments of the foregoing aspect and embodiments, the solids comprise silicates, iron oxides, aluminum oxide, or combinations thereof. In some embodiments of the foregoing aspect and embodiments, the solids are between 1-40 wt % in the aqueous solution, in the precipitation material, or combinations thereof. In some embodiments, the silica in the solids provides supplementary cementitious properties to the precipitation material comprising vaterite. In some embodiments, the silica in the solids provides pozzolanic properties to Ordinary Portland Cement (OPC) when the OPC is mixed with the precipitation material comprising vaterite.

In some embodiments of the foregoing aspect and embodiments, the process further comprises dewatering the precipitation material to separate the precipitation material from supernatant solution. In some embodiments of the foregoing aspect and embodiments, the precipitation material and the supernatant solution comprise residual N-containing inorganic salt. In some embodiments of the foregoing aspect and embodiments, the residual N-containing inorganic salt comprises ammonium halide, ammonium acetate, ammonium sulfate, ammonium sulfite, ammonium hydrosulfide, ammonium thiosulfate, ammonium nitrate, ammonium nitrite, or combinations thereof.

In some embodiments of the foregoing aspect and embodiments, the process further comprises removing and optionally recovering ammonia and/or N-containing inorganic salt from the residual N-containing inorganic salt comprising removing and optionally recovering the residual N-containing inorganic salt from the supernatant aqueous solution and/or removing and optionally recovering the residual N-containing inorganic salt from the precipitation material.

In some embodiments of the foregoing aspect and embodiments, the process further comprises recovering the residual N-containing inorganic salt from the supernatant aqueous solution using recovery process selected from the group consisting of thermal decomposition, pH adjustment, reverse osmosis, multi-stage flash, multi-effect distillation, vapor recompression, distillation, and combinations thereof.

In some embodiments of the foregoing aspect and embodiments, the step of removing and optionally recovering the residual N-containing inorganic salt from the precipitation material comprises heating the precipitation material between about 100-360° C. or between about 150-360° C. or between about 200-360° C. or between about 250-360° C. or between about 300-360° C. or between about 150-200° C. or between about 100-200° C. or between about 200-300° C. to evaporate the N-containing inorganic salt from the precipitation material with optional recovery by condensation of the N-containing inorganic salt. In some embodiments of the foregoing aspect and embodiments, the N-containing inorganic salt is ammonium chloride which evaporates from the precipitation material in a form comprising ammonia gas, hydrogen chloride gas, chlorine gas, or combinations thereof.

In some embodiments of the foregoing aspect and embodiments, the process further comprises recycling the recovered residual ammonia and/or N-containing inorganic salt back to the treating and/or contacting step of the process.

In some embodiments of the foregoing aspect and embodiments, the one or more precipitation conditions are selected from temperature, pH, pressure, ion ratio, precipitation rate, presence of additive, presence of ionic species, concentration of additive and ionic species, stirring, residence time, mixing rate, forms of agitation, presence of seed crystal, catalyst, membrane, or substrate, dewatering, drying, ball milling, and combinations thereof.

In some embodiments of the foregoing aspect and embodiments, the vaterite is stable vaterite or reactive vaterite. In some embodiments of the foregoing aspect and embodiments, the process further comprises adding water to the precipitation material comprising reactive vaterite and transforming the reactive vaterite to aragonite wherein the aragonite sets and hardens to form cement or cementitious product.

In some embodiments of the foregoing aspect and embodiments, the cementitious product is building material, formed building material, and/or artificial marine structure. In some embodiments of the foregoing aspect and embodiments, the cementitious product is a formed building material selected from masonry unit, construction panel, conduit, basin, beam, column, slab, acoustic barrier, insulation material, and combinations thereof.

In one aspect, there are provided product(s) formed by the foregoing process aspect and embodiments.

In one aspect, there is provided a zero carbon dioxide ($CO_2$) emission system, comprising:

(i) a calcining system in a cement plant configured for calcining limestone in an electric kiln to form a mixture comprising calcium oxide and a first gaseous stream comprising clean carbon dioxide, wherein the clean carbon dioxide comprises no gaseous or non-gaseous components from combustion of fuel;

(ii) a treatment reactor operably connected to the calcining system configured for receiving the mixture comprising calcium oxide and configured for dissolving the mixture comprising calcium oxide in a N-containing salt solution under one or more dissolution conditions to produce a first aqueous solution comprising calcium salt; and (iii) a contacting reactor operably connected to the treatment reactor and the calcining system and configured for receiving the first aqueous solution comprising calcium salt and the first gaseous stream comprising clean carbon dioxide, and configured for treating the first aqueous solution comprising calcium salt with the first gaseous stream comprising clean carbon dioxide under one or more precipitation conditions to form a precipitation material comprising vaterite, aragonite, calcite, or combinations thereof.

In some embodiments of the foregoing aspect, the treatment reactor further produces a second gaseous stream comprising ammonia and the contacting reactor is further configured for receiving the second gaseous stream comprising ammonia, and configured for treating the first aqueous solution comprising calcium salt with the first gaseous stream comprising clean carbon dioxide and the second gaseous stream comprising ammonia.

In one aspect, there is provided a zero carbon dioxide ($CO_2$) emission system, comprising:

(i) a calcining system in a cement plant configured for calcining limestone in an electric kiln to form a mixture comprising calcium oxide and a first gaseous stream comprising clean carbon dioxide, wherein the clean carbon dioxide comprises no gaseous or non-gaseous components from combustion of fuel;

(ii) a treatment reactor operably connected to the calcining system configured for receiving the mixture comprising calcium oxide and configured for dissolving the mixture comprising calcium oxide in a N-containing salt solution under one or more dissolution conditions to produce a first aqueous solution comprising calcium salt, and a second gaseous stream comprising ammonia;

(iii) a cooling reactor operably connected to the calcining system and the treatment reactor and configured for receiving the first gaseous stream comprising clean carbon dioxide and the second gaseous stream comprising ammonia, and configured for subjecting the first and the second gaseous streams to a cooling process under one or more cooling conditions to condense a second aqueous solution comprising ammonium bicarbonate, ammonium carbonate, ammonia, or combinations thereof; and (iv) a contacting reactor operably connected to the treatment reactor and the cooling reactor and configured for receiving the first aqueous solution comprising calcium salt and the second aqueous solution comprising ammonium bicarbonate, ammonium carbonate, ammonia, or combinations thereof, and configured for treating the first aqueous solution with the second aqueous solution under one or more precipitation conditions to form a precipitation material comprising vaterite, aragonite, calcite, or combinations thereof.

DRAWINGS

The features of the invention are set forth with particularity in the appended claims. A better understanding of the features and advantages of the invention will be obtained by reference to the following detailed description that sets forth illustrative embodiments, in which the principles of the invention are utilized, and the accompanying drawings of which:

DESCRIPTION

Figure 1:
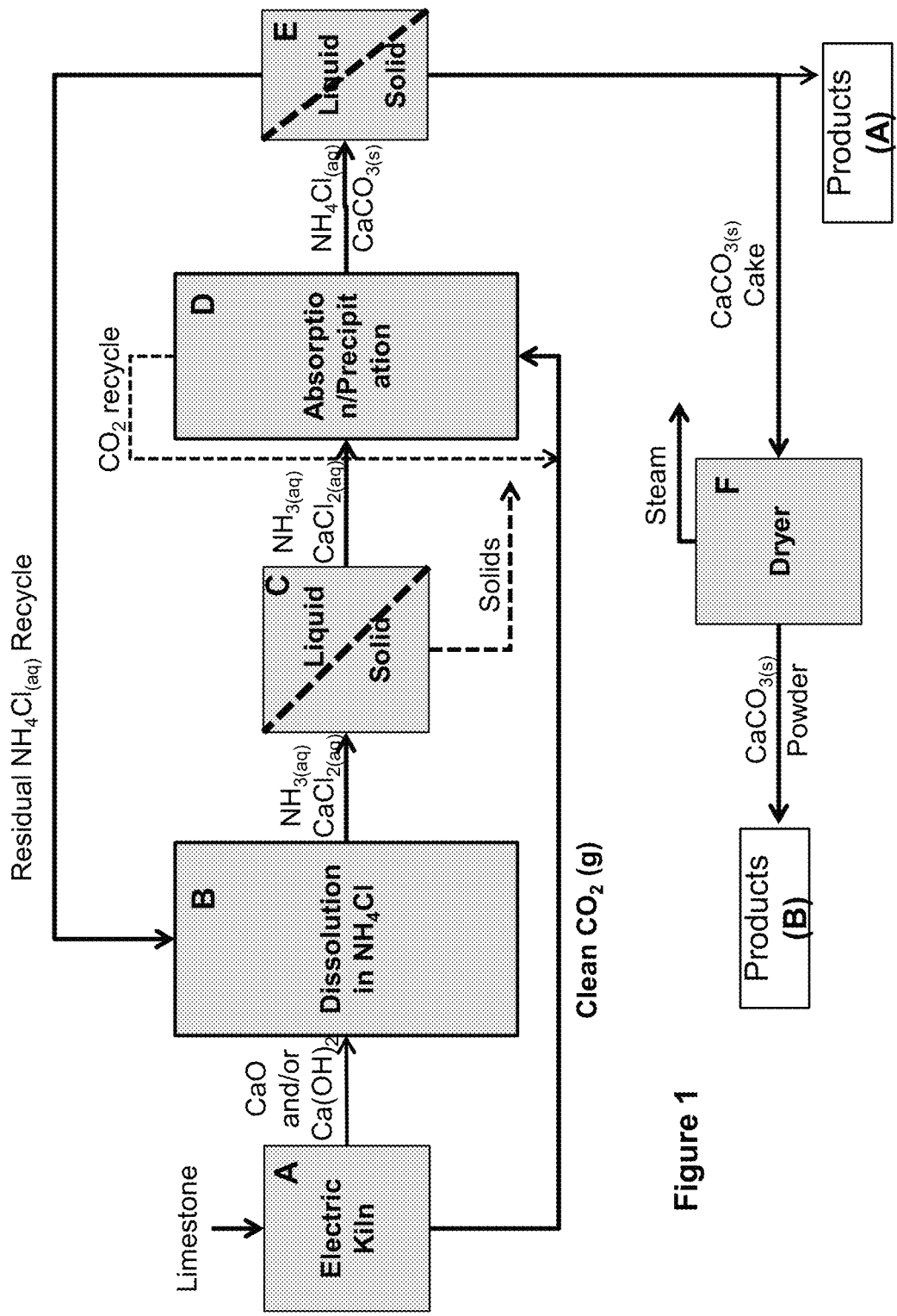
FIG. 1 illustrates some process and system embodiments provided herein.

Provided herein are unique processes and systems that produce calcium carbonate using lime and gas obtained from the calcination of limestone in an electric kiln. The calcium carbonate, formed in the processes and systems provided herein, may be cementitious and can be used to form or supplement cementitious products.

The products obtained from the calcination of the limestone in the electric kiln include calcium oxide (lime or quick lime), optionally calcium hydroxide (slaked lime) and gas such as, but not limited to, clean carbon dioxide. The lime and the gas comprising clean $CO_2$ obtained from the calcination of the limestone in the electric kiln have unique properties that result in unique processes and unique product properties that are beneficial economically as well as environmentally.

In some embodiments, the processes and systems provided herein are a zero emission processes and systems as substantially all the clean $CO_2$ emitted during calcination of the limestone in the electric kiln is utilized in the product formation with no significant $CO_2$ emitted into the atmosphere. Further, the electric kiln may be integrated with the green power such as but not limited to, solar, wind, hydro, nuclear etc. to provide zero emission processes and systems.

In some embodiments, the processes and systems provided herein are a zero emission processes and systems wherein the clean carbon dioxide produced during the calcination is sequestered and stored or is disposed of underground. In some embodiments of the aforementioned embodiment, the clean carbon dioxide is in high concentration and is conducive to be sequestered underground. In some embodiments of the aforementioned embodiment, the clean carbon dioxide is sequestered to a cement plant for capture in the chemical reaction to form calcium carbonate. In some embodiments of the aforementioned embodiment, the lime produced from the calcination in the electric kiln is sent to cement plants for manufacturing cement or for other processes or the lime produced from the calcination in the electric kiln is subjected to the precipitation of the calcium carbonate comprising vaterite, aragonite, and/or calcite, as provided herein. Accordingly, the lime and the clean carbon dioxide produced by the calcination of the limestone in the electric kiln, as provided herein, may be used in the same process to form the calcium carbonate comprising vaterite, aragonite, calcite, or combinations thereof; or the lime and the clean carbon dioxide are decoupled and used separately where the clean carbon dioxide may be sequestered and stored or is disposed of underground and the lime is used in the manufacturing of the cement or other processes.

It will be appreciated that the carbon footprint, amount of energy used, and/or amount of the $CO_2$ produced for sequestering a given amount of the clean $CO_2$ from the electric kiln is minimized in the aforementioned processes where no further processing beyond disposal occurs.

The processes and systems provided herein that use the electric kiln offer several advantages, including but not limited to, the clean or pure carbon dioxide in the gaseous stream (no pollutants or less pollutants or less than 5% pollutants), high concentration of the clean carbon dioxide (more than 20% or between 20-99% $CO_2$ in the gas stream compared to the calcination of the limestone using the regular kiln that may produce around 20% or less than 20% $CO_2$ and the remaining may be pollutants), no impurities in the clean $CO_2$ from burning of coal (such as in the regular kiln) resulting in cleaner precipitate (i.e. the calcium carbonate, such as vaterite, aragonite, calcite, or combinations thereof) from clean $CO_2$, improved economics by reducing capex on equipment (e.g. no gas scrubber needed), less or no sulfur or less than 5%, or less than 2%, or less than 1%, or less than 0.1% sulfur in the products due to lack of coal burning, high purity of the calcium carbonate in vaterite, aragonite, calcite, or combinations thereof, improved kinetics of the precipitate formation due to high concentration of the clean $CO_2$, and higher control over the vaterite formation with larger range of particle size ranging from 0.1 micron to 100 micron or more and better particle distribution (due to improved kinetics). These advantages have been described in detail herein.

In some embodiments of the processes provided herein, the calcium oxide and/or hydroxide obtained from the calcined limestone in the electric kiln is treated with a N-containing salt, such as, N-containing organic salt, or N-containing inorganic salt, for example only, an ammonium salt, to solubilize calcium in an aqueous solution which is then treated with the clean carbon dioxide gas to form the precipitate or precipitation material comprising vaterite, aragonite, calcite, or combinations thereof (polymorphic forms of the calcium carbonate).

In some embodiments, the calcium carbonate is formed in vaterite polymorphic form or in aragonite polymorphic form or calcite polymorphic form or combinations thereof. In some embodiments the calcium carbonate is precipitated calcium carbonate (PCC). The PCC can be in the form of vaterite, aragonite, calcite, or combinations thereof. In some embodiments, the vaterite is in stable vaterite form or is in a reactive vaterite form, both of which have been described herein. In some embodiments, the precipitation material comprising reactive vaterite possesses unique properties, including, but not limited to, cementing properties by transforming to aragonite after dissolution in water and re-precipitation which sets and cements with high compressive strength. In some embodiments, the vaterite transformation to aragonite results in cement that can be used to form building materials and/or cementitious products such as, but not limited to, formed building materials such as construction panel etc. further described herein. In some embodiments, the vaterite in the product is stable (does not transform to aragonite) and may be used as a filler or supplementary cementitious material (SCM) when mixed with other cement such as Ordinary Portland Cement (OPC). The precipitation material comprising vaterite may also be used as an aggregate where the reactive vaterite containing precipitation material after contact with water transforms to aragonite which sets and cements and which is then chopped up after cementation to form the aggregate. In some embodiments, where the calcium carbonate is formed as PCC, the PCC material is cementitious or may be used as a filler in non-cementitious products such as paper product, polymer product, lubricant, adhesive, rubber product, chalk, asphalt product, paint, abrasive for paint removal, personal care product, cosmetic, cleaning product, personal hygiene product, ingestible product, agricultural product, soil amendment product, pesticide, environmental remediation product, and combination thereof. Such use of carbonate precipitation material as a filler in non-cementitious products has been described in U.S. Pat. No. 7,829,053, issued Nov. 9, 2010, which is incorporated herein by reference in its entirety.

The N-containing salt, such as but not limited to, a N-containing inorganic salt, such as e.g. an ammonium salt or a N-containing organic salt, used to solubilize the calcium ions from the calcium oxide, may result in residual N-containing salt, such as e.g. the ammonium salt remaining in the supernatant solution as well as in the precipitate itself after the formation of the precipitate. In some embodiments, the presence of the residual ammonium salt in the precipitate may not be desirable as the ammonium salt content such as, but not limited to, ammonium chloride, ammonium sulfate, ammonium sulfite, ammonium hydrosulfide, ammonium thiosulfate, ammonium nitrate, ammonium nitrite, or combinations thereof content, in the precipitate may be detrimental to the cementitious products thus formed from the precipitation material. For example, chloride in the cementitious product may be corrosive to metal structures that are used along with the cementitious products. Further, the residual ammonia may add to the foul smell in the products. Furthermore, the non-recovered and wasted residual ammonium salt in the precipitate as well as the supernatant solution may be economically as well as environmentally not feasible. Various processes have been provided herein to remove and optionally recover the residual ammonium salt from the supernatant solution as well as the precipitate.

Before the invention is described in greater detail, it is to be understood that this invention is not limited to particular embodiments described, as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrequited number may be a number, which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the invention, representative illustrative methods and materials are described herein.

All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided may be different from the actual publication dates, which may need to be independently confirmed.

It is noted that, as used herein and in the appended claims, the singular forms "a", "an", and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method can be carried out in the order of events recited or in any other order, which is logically possible.

I. Processes and Systems

There are provided processes and systems to utilize the calcium oxide and the clean $CO_2$ from the cement plant undergoing limestone calcination in the electric kiln to form the polymorphs of the calcium carbonate, such as, vaterite, aragonite, calcite, or combinations thereof. In some embodiments, the vaterite-containing precipitate provided herein can be used to replace ordinary Portland cement (OPC) either entirely in applications such as but not limited to, cement fiber board or partially as a supplementary cementitious material (SCM). Various advantages associated with the processes and systems provided herein have been outlined above and will be further described in detail herein.

Cement is a significant contributor to global carbon dioxide emissions with over 1.5 billion metric tons emitted per year, corresponding to about 5% of total emissions. Over 50% of the cement emissions may result from the release of carbon dioxide from the decomposition of the limestone feedstock ($CaCO_3 \rightarrow CaO + CO_2$) in the regular kilns. Another 40% of cement emissions may result from the combustion of fuel in a high temperature regular kiln, a unit which is not required or is replaced by the electric kiln in the processes and systems provided herein. An example of the regular kiln is a cement kiln or rotary kiln. By refining the emitted $CO_2$ (i.e. increasing the purity and concentration of the $CO_2$ to form the clean $CO_2$), recapturing the clean $CO_2$ back in the process or sequestering and storing or disposing underground (can be more than 20% or more than 25% or more than 60% or close to 100% captive), avoiding the use of the regular kiln burning coal, reducing the capex by reducing absorber size and vent systems, and improving the kinetics of the calcium carbonate formation, such as vaterite form etc.; the processes and the systems provided herein have the potential to eliminate more than 50% or more than 80% or close to 100% of cement carbon dioxide emissions economically.

Accordingly, in one aspect, there is provided a zero carbon dioxide emission process, comprising:

a) calcining limestone in a cement plant in an electric kiln to form a mixture comprising calcium oxide and a first gaseous stream comprising clean carbon dioxide, wherein the clean carbon dioxide comprises no gaseous or non-gaseous components from combustion of fuel;

b) treating the mixture comprising calcium oxide with a N-containing salt solution under one or more dissolution conditions to produce a first aqueous solution comprising calcium salt; and c) contacting the first aqueous solution with the first gaseous stream comprising clean carbon dioxide under one or more precipitation conditions to produce a precipitation material comprising vaterite, aragonite, calcite, or combinations thereof.

In one aspect, there is provided a zero carbon dioxide emission system, comprising:

(i) a calcining system in a cement plant configured for calcining limestone in an electric kiln to form a mixture comprising calcium oxide and a first gaseous stream comprising clean carbon dioxide, wherein the clean carbon dioxide comprises no gaseous or non-gaseous components from combustion of fuel;

(ii) a treatment reactor operably connected to the calcining system configured for receiving the mixture comprising calcium oxide and configured for dissolving the mixture comprising calcium oxide in a N-containing salt solution under one or more dissolution conditions to produce a first aqueous solution comprising calcium salt; and (iii) a contacting reactor operably connected to the treatment reactor and the calcining system and configured for receiving the first aqueous solution comprising calcium salt and the first gaseous stream comprising clean carbon dioxide, and configured for treating the first aqueous solution comprising calcium salt with the first gaseous stream comprising clean carbon dioxide under one or more precipitation conditions to form a precipitation material comprising vaterite, aragonite, calcite, or combinations thereof.

In one aspect, there is provided a zero carbon dioxide emission process, comprising:

a) calcining limestone in a cement plant in an electric kiln to form a mixture comprising calcium oxide and a first gaseous stream comprising clean carbon dioxide, wherein the clean carbon dioxide comprises no gaseous or non-gaseous components from combustion of fuel;

b) disposing the first gaseous stream comprising clean carbon dioxide; and c) using the mixture comprising calcium oxide in another process.

Various commercial uses of the lime or the calcium oxide are well known.

In one aspect, there is provided a zero carbon dioxide emission process, comprising:

a) calcining limestone in a cement plant in an electric kiln to form a mixture comprising calcium oxide and a first gaseous stream comprising clean carbon dioxide, wherein the clean carbon dioxide comprises no gaseous or non-gaseous components from combustion of fuel;

b) disposing the first gaseous stream comprising clean carbon dioxide;

c) treating the mixture comprising calcium oxide with a N-containing salt solution under one or more dissolution conditions to produce a first aqueous solution comprising calcium salt; and d) contacting the first aqueous solution with a gaseous stream comprising carbon dioxide under one or more precipitation conditions to produce a precipitation material comprising vaterite, aragonite, calcite, or combinations thereof.

The term "dispose" or its grammatical equivalent used herein includes that the clean carbon dioxide is either placed at a storage site or is employed for further use in another product, e.g., a manufactured or man-made item, where it is stored in that other product or is disposed or injected underground or underwater. In some instances, this disposal step includes forwarding the clean carbon dioxide described above to a long term storage site. The storage site could be an above ground site, an underground site or an underwater site.

In one aspect, there is provided a zero carbon dioxide emission system, comprising:

(i) a calcining system in a cement plant configured for calcining limestone in an electric kiln to form a mixture comprising calcium oxide and a first gaseous stream comprising clean carbon dioxide, wherein the clean carbon dioxide comprises no gaseous or non-gaseous components from combustion of fuel;

(ii) a disposal system operably connected to the calcining system configured to dispose the first gaseous stream comprising clean carbon dioxide; and (iii) a treatment reactor operably connected to the calcining system configured for receiving the mixture comprising calcium oxide and configured for using the mixture in another lime process.

In one aspect, there is provided a zero carbon dioxide emission system, comprising:

(i) a calcining system in a cement plant configured for calcining limestone in an electric kiln to form a mixture comprising calcium oxide and a first gaseous stream comprising clean carbon dioxide, wherein the clean carbon dioxide comprises no gaseous or non-gaseous components from combustion of fuel;

(ii) a disposal system operably connected to the calcining system configured to dispose the first gaseous stream comprising clean carbon dioxide;

(iii) a treatment reactor operably connected to the calcining system configured for receiving the mixture comprising calcium oxide and configured for dissolving the mixture comprising calcium oxide in a N-containing salt solution under one or more dissolution conditions to produce a first aqueous solution comprising calcium salt; and (iv) a contacting reactor operably connected to the treatment reactor configured for receiving the first aqueous solution comprising calcium salt and configured for treating the first aqueous solution comprising calcium salt with a gaseous stream comprising carbon dioxide under one or more precipitation conditions to form a precipitation material comprising vaterite, aragonite, calcite, or combinations thereof.

The mixture comprising calcium oxide may further comprise calcium hydroxide formed by the solubilization of the calcium oxide in water. The calcium oxide can act both as a source of divalent cations ($Ca^{2+}$) as well as proton-removing agent and react with carbon dioxide to form calcium carbonate precipitates.

Figure 2:
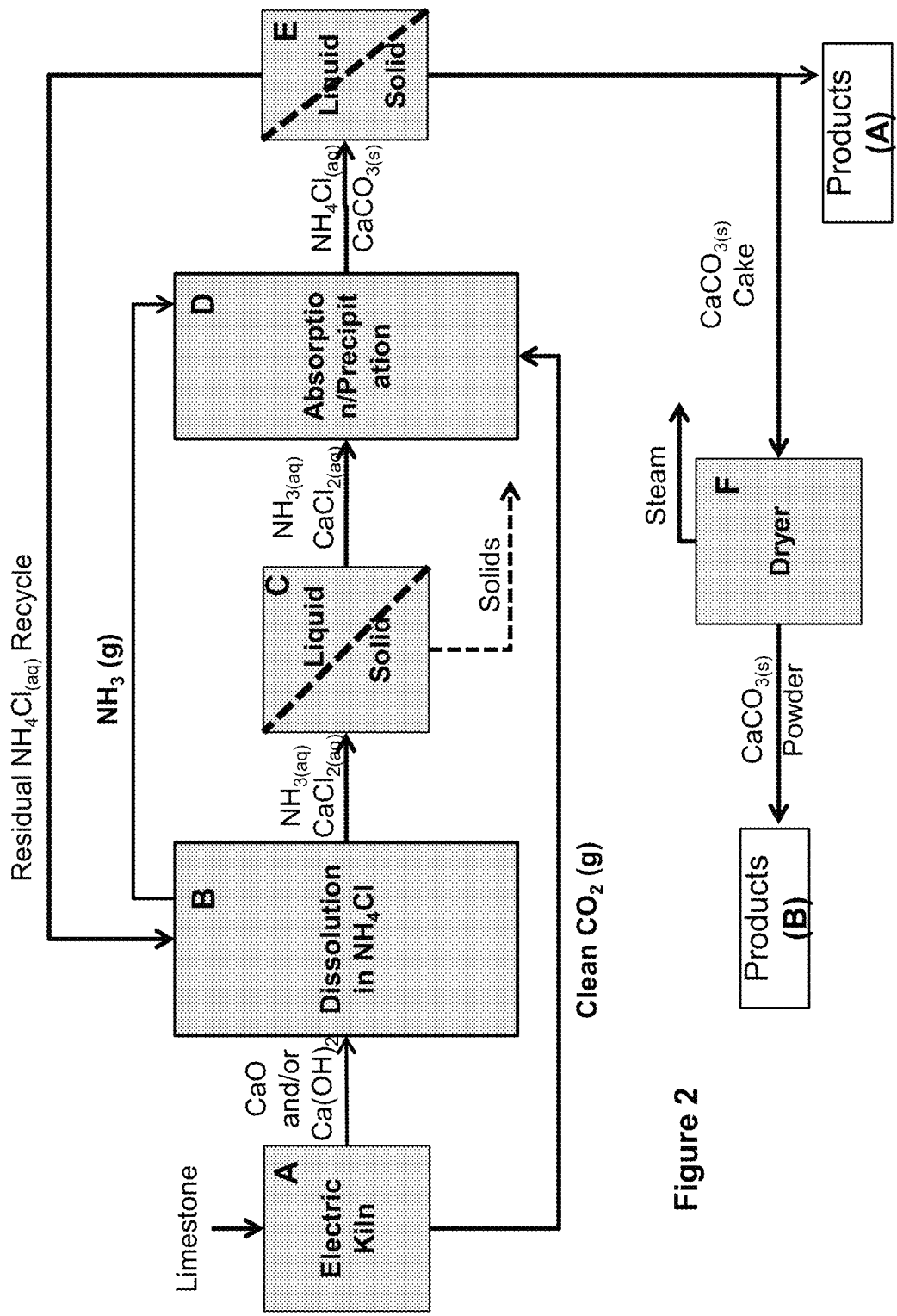
FIG. 2 illustrates some process and system embodiments provided herein.
Figure 3:
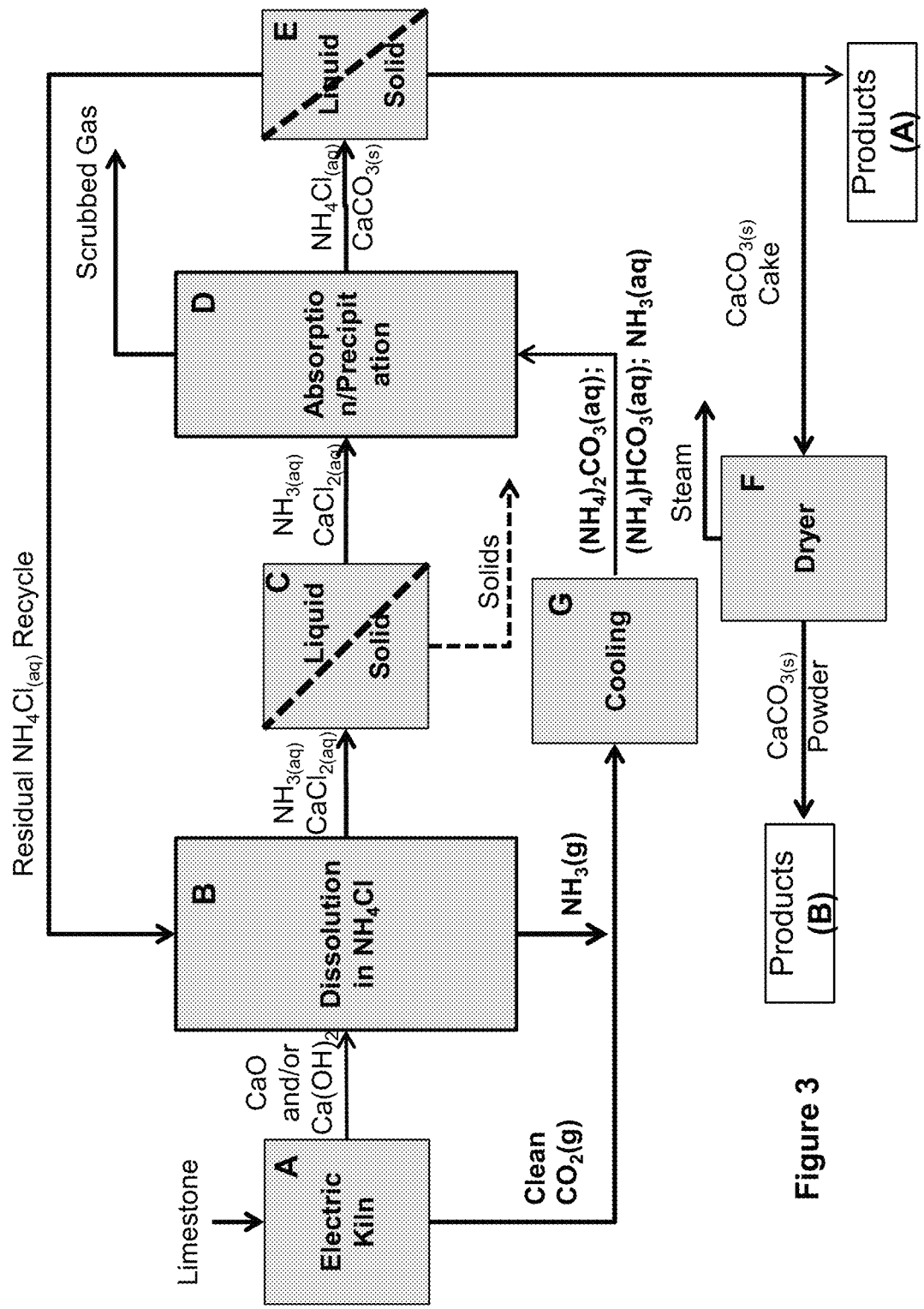
FIG. 3 illustrates some process and system embodiments provided herein.

Some aspects and embodiments of the processes and systems provided herein are as illustrated in FIGS. 1-3. It is to be understood that the steps illustrated in the figures may be modified or the order of the steps may be changed or more steps may be added or deleted depending on the desired outcome. It is also to be understood that some of the steps described in the specification may not be illustrated in the figures.

Step A: Calcination of the Limestone in the Electric Kiln

As illustrated in FIGS. 1-3, the limestone is subjected to the calcination in the electric kiln A resulting in the formation of the mixture comprising calcium oxide and the first gaseous stream comprising clean carbon dioxide, wherein the first gaseous stream or the clean carbon dioxide comprises no gaseous or non-gaseous components from combustion of fuel. The mixture comprising calcium oxide and the clean $CO_2$ obtained from the cement plant are subjected to various processes and systems as provided herein.

Calcination or calcining is a treatment process to bring about a decomposition of the limestone. The "limestone" as used herein, means $CaCO_3$ and may further include other impurities typically present in the limestone. Limestone is a naturally occurring material. The chemical composition of this material may vary from region to region as well as between different deposits in the same region. Therefore, the calcium oxide obtained from calcining the limestone from each natural deposit may be different. Typically limestone may be composed of calcium carbonate ($CaCO_3$), magnesium carbonate ($MgCO_3$), silica ($SiO_2$), alumina ($Al_2O_3$), iron (Fe), sulphur (S) or other trace elements.

Limestone deposits are widely distributed. The limestone from the various deposits may differ in physical chemical properties and can be classified according to their chemical composition, texture and geological formation. Limestone may be classified into the following types: high calcium where the carbonate content may be composed mainly of calcium carbonate with a magnesium carbonate content not more than 5%; magnesium containing calcium carbonate to about 5-20%; or dolomitic which may contain between 20-45% of $MgCO_3$, the balance amount is calcium carbonate. Limestones from different sources may differ considerably in chemical compositions and physical structures. In some embodiments of the processes and systems provided herein, the limestone is obtained from a cement plant which may be a wet process plant or a dry process plant and/or is obtained from a rock quarry. The quarries include, but not limited to, quarries associated with cement kilns, quarries for limestone rock for aggregate for use in concrete, quarries for limestone rock for other purposes (road base), and/or quarries associated with lime kilns. It is to be understood that the processes and systems provided herein apply to any of the sources listed above or are commercially available.

The limestone calcination is a decomposition process where the chemical reaction for decomposition of the limestone is:

$CaCO_3 \rightarrow CaO(s) + CO_2(g)$

In the processes and systems provided herein, the calcination of the limestone using electric kiln produces the mixture comprising more than 30 wt % calcium oxide. In some embodiments, the calcination of the limestone produces the mixture comprising more than 40 wt % calcium oxide; or more than 50 wt % calcium oxide; or more than 60 wt % calcium oxide; or more than 70 wt % calcium oxide; or more than 80 wt % calcium oxide; or more than 90 wt % calcium oxide; or between 30-95 wt % calcium oxide; or between 40-95 wt % calcium oxide; or between 50-95 wt % calcium oxide; or between 60-95 wt % calcium oxide; or between 70-95 wt % calcium oxide; or between 80-95 wt % calcium oxide; or between 30-90 wt % calcium oxide; or between 40-90 wt % calcium oxide; or between 50-90 wt % calcium oxide; or between 60-90 wt % calcium oxide; or between 70-90 wt % calcium oxide; or between 80-90 wt % calcium oxide; or between 30-80 wt % calcium oxide; or between 40-80 wt % calcium oxide; or between 50-80 wt % calcium oxide; or between 60-80 wt % calcium oxide; or between 70-80 wt % calcium oxide; or between 40-50 wt % calcium oxide; or between 50-60 wt % calcium oxide. In some embodiments, the aforementioned lime is a soft burnt lime (further described herein below).

In the processes and systems provided herein, the calcination of the limestone is done in the electric kiln which provides several advantages associated with the high purity and high concentration of the emitted $CO_2$ (as explained above). In some embodiments, the calcination of the limestone in the electric kiln results in the gaseous stream comprising clean carbon dioxide wherein the gaseous stream or the clean carbon dioxide comprises no gaseous or non-gaseous components from combustion of fuel. The "clean carbon dioxide" as used herein, includes the carbon dioxide gas devoid of pollutants present in the emitted gas from the combustion of fuel, e.g. fossil fuel. These pollutants from the combustion of fuel (absent in the clean $CO_2$ provided herein) can be gaseous pollutants, such as, but not limited to, SOx, NOx, carbon monoxide and/or any other non-carbon dioxide gas. Additionally, these pollutants from the combustion of fuel (absent in the clean $CO_2$ provided herein) can be non-gaseous pollutants, such as, but not limited to, metals, volatile organic matter, particulate matter, and/or dust. While the clean $CO_2$ provided herein comprises no gaseous or non-gaseous components from the combustion of fuel, it is to be understood that some gaseous or non-gaseous components described above may be present in the clean $CO_2$ provided that the gaseous or non-gaseous components are not from the combustion of fuel. For example, the clean $CO_2$ may comprise one or more of gaseous or non-gaseous components obtained from decomposition or calcination of the limestone. As stated above, the limestone comprises several impurities such as magnesium carbonate ($MgCO_3$), silica ($SiO_2$), alumina ($Al_2O_3$), iron (Fe), sulphur (S) or other trace elements. The decomposition of the limestone may result in the formation of one or more components (gaseous or non-gaseous components) selected from SOx, carbon monoxide, metal, volatile organic matter, particulate matter, and combinations thereof. Some of the thermal NOx may also be formed by the oxidation of the molecular nitrogen present in the combusted air. One or more of these gaseous or non-gaseous components obtained from decomposition or calcination of the limestone may be present in the clean $CO_2$. While some of the non-gaseous components obtained from the decomposition of the limestone may remain in the mixture comprising the calcium oxide, some of the gaseous or the non-gaseous components may be present in the clean $CO_2$. However, such one or more of the gaseous or the non-gaseous components present in the clean $CO_2$ are in much lower or insignificant quantities compared to the carbon dioxide obtained from calcining limestone in the regular kiln combusting fuel.

Accordingly, in some embodiments of the aspects provided herein, calcining the limestone in the electric kiln produces less than 20% of at least one component selected from the group consisting of SOx; thermal NOx; carbon monoxide; metal; volatile organic matter; particulate matter; and combinations thereof otherwise obtained from the combustion of fuel. In some embodiments of the aspects and embodiments provided herein, the first gaseous stream comprising clean carbon dioxide comprises less than 20% of at least one component selected from the group consisting of SOx; thermal NOx; carbon monoxide; metal; volatile organic matter; particulate matter; and combinations thereof, thereby comprising clean carbon dioxide. In some embodiments of the aspects and embodiments provided herein, the first gaseous stream comprising clean carbon dioxide comprises less than 20% or less than 18% or less than 15%, or less than 12% or less than 10%, or less than 8%, or less than 6%, or less than 5%, or less than 3%, or less than 2%, or less than 1% or between about 0-20% or between about 1-19% or between about 1-18% of at least one component selected from the group consisting of SOx; thermal NOx; carbon monoxide; metal; volatile organic matter; particulate matter; and combinations thereof, thereby comprising clean carbon dioxide.

Due to the absence of the gaseous or the non-gaseous components from the combustion of fuel, the clean $CO_2$ in the first gaseous stream is of high concentration. For example, compared to a regular kiln which produces around or less than 20 vol % of the polluted $CO_2$, the processes and systems provided herein produce between 20-100 vol % of the clean $CO_2$. In some embodiments of the aspects and embodiments provided herein, the first gaseous stream comprises between 20-100 vol % clean carbon dioxide; or between 20-95 vol % clean carbon dioxide; or between 20-90 vol % clean carbon dioxide; or between 20-80 vol % clean carbon dioxide; or between 20-70 vol % clean carbon dioxide; or between 20-60 vol % clean carbon dioxide; or between 20-50 vol % clean carbon dioxide; or between 20-40 vol % clean carbon dioxide; or between 20-30 vol % clean carbon dioxide; or between 30-100 vol % clean carbon dioxide; or between 30-95 vol % clean carbon dioxide; or between 30-90 vol % clean carbon dioxide; or between 30-80 vol % clean carbon dioxide; or between 30-70 vol % clean carbon dioxide; or between 30-60 vol % clean carbon dioxide; or between 30-50 vol % clean carbon dioxide; or between 30-40 vol % clean carbon dioxide; or between 40-100 vol % clean carbon dioxide; or between 40-95 vol % clean carbon dioxide; or between 40-90 vol % clean carbon dioxide; or between 40-80 vol % clean carbon dioxide; or between 40-70 vol % clean carbon dioxide; or between 40-60 vol % clean carbon dioxide; or between 40-50 vol % clean carbon dioxide; or between 50-100 vol % clean carbon dioxide; or between 50-95 vol % clean carbon dioxide; or between 50-90 vol % clean carbon dioxide; or between 50-80 vol % clean carbon dioxide; or between 50-70 vol % clean carbon dioxide; or between 50-60 vol % clean carbon dioxide; or between 60-100 vol % clean carbon dioxide; or between 60-95 vol % clean carbon dioxide; or between 60-90 vol % clean carbon dioxide; or between 60-80 vol % clean carbon dioxide; or between 60-70 vol % clean carbon dioxide; or between 70-100 vol % clean carbon dioxide; or between 70-95 vol % clean carbon dioxide; or between 70-90 vol % clean carbon dioxide; or between 70-80 vol % clean carbon dioxide; or between 80-100 vol % clean carbon dioxide; or between 80-95 vol % clean carbon dioxide; or between 80-90 vol % clean carbon dioxide; or between 90-100 vol % clean carbon dioxide; or between 90-95 vol % clean carbon dioxide; or about 99 vol % clean carbon dioxide.

Due to the presence of the clean $CO_2$ in the first gaseous stream, the systems provided herein require less gas re-circulation, no scrubber, no absorber vents, less blower power, less blower capex, and/or less ductwork capex, etc. improving the economics and the efficiency of the system.

In addition to the first gaseous stream comprising clean $CO_2$, the calcination of the limestone in the electric kiln produces the mixture comprising calcium oxide. The calcium oxide may be in dry form or in semi-dry form or wet form (e.g. calcium hydroxide) depending on the conditions. The production of calcium oxide (lime or quick lime) depends upon the type of kiln, conditions of the calcination and the nature of the raw material i.e. limestone. At relatively low calcination temperatures, products formed in the kiln may contain both un-burnt carbonate and lime and may be called underburnt lime. As the temperature increases, soft burnt or high reactive lime may be produced. At still higher temperatures, dead burnt or low reactive lime may be produced. Soft burnt lime may be produced when the reaction front reaches the core of the charged limestone and converts all carbonate present to lime. A high productive product may be relatively soft, contains small lime crystallites and has open porous structure with an easily assessable interior. Such lime may have the optimum properties of high reactivity, high surface area and low bulk density. Increasing the degree of calcination beyond this stage may make lime crystallites to grow larger, agglomerate and sinter. This may result in a decrease in surface area, porosity and reactivity and an increase in bulk density. This product may be known as dead burnt or low reactive lime. Without being limited by any theory, the processes and systems provided herein produce and/or utilize any one or the combination of the aforementioned lime. The calcination using the electric kiln provides yet another advantage of the finer control over the calcination temperature which results in the control over the production of the soft burnt lime over the dead burnt lime. Therefore, the use of the electric kiln in the calcination step of the processes and systems provided herein, not only results in the formation of the desired form of the lime and the clean carbon dioxide but also cleaner calcium carbonate precipitates.

In some embodiments, the mixture comprising calcium oxide obtained after the calcination of the limestone in the electric kiln may further comprise the impurities of the limestone or the decomposed limestone. These impurities may be present as a solid along with the mixture comprising calcium oxide. For example, in some embodiments, the mixture comprising calcium oxide further comprises sulfur depending on the source of the limestone. The sulfur in the mixture comprising calcium oxide may get introduced into the aqueous solution after the solubilization or the dissolution of the mixture comprising calcium oxide with N-containing salts, as described further herein. In an alkaline solution, various sulfur compounds containing various sulfur ionic species may be present in the solution including, but not limited to, sulfite ($SO_3^{2-}$), sulfate ($SO_4^{2-}$), hydrosulfide (HS), thiosulfate ($S_2O_3^{2-}$), polysulfides ($S_n^{2-}$), thiol (RSH), and the like. The "sulfur compound" as used herein, includes any sulfur ion containing compound. Various processes have been provided herein to remove and optionally recover the sulfur compound(s) from the supernatant solution as well as the precipitate.

Step B: Dissolution or Treatment of the Mixture with N-Containing Salt

As described above, the calcination of the limestone in the electric kiln results in the mixture comprising calcium oxide, for example only, soft burnt calcium oxide, and the first gaseous stream comprising clean carbon dioxide. The mixture comprising calcium oxide or lime may be in the form of a solid from dry kilns/cement processes and/or may be in the form of slurry in wet kilns/cement processes. When wet the calcium oxide (also known as a base anhydride that converts to its hydroxide form in water) may be present in its hydrated form such as but not limited to, calcium hydroxide. While calcium hydroxide (also called slaked lime) is a common hydrated form of calcium oxide, other intermediate hydrated and/or water complexes may also be present in the slurry, and are all included in the processes and systems provided herein.

In some embodiments, the clean carbon dioxide may be sequestered to storage or is disposed as explained herein above (not shown in the figures). In some embodiments, the mixture comprising calcium oxide is used in the manufacturing of the cement or in other commercial processes.

In some embodiments of the processes and systems provided herein, the mixture comprising calcium oxide is treated with a solubilizer, such as, N-containing salt to improve its solubility under one or more dissolution conditions to produce a first aqueous solution comprising calcium salt (step B in FIGS. 1-3). In some embodiments, the first aqueous solution comprising calcium salt further comprises solids, as described further herein. In some embodiments, the first aqueous solution comprising calcium salt further comprises ammonia and/or N-containing salt. For example, in some embodiments, the first aqueous solution comprising calcium salt further comprises ammonia and/or ammonium salt. For example, in some embodiments, the first aqueous solution comprising calcium chloride further comprises ammonia and/or ammonium chloride (when the N-containing salt is ammonium chloride).

In some embodiments, the calcium oxide slurry obtained from the wet process cement plant may be optionally subjected to dewatering step (not shown in the figure) where the residual water may be removed and the dewatered residue may be subjected to further treatment such as dissolution with N-containing salt. For illustration purposes only, the N-containing salt solution is being illustrated in the figures as ammonium chloride ($NH_4Cl$) solution and the subsequent calcium salt is bring illustrated as calcium chloride ($CaCl_2$). Various examples of the N-containing salts have been provided herein and are all within the scope of the invention.

In some embodiments of the aforementioned aspects and embodiments, the N-containing salt is N-containing inorganic salt, N-containing organic salt, or combination thereof. The "N-containing salt" as used herein, is a salt that partially or fully or substantially solubilizes or dissolves the calcium compound from the mixture comprising calcium oxide or lime. The calcium compound may be calcium oxide, calcium hydroxide, any other derivative of calcium, or combinations thereof.

The "N-containing inorganic salt" as used herein includes any inorganic salt with nitrogen in it. Examples of N-containing inorganic salt include, but not limited to, ammonium halide (halide is any halogen), ammonium acetate, ammonium sulfate, ammonium sulfite, ammonium nitrate, ammonium nitrite, and the like. In some embodiments, the ammonium halide is ammonium chloride or ammonium bromide. In some embodiments, the ammonium halide is ammonium chloride. Such chemicals are well known in the art and are commercially available.

The "N-containing organic salt" as used herein includes any salt of an organic compound with nitrogen in it. Examples of N-containing organic compounds include, but not limited to, aliphatic amine, alicyclic amine, heterocyclic amine, and combinations thereof. Such chemicals are well known in the art and are commercially available.

The "aliphatic amine" as used herein includes any alkyl amine of formula $(R)_n$—$NH_{3-n}$ where n is an integer from 1-3, wherein R is independently between C1-C8 linear or branched and substituted or unsubstituted alkyl. An example of the corresponding salt of the alkyl amine of formula $(R)_n$—$NH_{3-n}$ is $(R)_n$—$NH_{4-n}{}^+Cl^-$ or $(R)_n$—$NH_{4-n}{}^+Br^-$. In some embodiments, when R is substituted alkyl, the substituted alkyl is independently substituted with halogen, hydroxyl, acid and/or ester.

For example, when R is alkyl in $(R)_n$—$NH_{3-n}$, the alkyl amine can be a primary alkyl amine, such as for example only, methylamine, ethylamine, butylamine, pentylamine, etc.; the alkyl amine can be a secondary amine, such as for example only, dimethylamine, diethylamine, methylethylamine, etc.; and/or the alkyl amine can be a tertiary amine, such as for example only, trimethylamine, triethylamine, etc.

For example, when R is substituted alkyl substituted with hydroxyl in $(R)_n$—$NH_{3-n}$, the substituted alkyl amine is an alkanolamine including, but not limited to, monoalkanolamine, dialkanolamine, or trialkanolamine, such as e.g. monoethanolamine, diethanolamine, or triethanolamine, etc.

For example, when R is substituted alkyl substituted with halogen in $(R)_n$—$NH_{3-n}$, the substituted alkyl amine is, for example, chloromethylamine, bromomethylamine, chloroethylamine, bromoethylamine, etc.

For example, when R is substituted alkyl substituted with acid in $(R)_n$—$NH_{3-n}$, the substituted alkyl amine is, for example, amino acids. In some embodiments, the aforementioned amino acid has a polar uncharged alkyl chain, examples include without limitation, serine, threonine, asparagine, glutamine, or combinations thereof. In some embodiments, the aforementioned amino acid has a charged alkyl chain, examples include without limitation, arginine, histidine, lysine, aspartic acid, glutamic acid, or combinations thereof. In some embodiments, the aforementioned amino acid is glycine, proline, or combination thereof.

The "alicyclic amine" as used herein includes any alicyclic amine of formula $(R)_n$—$NH_{3-n}$ where n is an integer from 1-3, wherein R is independently one or more all-carbon rings which may be either saturated or unsaturated, but do not have aromatic character. Alicyclic compounds may have one or more aliphatic side chains attached. An example of the corresponding salt of the alicyclic amine of formula $(R)_n$—$NH_{3-n}$ is $(R)_n$—$NH_{4-n}{}^+Cl^-$. Examples of alicyclic amine include, without limitation, cycloalkylamine: cyclopropylamine, cyclobutylamine, cyclopentylamine, cyclohexylamine, cycloheptylamine, cyclooctylamine, and so on.

The "heterocyclic amine" as used herein includes at least one heterocyclic aromatic ring attached to at least one amine. Examples of heterocyclic rings include, without limitation, pyrrole, pyrrolidine, pyridine, pyrimidine, etc. Such chemicals are well known in the art and are commercially available.

In the processes and systems provided herein, the mixture comprising calcium oxide is treated or dissolved or solubilized with the N-containing salt, such as an aqueous ammonium chloride solution (step B in FIGS. 1-3) under one or more dissolution conditions to produce a first aqueous solution comprising calcium salt. The "treating" or "solvating" or "solubilizing" or its grammatical equivalents are used interchangeably herein and include solubilization of the mixture comprising calcium oxide in an aqueous medium.

As illustrated in step B of FIGS. 1-3, the N-containing salt is exemplified as ammonium chloride ($NH_4Cl$). It is to be understood that $NH_4Cl$ is for illustration purposes only and that any other N-containing salt including any other ammonium salt can be used in the processes provided herein. One or more steps may be omitted or modified or the order of the steps may be changed. The calcium oxide is solvated or solubilized by treatment with N-containing inorganic salt, e.g. $NH_4Cl$ (new and recycled as further explained below) when the reaction that may occur is:

Similarly, when the base is N-containing organic salt, the reaction may be shown as below:

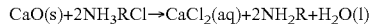

In some embodiments, the N-containing salt such as, but not limited to, ammonium chloride solution may be supplemented with anhydrous ammonia or an aqueous solution of ammonia to maintain an optimum level of ammonium ions in the solution.

In some embodiments, the amount of the N-containing salt is in 20% excess or 30% excess to the mixture comprising calcium oxide. In some embodiments, the N-containing salt is in a molar ratio of between 0.5:1 to 4:1 by weight (N-containing salt:mixture or N-containing inorganic salt:mixture or N-containing organic salt:mixture or ammonium chloride:mixture) or 0.5:1 to 3:1 or 0.5:1 to 2:1 or 0.5:1 to 1.5:1 or 1:1 to 1.5:1 or 2:1 to 4:1 or 2:1 to 3:1 or 2.5:1 to 3:1 or 3:1 to 4:1, or 1.5:1, or 2:1, or 2.5:1, or 3:1, or 3.5:1, or 4:1 by weight with the mixture comprising calcium oxide. In some embodiments, the aforementioned ratios or such ratios herein are molar ratios or wt % ratios.

In some embodiments of the methods described herein, no polyhydroxy compounds are used to form the precipitation material and/or the products of the invention.

In some embodiments of the processes and systems described herein, one or more dissolution conditions are selected from the group consisting of temperature between about 20-200° C., or between about 20-150° C., or between about 20-100° C., or between about 20-75° C., or between about 20-50° C., or between about 20-30° C., or between about 30-200° C., or between about 30-150° C., or between about 30-100° C., or between about 30-75° C., or between about 30-50° C., or between about 30-40° C., or between about 40-200° C., or between about 40-150° C., or between about 40-100° C., or between about 40-75° C., or between about 40-50° C., or between about 50-200° C., or between about 50-150° C., or between about 50-100° C.; pressure between about 0.5-50 atm, or between about 0.5-10 atm, or between about 0.5-20 atm; N-containing inorganic or organic salt wt % in water between about 0.5-50%, or between about 0.5-25%, or between about 0.5-10%; or combinations thereof.

Agitation may be used to effect treatment of the calcium oxide, for example, by eliminating hot and cold spots. In some embodiments, the concentration of the calcium oxide in water may be between 1 and 10 g/L, 10 and 20 g/L, 20 and 30 g/L, 30 and 40 g/L, 40 and 80 g/L, 80 and 160 g/L, 160 and 320 g/L, 320 and 640 g/L, or 640 and 1280 g/L. To optimize the purification/solvation of the calcium oxide, high shear mixing, wet milling, and/or sonication may be used to break open the calcium oxide.

Step C: Processing of the Solids

In some embodiments, the solids in the mixture comprising calcium oxide (obtained from the limestone impurities and/or from the decomposition of the limestone, as explained above) further get processed in step B and may be present as insoluble or partially soluble impurities in the first aqueous solution comprising calcium salt. In some embodiments, the solid impurities may or may not be removed from the first aqueous solution comprising calcium salts (step C in FIGS. 1-3) before the aqueous solution is treated with the carbon dioxide or the clean carbon dioxide in the process. The solids may optionally be removed from the aqueous solution by filtration and/or centrifugation techniques. In some embodiments, the solids may not be removed from the aqueous solution and the aqueous solution containing calcium salts as well as the solids are contacted with the carbon dioxide or the clean carbon dioxide in step D to form the precipitates. In such embodiments, the precipitation material further comprises solids.

In some embodiments, the solids (shown as solids in FIGS. 1-3) are calcium depleted solids and may be used as a cement substitute (such as a substitute for Portland cement). In some embodiments, the solids include the impurities carried over from the limestone and/or the limestone decomposition and include, but not limited to, silicate, iron oxide, aluminum oxide, other particulate matter; and combinations thereof. In some embodiments, the solids in the precipitation material comprising vaterite, aragonite, calcite, or combinations thereof, when mixed with OPC provide pozzolanic phases and enhance binding with the cement.

In some embodiments, the solids are between 1-40 wt %; or between 1-30 wt %; or between 1-20 wt %; or between 1-10 wt % or between 1-5 wt %; or between 1-2 wt %, in the first aqueous solution comprising calcium salt, in the precipitation material, in the vaterite composition, or combinations thereof.

Step D: Contacting the First Aqueous Solution with the $CO_2$ or the Clean $CO_2$ The first aqueous solution comprising calcium salt may further be treated with carbon dioxide from any of the commercial processes well known to the skilled person. In embodiments where the clean carbon dioxide is sequestered for storage or for disposal (as described above), the first aqueous solution comprising calcium salt may be treated with the carbon dioxide from a power plant or from a cement plant or from any other commercial process.

In some embodiments of the processes and systems provided herein, the first aqueous solution comprising calcium salt is contacted with the first gaseous stream comprising clean carbon dioxide under one or more precipitation conditions to produce a precipitation material comprising vaterite, aragonite, calcite, or combinations thereof.

In some embodiments of the processes and systems provided herein, the aforementioned embodiments are combined such that a portion of the clean carbon dioxide is sequestered for storage or for disposal and the remaining portion of the clean carbon dioxide is contacted with the first aqueous solution comprising calcium salt under one or more precipitation conditions to produce a precipitation material comprising vaterite, aragonite, calcite, or combinations thereof. All of such embodiments are well within the scope of the present disclosure.

In one aspect, there is provided a zero carbon dioxide emission process, comprising:

a) calcining limestone in a cement plant in an electric kiln to form a mixture comprising calcium oxide and a gaseous stream comprising clean carbon dioxide, wherein the clean carbon dioxide comprises no gaseous or non-gaseous components from combustion of fuel;

b) disposing a first portion of the gaseous stream comprising clean carbon dioxide;

c) treating the mixture comprising calcium oxide with a N-containing salt solution under one or more dissolution conditions to produce an aqueous solution comprising calcium salt; and d) contacting the aqueous solution with a second portion of the gaseous stream comprising clean carbon dioxide under one or more precipitation conditions to produce a precipitation material comprising vaterite, aragonite, calcite, or combinations thereof.

As illustrated in step D in FIGS. 1-3, the following reaction takes place when the first aqueous solution comprising calcium salt (and optionally comprising one or more of solids, ammonia, and/or N-containing salt) is contacted with the carbon dioxide or the clean carbon dioxide from step A under one or more precipitation conditions to produce a precipitation material comprising vaterite, aragonite, calcite, or combinations thereof and a supernatant solution:

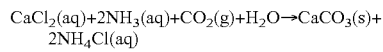
$$CaCl_2(aq) + 2NH_3(aq) + CO_2(g) + H_2O \rightarrow CaCO_3(s) + 2NH_4Cl(aq)$$

The "contacting," has been used interchangeably with "absorption" or "precipitation," herein.

In addition to the advantages described in step A, the clean $CO_2$ obtained from the calcination of the limestone in the electric kiln provides several advantages to this contacting/absorption/precipitation step in the processes as well as the contacting reactor in the systems provided herein. The high purity (less pollutants) and the high concentration of the clean $CO_2$ (more than 20% or between 20-95% or about 99% clean $CO_2$ in the gas stream compared to the calcination of limestone using regular kiln that produces around 20% or less than 20% polluted $CO_2$) results in considerable savings due to less or no gas circulation needed for absorption. In some embodiments, no scrubbing of the clean $CO_2$ is needed before absorbing the $CO_2$ in the contacting/absorption reactor. In some embodiments, the processes provided herein are zero emission processes when all the clean $CO_2$ emitted during calcination of the limestone in the electric kiln is either sequestered for storage or disposal or is utilized in the product formation with no $CO_2$ emitted into the atmosphere (close to 95% or 100% captive). In some embodiments, due to high purity and the high concentration of the clean $CO_2$, the process is more than 40% or more than 50% or more than 60% or more than 70% or more than 80% or more than 90% or around 95% or around 99% captive compared to a process using regular kiln.

In some embodiments, due to high purity and the high concentration of the clean $CO_2$, the process has several advantages, such as, but not limited to, reduced blower power needed resulting in reduced blower capex; reduced ductwork capex; greater absorber depth if desired (translates into higher capacity per footprint); smaller absorber vessel resulting in capex savings; reduction in absorber stirring requirements (related to volume); and reduction in absorber vent scrubbing and ammonia loss: small purge may be required. In some embodiments, the recycle of the clean $CO_2$ from the vent of the contacting reactor/absorber back to contacting reactor/absorber (shown with dotted lines in FIG. 1) may not be needed or may require lesser number of recirculation compared to polluted $CO_2$ from the regular kiln.

The absorption of the $CO_2$ or the clean $CO_2$ into the first aqueous solution comprising calcium salt produces $CO_2$-charged water containing carbonic acid, a species in equilibrium with both bicarbonate and carbonate. The precipitation material is prepared under one or more precipitation conditions (as described herein) suitable to form vaterite, aragonite, calcite, or combinations thereof or the PCC material.

In some embodiments of the aforementioned aspect, the process further comprises removing and optionally recovering a gaseous stream comprising ammonia.

In one aspect, there is provided zero carbon dioxide ($CO_2$) emission process, comprising:

a) calcining limestone in a cement plant in an electric kiln to form a mixture comprising calcium oxide and a first gaseous stream comprising clean carbon dioxide, wherein the clean carbon dioxide comprises no gaseous or non-gaseous components from combustion of fuel;

b) treating the mixture comprising calcium oxide with a N-containing salt solution under one or more dissolution conditions to produce a first aqueous solution comprising calcium salt and a second gaseous stream comprising ammonia; and c) contacting the first aqueous solution with the first gaseous stream comprising clean carbon dioxide and the second gaseous stream comprising ammonia under one or more precipitation conditions to produce a precipitation material comprising vaterite, aragonite, calcite, or combinations thereof.

These aspects and embodiments are illustrated in FIG. 2, wherein the gaseous stream comprising clean $CO_2$ and $NH_3$ from steps A and B, respectively, are recirculated to the contacting/absorption reactor (step D) for the formation of the precipitation material. Remaining steps of FIG. 2 are identical to the steps of FIG. 1. It is to be understood that the processes of both FIG. 1 and FIG. 2 can also take place simultaneously such that the N-containing salt, such as the N-containing inorganic salt or the N-containing organic salt and optionally ammonia may be partially present in the first aqueous solution and partially present in the second gaseous stream.

The reaction taking place in the contacting reactor in the aforementioned aspect may be shown as below:

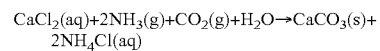
$$CaCl_2(aq) + 2NH_3(g) + CO_2(g) + H_2O \rightarrow CaCO_3(s) + 2NH_4Cl(aq)$$

In some embodiments of the aspects and embodiments provided herein, the second gaseous stream comprising ammonia may have supplemental ammonia from an external source and/or is recovered and re-circulated only from step B.

In some embodiments of the aspects and embodiments provided herein, wherein the gaseous stream comprises ammonia and clean carbon dioxide, no external source of carbon dioxide and/or ammonia is used and the process is a closed loop process. Such closed loop process is being illustrated in the figures described herein.

In some embodiments, the dissolution of the mixture comprising calcium oxide with some of the N-containing organic salt in step B may not result in the formation of ammonia gas or the amount of ammonia gas formed may not be substantial. For embodiments, where the ammonia gas is not formed or is not formed in substantial amount, the processes and systems illustrated in FIG. 1 where the first aqueous solution comprising calcium salt is treated with the clean carbon dioxide gas are applicable. In such embodiments, the organic amine salt may remain in the aqueous solution in fully or partially dissolved state or may separate as an organic amine layer, as shown in the reaction below:

$$CaO(s) + 2NH_3R^+Cl^- \rightarrow CaCl_2(aq) + 2NH_2R + H_2O$$

The N-containing organic salt or the N-containing organic compound remaining in the supernatant solution after the precipitation may be called residual N-containing organic salt or residual N-containing organic compound. Processes and systems have been described herein to recover the residual compounds from the precipitate as well as the supernatant solution.

In some embodiments, the processes further comprise recovering the first gaseous stream comprising clean carbon dioxide and the second gaseous stream comprising ammonia and subjecting the first and the second gaseous streams to a cooling process under one or more cooling conditions to condense a second aqueous solution comprising ammonium bicarbonate, ammonium carbonate, ammonia, or combinations thereof. In some embodiments, the processes further comprise treating the first aqueous solution with the second aqueous solution under the one or more precipitation conditions to form the precipitation material.

Accordingly, in one aspect, there are provided zero carbon dioxide ($CO_2$) emission processes, comprising:

a) calcining limestone in a cement plant in an electric kiln to form a mixture comprising calcium oxide and a first gaseous stream comprising clean carbon dioxide, wherein the clean carbon dioxide comprises no gaseous or non-gaseous components from combustion of fuel;

b) treating the mixture comprising calcium oxide with a N-containing salt solution under one or more dissolution conditions to produce a first aqueous solution comprising calcium salt and a second gaseous stream comprising ammonia;

c) recovering the first gaseous stream comprising clean carbon dioxide and the second gaseous stream comprising ammonia and subjecting the first and the second gaseous streams to a cooling process under one or more cooling conditions to condense a second aqueous solution comprising ammonium bicarbonate, ammonium carbonate, ammonia, or combinations thereof; and d) contacting the first aqueous solution comprising calcium salt with the second aqueous solution comprising ammonium bicarbonate, ammonium carbonate, ammonia, or combinations thereof under one or more precipitation conditions to form a precipitation material comprising vaterite, aragonite, calcite, or combinations thereof.

The aforementioned aspect is illustrated in FIG. 3, wherein the first gaseous stream comprising clean $CO_2$ from step A and the second gaseous stream comprising $NH_3$ from step B of the process is recirculated to the cooling reactor (step G) for the formation of the carbonate and bicarbonate solutions as shown in the reactions below. Remaining steps of FIG. 3 are identical to the steps of FIGS. 1 and 2.

In some embodiments of the aforementioned aspect, the first gaseous stream comprising clean $CO_2$ and/or the second gaseous stream comprising $NH_3$ further comprises water vapor. In some embodiments of the aforementioned aspect and embodiments, the first and/or the second gaseous streams further comprise between about 20-90%; or between about 20-80%; or between about 20-70%; or between about 20-60%; or between about 20-55%; or between about 20-50%; or between about 20-40%; or between about 20-30%; or between about 20-25%; or between about 30-90%; or between about 30-80%; or between about 30-70%; or between about 30-60%; or between about 30-50%; or between about 30-40%; or between about 40-90%; or between about 40-80%; or between about 40-70%; or between about 40-60%; or between about 40-50%; or between about 50-90%; or between about 50-80%; or between about 50-70%; or between about 50-60%; or between about 60-90%; or between about 60-80%; or between about 60-70%; or between about 70-90%; or between about 70-80%; or between about 80-90%, water vapor.

In some embodiments of the aforementioned aspect and embodiments, no external water is added to the cooling process. It is to be understood that the cooling process is similar to condensation of the gases (but may not be similar to the absorption of the gases) in the existing water vapors such that the gases are not absorbed in the water but are as such cooled down together with the water vapors. Condensation of the gases into a liquid stream may provide process control advantages compared to absorbing the vapors. For example only, condensation of the gases into the liquid stream may allow pumping of the liquid stream into the precipitation step. Pumping of the liquid stream may be lower in cost than compression of a vapor stream into the absorption process.

Intermediate steps in the cooling reaction/reactor may include the formation of ammonium carbonate and/or ammonium bicarbonate by reactions as below:

$$2NH_3 + CO_2 + H_2O \rightarrow (NH_4)_2CO_3$$

$$NH_3 + CO_2 + H_2O \rightarrow (NH_4)HCO_3$$

Similar reactions may be shown for the N-containing organic salt:

$$2NH_2R + CO_2 + H_2O \rightarrow (NH_3R)_2CO_3$$

$$NH_2R + CO_2 + H_2O \rightarrow (NH_3R)HCO_3$$

The second aqueous solution comprising ammonium bicarbonate, ammonium carbonate, ammonia, or combinations thereof (exiting the cooling reaction/reactor G in FIG. 3) is then treated with the first aqueous solution comprising calcium salt from the treatment reaction/reactor B, in the contacting/absorption/precipitation reaction/reactor D to form the precipitation material comprising vaterite, aragonite, calcite, or combinations thereof:

$$(NH_4)_2CO_3 + CaCl_2 \rightarrow CaCO_3 + 2NH_4Cl$$

$$(NH_4)HCO_3 + NH_3 + CaCl_2 \rightarrow CaCO_3 + 2NH_4Cl + H_2O$$

$$2(NH_4)HCO_3 + CaCl_2 \rightarrow CaCO_3 + 2NH_4Cl + H_2O + CO_2$$

Independent of any intermediate steps, the combination of the reactions lead to an overall process chemistry of:

$$CaCO_3(\text{limestone}) \rightarrow CaCO_3(\text{vaterite, aragonite, calcite, or combinations thereof})$$

In some embodiments of the aspects and embodiments provided herein, the one or more cooling conditions comprise temperature between about 0-100° C., or between about 0-80° C., or between about 0-60° C., or between about 0-50° C., or between about 0-40° C., or between about 0-30° C., or between about 0-20° C., or between about 0-10° C., or between about 10-100° C., or between about 10-80° C., or between about 10-60° C., or between about 10-50° C., or between about 10-40° C., or between about 10-30° C., or between about 20-100° C., or between about 20-80° C., or between about 20-60° C., or between about 20-50° C., or between about 20-40° C., or between about 20-30° C., or between about 30-100° C., or between about 30-80° C., or between about 30-60° C., or between about 30-50° C., or between about 30-40° C., or between about 40-100° C., or between about 40-80° C., or between about 40-60° C., or between about 50-100° C., or between about 50-80° C., or between about 60-100° C., or between about 60-80° C., or between about 70-100° C., or between about 70-80° C.

In some embodiments of the aspects and embodiments provided herein, the one or more cooling conditions comprise pressure between about 0.5-50 atm; or between about 0.5-25 atm; or between about 0.5-10 atm.

It is to be understood that while FIG. 3 illustrates a separate cooling reaction/reactor G, the treatment/dissolution reaction/reactor B may be integrated with the cooling reaction/reactor. For example, the treatment/dissolution reactor may be integrated with a condenser. Various examples of the integrated dissolution and the cooling reactor have been described in U.S. application Ser. No. 17/184,933, filed Feb. 25, 2021, which is incorporated herein by reference in its entirety. Both the mixture comprising the calcium oxide and the N-containing salt solution (illustrated as $NH_4Cl$ in figures) are fed to the treatment/dissolution reaction/reactor, when the first aqueous solution comprising calcium salt is formed. The solution may optionally contain solid impurities that may stay at the bottom of the treatment/dissolution reactor. The first aqueous solution comprising calcium salt is withdrawn from the treatment/dissolution reaction/reactor to be processed further for precipitation. The gaseous stream comprising the clean carbon dioxide, ammonia, and water vapor passes to the upper section of the treatment/dissolution reactor where it is cooled to condense into the second aqueous solution. The second aqueous solution is collected using one or more trays.

As illustrated in step D in FIGS. 1-3, the first aqueous solution comprising calcium salt, from treatment of the mixture comprising calcium oxide with the N-containing salt as described herein, such as e.g. an ammonium salt or an ammonium halide, is contacted with the clean $CO_2$ and optionally $NH_3$ at any time before, during, or after the first aqueous solution comprising calcium salt is subjected to one or more precipitation conditions (i.e., conditions allowing for precipitation of the precipitation material). Similarly, as illustrated in step D in FIG. 3, the first aqueous solution comprising calcium salt is contacted with the second aqueous solution comprising ammonium bicarbonate, ammonium carbonate, ammonia, or combinations thereof from the cooling reaction/reactor at any time before, during, or after the first aqueous solution comprising calcium salt is subjected to one or more precipitation conditions (i.e., conditions allowing for precipitation of the precipitation material).

Accordingly, in some embodiments, the first aqueous solution comprising calcium salt is contacted with the clean $CO_2$ (and $NH_3$ as in FIG. 2 or second aqueous solution as in FIG. 3) prior to subjecting the aqueous solution to the one or more precipitation conditions that favor formation of the precipitation material comprising stable vaterite, reactive vaterite, aragonite, calcite, or combinations thereof or PCC. In some embodiments, the first aqueous solution comprising calcium salt is contacted with the clean $CO_2$ (and $NH_3$ as in FIG. 2 or second aqueous solution as in FIG. 3) while the aqueous solution is being subjected to the one or more precipitation conditions that favor formation of the precipitation material comprising stable vaterite, reactive vaterite, aragonite, calcite, or combinations thereof or PCC. In some embodiments, the first aqueous solution comprising calcium salt is contacted with the clean $CO_2$ (and $NH_3$ as in FIG. 2 or second aqueous solution as in FIG. 3) prior to and while subjecting the aqueous solution to the one or more precipitation conditions that favor formation of the precipitation material comprising stable vaterite, reactive vaterite, aragonite, calcite, or combinations thereof or PCC. In some embodiments, the first aqueous solution comprising calcium salt is contacted with the clean $CO_2$ (and $NH_3$ as in FIG. 2 or second aqueous solution as in FIG. 3) after subjecting the aqueous solution to the one or more precipitation conditions that favor formation of the precipitation material comprising stable vaterite, reactive vaterite, aragonite, calcite, or combinations thereof or PCC.

In some embodiments, the contacting of the first aqueous solution comprising calcium salt with clean carbon dioxide and optionally ammonia or second aqueous solution is achieved by contacting the first aqueous solution to achieve and maintain a desired pH range, a desired temperature range, and/or desired divalent cation concentration using a convenient protocol as described herein (precipitation conditions).

In some embodiments, the first aqueous solution comprising calcium salt may be placed in a contacting/precipitation reactor, wherein the amount of the first aqueous solution comprising calcium salt added is sufficient to raise the pH to a desired level (e.g., a pH that induces precipitation of the precipitation material) such as pH 7-8.5, pH 7-8, pH 7.5-8, pH 8-8.5, pH 9-14, pH 10-14, pH 11-14, pH 12-14, or pH 13-14. In some embodiments, the pH of the first aqueous solution comprising calcium salt when contacted with the clean carbon dioxide and optionally $NH_3$ or second aqueous solution, is maintained at between 7-8.5 or between 7.5-8.5 or between 7-8, or between 7.6-8.5, or between 8-8.5, or between 7.5-9.5 in order to form the precipitation material comprising stable vaterite, reactive vaterite, aragonite, calcite, or combinations thereof or PCC.

In some embodiments, the first aqueous solution may be cycled more than once, wherein a first cycle of precipitation removes vaterite, aragonite, calcite, or combinations thereof minerals and leaves an alkaline solution to which additional first aqueous solution comprising calcium salt may be added. Clean carbon dioxide, when contacted with the recycled solution of the first aqueous solution, allows for the precipitation of more vaterite, aragonite, calcite, or combinations thereof. It will be appreciated that, in these embodiments, the aqueous solution following the first cycle of precipitation may be contacted with the clean $CO_2$ before, during, and/or after the first aqueous solution comprising calcium salt has been added. In these embodiments, the water may be recycled or newly introduced. As such, the order of addition of the clean $CO_2$ and the first aqueous solution comprising calcium salt may vary. For example, the first aqueous solution comprising calcium salt may be added to, for example, brine, seawater, or freshwater, followed by the addition of the clean $CO_2$. In another example, the clean $CO_2$ may be added to, for example, brine, seawater, or freshwater, followed by the addition of the first aqueous solution comprising calcium salt.

The first aqueous solution comprising calcium salt may be contacted with the clean $CO_2$ in the contacting reactor using any convenient protocol. The contact protocols of interest include, but not limited to, direct contacting protocols (e.g., bubbling the clean $CO_2$ gas through the aqueous solution), concurrent contacting means (i.e., contact between unidirectional flowing gaseous and liquid phase streams), countercurrent means (i.e., contact between oppositely flowing gaseous and liquid phase streams), and the like. As such, contact may be accomplished through use of infusers, bubblers, fluidic Venturi reactors, spargers, gas filters, sprays, trays, or packed column reactors, and the like, in the precipitation reactor. In some embodiments, gas-liquid contact is accomplished by forming a liquid sheet of solution with a flat jet nozzle, wherein the clean $CO_2$ gas and the liquid sheet move in countercurrent, co-current, or cross-current directions, or in any other suitable manner. In some embodiments, gas-liquid contact is accomplished by contacting liquid droplets of solution having an average diameter of 500 micrometers or less, such as 100 micrometers or less, with the clean $CO_2$ gas.

In some embodiments, substantially (e.g., 80% or more or 90% or 99.9% or 100%) the entire clean $CO_2$ and optionally $NH_3$ stream produced in the process illustrated in Figs herein is employed in the precipitation of the precipitation material. In some embodiments, a portion of the clean $CO_2$ and optionally $NH_3$ stream is employed in the precipitation of the precipitation material and is may be 75% or less, such as 60% or less, and including 50% and less of the gaseous stream.

Any number of the gas-liquid contacting protocols described herein may be utilized. Gas-liquid contact is continued until the pH of the precipitation reaction mixture is optimum (various optimum pH values have been described herein to form the precipitation material comprising e.g. reactive vaterite, aragonite, calcite, or combinations thereof), after which the precipitation reaction mixture is allowed to stir. The rate at which the pH drops may be controlled by addition of more of the first aqueous solution comprising calcium salt during gas-liquid contact. In addition, additional first aqueous solution may be added after sparging to raise the pH back to basic levels for precipitation of a portion or all of the precipitation material. In any case, the precipitation material may be formed upon removing protons from certain species (e.g., carbonic acid, bicarbonate, hydronium) in the precipitation reaction mixture. The precipitation material comprising carbonates may then be separated and, optionally, further processed.

The rate at which the pH drops may be controlled by addition of additional supernatant or the first aqueous solution comprising calcium salt during gas-liquid contact. In addition, additional supernatant or the first aqueous solution comprising calcium salt may be added after gas-liquid contact to raise the pH back to basic levels (e.g. between 7-9 or between 7-8.5 or between 7-8) for precipitation of a portion or all of the precipitation material.

Applicants observed that due to the high purity and the high concentration of the clean $CO_2$ in the processes and systems provided herein, the rate of the reaction to form the precipitation material or the kinetics of the reaction is faster compared to using polluted $CO_2$ from the regular kiln or compared to using a polluted $CO_2$ containing pollutants from combustion of fuel. In some embodiments, the first gaseous stream comprising clean carbon dioxide has faster kinetics in the contacting step to produce the precipitation material compared to a process using regular kiln. In some embodiments, the kinetics of the contacting step to produce the precipitation material in the processes and systems provided herein is more than 5 times or more than 3 times or more than 2 times faster compared to the process using regular kiln. In some embodiments, the faster kinetics of the contacting step results in high yield of the vaterite, aragonite, calcite, or combinations thereof. In some embodiments, the faster kinetics of the contacting step in the processes and the systems provided herein results in smaller particle size or expansion in the particle size range thereby increasing the ability to produce the vaterite, aragonite, calcite, or combinations thereof with a desired particle size range. In some embodiments, the faster kinetics of the contacting step in the processes and the systems provided herein results in better particle distribution of the vaterite, aragonite, calcite, or combinations thereof. Applicants observed that the faster precipitate rate and the reduced residence time of the solution can result in the ability to optimize the size of the particle of the vaterite.

The first aqueous solution comprising calcium salt when contacted with the gaseous stream comprising clean $CO_2$ gas, results in the precipitation of the vaterite, aragonite, calcite, or combinations thereof, which are polymorphs of the calcium carbonate. The precipitation conditions that result in the formation of the stable or the reactive vaterite or the PCC in this process have been described herein below. In some embodiments, the precipitation material comprises stable vaterite and/or reactive vaterite or PCC. The "stable vaterite" or its grammatical equivalent as used herein includes vaterite that does not transform to aragonite or calcite during and/or after dissolution-reprecipitation process in water. The "reactive vaterite" or "activated vaterite" or its grammatical equivalent as used herein, includes vaterite that results in aragonite formation during and/or after dissolution-reprecipitation process in water. The "precipitated calcium carbonate" or "PCC" as used herein includes conventional PCC with high purity and micron or lesser size particles. The PCC can be in any polymorphic form of calcium carbonate including but not limited to vaterite, aragonite, calcite, or combination thereof. In some embodiments, the PCC has a particle size in nanometers or between 0.001 micron to 5 micron.

In the processes provided herein, the aqueous solution comprising $CO_2$ charged water, produced by contacting the first aqueous solution comprising calcium salt with the first gaseous stream comprising clean $CO_2$ (and optionally the second gaseous stream comprising ammonia) is subjected to one or more of precipitation conditions (step D) sufficient to produce the precipitation material comprising stable vaterite, reactive vaterite, aragonite, calcite, or combinations thereof or PCC and the supernatant (i.e., the part of the precipitation reaction solution that is left over after precipitation of the precipitation material). In some embodiments, the one or more precipitation conditions favor production of the precipitation material comprising stable or reactive vaterite or PCC.

The precipitation conditions include those that modulate the environment of the $CO_2$ charged precipitation reaction mixture to produce the desired precipitation material comprising stable vaterite, reactive vaterite, aragonite, calcite, or combinations thereof or PCC. Such one or more precipitation conditions, that can be used in the process embodiments described herein, suitable to form stable vaterite, reactive vaterite, aragonite, calcite, or combinations thereof or PCC containing precipitation material include, but are not limited to, temperature, pH, pressure, ion ratio, precipitation rate, presence of additive, presence of ionic species, concentration of additive and ionic species, stirring, residence time, mixing rate, forms of agitation such as ultrasonics, presence of seed crystals, catalysts, membranes, or substrates, dewatering, drying, ball milling, etc. In some embodiments, the average particle size of the stable or the reactive vaterite or PCC may also depend on the one or more precipitation conditions used in the precipitation of the precipitation material. In some embodiments, the percentage of the stable or the reactive vaterite in the precipitation material may also depend on the one or more precipitation conditions used in the precipitation process. As described above herein, due to the high purity and the high concentration of the clean $CO_2$, the rate of the reaction to form the precipitation material is fast resulting in high yield of the vaterite in shorter duration of time. The precipitation conditions noted above can be optimized to further enhance the productivity of the precipitate.

For example, the temperature of the $CO_2$-charged precipitation reaction mixture may be raised to a point at which an amount suitable for precipitation of the desired precipitation material occurs. In such embodiments, the temperature of the $CO_2$ charged precipitation reaction mixture may be raised to a value, such as from 20° C. to 80° C., or 20° C. to 50° C. or 30° C. to 50° C. or 40° C. to 50° C. or 50° C. to 60° C. and including from 25° C. to 45° C. While a given set of precipitation conditions may have a temperature ranging from 0° C. to 100° C., the temperature may be raised in certain embodiments to produce the desired precipitation material. In certain embodiments, the temperature of the precipitation reaction mixture is raised using energy generated from low or zero carbon dioxide emission sources (e.g., solar energy source, wind energy source, hydroelectric energy source, waste heat from the flue gases of the carbon emitter, etc.).

The pH of the $CO_2$-charged precipitation reaction mixture may also be raised to an amount suitable for precipitation of the desired precipitation material. In such embodiments, the pH of the $CO_2$-charged precipitation reaction mixture is raised to alkaline levels for precipitation, wherein carbonate is favored over bicarbonate. In some embodiments, the pH of the first aqueous solution comprising calcium salt that is contacted with the clean carbon dioxide gas has an effect on the formation of the reactive vaterite, aragonite, calcite, or combinations thereof or PCC. In some embodiments, the precipitation conditions required to form the precipitation material comprising reactive vaterite or PCC include conducting the contacting step of the clean carbon dioxide with the first aqueous solution comprising calcium salt at pH higher than 7 or pH of 8 or pH of between 7.1-8.5 or pH of between 7.5-8 or between 7.5-8.5 or between 8-8.5 or between 7.6-8.4, in order to form the reactive vaterite or PCC. The pH may be raised to pH 9 or higher, such as pH 10 or higher, including pH 11 or higher or pH 12.5 or higher.

Adjusting major ion ratios during precipitation may influence the nature of the precipitation material. Major ion ratios may have considerable influence on polymorph formation. For example, as the magnesium:calcium ratio in the water increases, aragonite may become the major polymorph of calcium carbonate in the precipitation material over low-magnesium vaterite. At low magnesium:calcium ratios, low-magnesium calcite may become the major polymorph. In some embodiments, where $Ca^{2+}$ and $Mg^{2+}$ are both present, the ratio of $Ca^{2+}$ to $Mg^{2+}$ (i.e., $Ca^{2+}:Mg^{2+}$) in the precipitation material is 1:1 to 1:2.5; 1:2.5 to 1:5; 1:5 to 1:10; 1:10 to 1:25; 1:25 to 1:50; 1:50 to 1:100; 1:100 to 1:150; 1:150 to 1:200; 1:200 to 1:250; 1:250 to 1:500; or 1:500 to 1:1000. In some embodiments, the ratio of $Mg^{2+}$ to $Ca^{2+}$ (i.e., $Mg^{2+}:Ca^{2+}$) in the precipitation material is 1:1 to 1:2.5; 1:2.5 to 1:5; 1:5 to 1:10; 1:10 to 1:25; 1:25 to 1:50; 1:50 to 1:100; 1:100 to 1:150; 1:150 to 1:200; 1:200 to 1:250; 1:250 to 1:500; or 1:500 to 1:1000.

Precipitation rate may also have an effect on compound phase formation, with the most rapid precipitation rate achieved by seeding the solution with a desired phase. Without seeding, rapid precipitation may be achieved by rapidly increasing the pH of the precipitation reaction mixture, which may result in more amorphous constituents. The higher the pH, the more rapid is the precipitation, which may result in a more amorphous precipitation material.

Residence time of the reaction mixture after contacting the first aqueous solution with the clean $CO_2$ may also have an effect on compound phase formation. For example, in some embodiments, a longer residence time may result in transformation of the reactive vaterite to aragonite/calcite within the reaction mixture. In some embodiments, too short residence time may result in an incomplete formation of the reactive vaterite in the reaction mixture. Therefore, the residence time may be critical to the precipitation of the reactive vaterite. Further, the residence time may also affect the particle size of the precipitate. For example, too long residence time may result in the agglomeration of the particles forming large size particles which is undesirable for PCC formation. Therefore, in some embodiments, the residence time of the reaction is between about 10 min to 1 hour, or between about 15 min-60 min, or between about 15 min-45 min, or between about 15 min-30 min, or between about 30 min-60 min. Applicants found that due to the faster reaction rate (owing to the use of the clean $CO_2$) the residence time is shorter to form the precipitate resulting in the formation of smaller sized particles or expanded range for the size of the particle.

In some embodiments, a set of precipitation conditions to produce a desired precipitation material from a precipitation reaction mixture may include, as above, the temperature and pH, as well as, in some instances, the concentrations of additives and ionic species in the water. The additives have been described herein below. The presence of the additives and the concentration of the additives may also favor formation of stable vaterite, reactive vaterite, aragonite, calcite, or combinations thereof or PCC. In some embodiments, a middle chain or long chain fatty acid ester may be added to the aqueous solution during the precipitation to form PCC. Examples of fatty acid esters include, without limitation, cellulose such as carboxymethyl cellulose, sorbitol, citrate such as sodium or potassium citrate, stearate such as sodium or potassium stearate, phosphate such as sodium or potassium phosphate, sodium tripolyphosphate, hexametaphosphate, EDTA, or combinations thereof. In some embodiments, a combination of stearate and citrate may be added during the contacting step of the process to from PCC.

Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare precipitation material according to the invention may be batch, semi-batch, or continuous protocols. The precipitation conditions may be different to produce a given precipitation material in a continuous flow system compared to a semi-batch or batch system.

In some embodiments, the gas leaving the contacting/absorber/precipitation reaction/reactor (shown as "scrubbed gas" in FIG. 3) passes to a gas treatment unit for a scrubbing process. Although not shown in FIGS. 1 and 2, the treatment unit may be used in any of the processes and systems described herein. The mass balance and equipment design for the gas treatment unit may depend on the properties of the gases. In some embodiments, the gas treatment unit may incorporate an HCl scrubber for recovering the small amounts of $NH_3$ in the gas exhaust stream that may be carried from the $CO_2$ absorption, precipitation step by the gas. $NH_3$ may be captured by the HCl solution through:

$$NH_3(g) + HCl(aq) \rightarrow NH_4Cl(aq)$$

The $NH_4Cl$ (aq) from the HCl scrubber may be recycled back to the solvation step B.

In some embodiments, the gas exhaust stream comprising ammonia (shown as "scrubbed gas" in FIG. 3) may be subjected to a scrubbing process where the gas exhaust stream comprising ammonia is scrubbed with the carbon dioxide from the industrial process (or recycles clean $CO_2$ from the process) and water to produce a solution of ammonia. The inlets for the scrubber may be carbon dioxide ($CO_{2(g)}$), the reactor gas exhaust containing ammonia ($NH_{3(g)}$), and fresh makeup water (or some other dilute water stream). The outlet may be a slipstream of the scrubber's recirculating fluid (e.g. $H_3N-CO_{2(aq)}$ or carbamate), which may optionally be returned back to the main reactor for contacting with carbon dioxide and precipitation. The pH of the system may be controlled by regulating the flow rate of $CO_{2(g)}$ into the scrubber. The conductivity of the system may be controlled by addition of dilute makeup water to the scrubber. Volume may be maintained constant by using a level detector in the scrubber or it's reservoir. While ammonia is a basic gas, the carbon dioxide gases are acidic gases. In some embodiments, the acidic and basic gases may ionize each other to increase their solubilities.

Without being limited by any theory, it is contemplated that the following reaction may take place:

$$NH_3(aq) + CO_2(aq) + H_2O \rightarrow HCO_3^- + NH_4^+$$

In certain embodiments, the systems include a source of the first aqueous solution comprising the calcium salt from the cement plant and a structure having an input for the aqueous solution. For example, the systems may include a pipeline or analogous feed of the aqueous solution, wherein the aqueous solution is brine, seawater, or freshwater. The system further includes an input for the clean $CO_2$ from the cement plant as well as components for combining these sources with water (optionally an aqueous solution such as water, brine or seawater) before the contacting/precipitation reactor or in the contacting/precipitation reactor. In some embodiments, the gas-liquid contactor is configured to contact enough of the clean $CO_2$ to produce the precipitation material in excess of 1, 10, 100, 1,000, or 10,000 tons per day.

The systems further include a contacting/precipitation reactor that subjects the water introduced to the contacting/precipitation reactor to one or more of the precipitation conditions (as described herein) and produces precipitation material and supernatant. In some embodiments, the contacting/precipitation reactor is configured to hold water sufficient to produce precipitation material in excess of 1, 10, 100, 1,000, or 10,000 tons per day. The contacting/precipitation reactor may also be configured to include any of a number of different elements such as temperature modulation elements (e.g., configured to heat the water to a desired temperature), chemical additive elements (e.g., configured for introducing additives etc. into the precipitation reaction mixture), computer automation, and the like.

The gaseous stream comprising clean $CO_2$ may be provided from the cement plant to the site of precipitation in any convenient manner. In some embodiments, the gaseous stream is provided with a gas conveyer (e.g., a duct) that runs from a site of the cement plant to one or more locations of the precipitation site. The source of the gaseous stream may be a distal location relative to the site of precipitation such that the source of the gaseous stream is a location that is 1 mile or more, such as 10 miles or more, including 100 miles or more, from the precipitation location. For example, the gaseous stream comprising clean $CO_2$ may have been transported to the site of precipitation from a remote cement plant via a $CO_2$ gas conveyance system (e.g., a pipeline). The gas may or may not be processed (e.g., remove other components) before it reaches the precipitation site (i.e., the site in which precipitation and/or production of products takes place). In yet other instances, the gaseous stream comprising clean $CO_2$ is proximal to the precipitation site. For example, the precipitation site is integrated with the gaseous stream comprising clean $CO_2$, such as the cement plant that integrates a contacting/precipitation reactor for the precipitation of precipitation material that may be used to produce the products.

Where the saltwater source that is processed by the system to produce the precipitate is seawater, the input is in fluid communication with a source of sea water, e.g., such as where the input is a pipeline or feed from ocean water to a land based system or a inlet port in the hull of ship, e.g., where the system is part of a ship, e.g., in an ocean based system.

The processes and systems may also include one or more detectors configured for monitoring the source of water or the source of the first aqueous solution or the source of the clean carbon dioxide (not illustrated in figures). Monitoring may include, but is not limited to, collecting data about the pressure, temperature and composition of the water or the carbon dioxide gas. The detectors may be any convenient device configured to monitor, for example, pressure sensors (e.g., electromagnetic pressure sensors, potentiometric pressure sensors, etc.), temperature sensors (resistance temperature detectors, thermocouples, gas thermometers, thermistors, pyrometers, infrared radiation sensors, etc.), volume sensors (e.g., geophysical diffraction tomography, X-ray tomography, hydroacoustic surveyers, etc.), and devices for determining chemical makeup of the water or the carbon dioxide gas (e.g. IR spectrometer, NMR spectrometer, UV-vis spectrophotometer, high performance liquid chromatographs, inductively coupled plasma emission spectrometers, inductively coupled plasma mass spectrometers, ion chromatographs, X-ray diffractometers, gas chromatographs, gas chromatography-mass spectrometers, flow-injection analysis, scintillation counters, acidimetric titration, and flame emission spectrometers, etc.).

In some embodiments, the detectors may also include a computer interface which is configured to provide a user with the collected data about the aqueous medium, the mixture comprising calcium oxide, the first aqueous solution comprising calcium salt, the clean carbon dioxide gas, the second aqueous solution, and/or ammonia gas. In some embodiments, the summary may be stored as a computer readable data file or may be printed out as a user readable document.

In some embodiments, the detector may be a monitoring device such that it can collect real-time data (e.g., internal pressure, temperature, etc.). In other embodiments, the detector may be one or more detectors configured to determine the parameters at regular intervals, e.g., determining the composition every 1 minute, every 5 minutes, every 10 minutes, every 30 minutes, every 60 minutes, every 100 minutes, every 200 minutes, every 500 minutes, or some other interval.

Step E: Separation of the Precipitation Material and the Supernatant

In some embodiments, the above recited processes and systems further include separating the precipitation material (e.g. dewatering) from the aqueous solution forming calcium carbonate cake (as shown in step E in FIGS. 1-3) by dewatering, optionally rinsing, and optionally drying. The precipitated material may then be used to make cementitious or non-cementitious products (shown as products A and B in FIGS. 1-3).

The precipitation material, following production from the precipitation reaction mixture, is separated from the reaction mixture to produce separated precipitation material (e.g., wet cake) and a supernatant as illustrated in step E in FIGS. 1-3. In the systems provided herein, the separation step may be carried out on the separation station. The precipitation material may be stored in the supernatant for a period of time following precipitation and prior to separation (e.g., by drying). For example, the precipitation material may be stored in the supernatant for a period of time ranging from few min to hours to 1 to 1000 days or longer, such as 1 to 10 days or longer, at a temperature ranging from 1° C. to 40° C., such as 20° C. to 25° C. The separation of the precipitation material from the precipitation reaction mixture is achieved using any of a number of convenient approaches, including draining (e.g., gravitational sedimentation of the precipitation material followed by draining), decanting, filtering (e.g., gravity filtration, vacuum filtration, filtration using forced air), centrifuging, pressing, or any combination thereof. Separation of bulk water from the precipitation material produces a wet cake of precipitation material, or a dewatered precipitation material. Liquid-solid separator such as Epuramat's Extrem-Separator ("ExSep") liquid-solid separator, Xerox PARC's spiral concentrator, or a modification of either of Epuramat's ExSep or Xerox PARC's spiral concentrator, may be useful for the separation of the precipitation material from the precipitation reaction mixture.

In some embodiments, the precipitation material, once separated from the precipitation reaction mixture, is washed with fresh water, then placed into a filter press to produce a filter cake with 30-60% solids. This filter cake is then mechanically pressed in a mold, using any convenient means, e.g., a hydraulic press, at adequate pressures, e.g., ranging from 5 to 5000 psi, such as 1000 to 5000 psi, to produce a formed solid, e.g., a rectangular brick. These resultant solids are then cured, e.g., by placing outside and storing, by placing in a chamber wherein they are subjected to high levels of humidity and heat, etc. These resultant cured solids are then used as building materials themselves or crushed to produce aggregate (product A in figures).

In processes involving the use of temperature and pressure, the dewatered precipitate cake may be dried. The cake is then exposed to a combination of re-watering, and elevated temperature and/or pressure for a certain time. The combination of the amount of water added back, the temperature, the pressure, and the time of exposure, as well as the thickness of the cake, can be varied according to composition of the starting material and the desired results.

A number of different ways of exposing the material to temperature and pressure are described herein; it will be appreciated that any convenient method may be used. Thickness and size of the cake may be adjusted as desired; the thickness can vary in some embodiment from 0.05 inch to 5 inches, e.g. 0.1-2 inches, or 0.3-1 inch. In some embodiments the cake may be 0.5 inch to 6 feet or even thicker. The cake is then exposed to elevated temperature and/or pressure for a given time, by any convenient method, for example, in a platen press using heated platens. The heat to elevate the temperature, e.g., for the platens, may be provided, e.g., by heat from an industrial waste gas stream such as a flue gas stream. The temperature may be any suitable temperature; in general, for a thicker cake a higher temperature is desired; examples of temperature ranges are 40-150° C., e.g., 60-120° C., such as 70-110° C., or 80-100° C. Similarly, the pressure may be any suitable pressure to produce the desired results; exemplary pressures include 1000-100,000 pounds per square inch (psi), including 2000-50,000 psi, or 2000-25,000 psi, or 2000-20,000 psi, or 3000-5000 psi. Finally, the time that the cake is pressed may be any suitable time, e.g., 1-100 seconds, or 1-100 minute, or 1-50 minutes, or 2-25 minutes, or 1-10,000 days. The resultant hard tablet may optionally then cured, e.g., by placing outside and storing, by placing in a chamber wherein they are subjected to high levels of humidity and heat, etc. These hard tablets, optionally cured, are then used as building materials themselves or crushed to produce aggregate.

Another method of providing temperature and pressure is the use of a press. A suitable press, e.g., a platen press, may be used to provide pressure at the desired temperature (using heat supplied, e.g., by a flue gas or by other steps of the process to produce a precipitate, e.g., from an electrochemical process) for a desired time. A set of rollers may be used in similar fashion.

Another way to expose the cake to elevated temperature and pressure is by means of an extruder, e.g., a screw-type extruder. The barrel of the extruder can be outfitted to achieve an elevated temperature, e.g., by jacketing; this elevated temperature can be supplied by, e.g., flue gases or the like. Extrusion may be used as a means of pre-heating and drying the feedstock prior to a pressing operation. Such pressing can be performed by means of a compression mold, via rollers, via rollers with shaped indentations (which can provide virtually any shape of aggregate desired), between a belt which provides compression as it travels, or any other convenient method. Alternatively, the extruder may be used to extrude material through a die, exposing the material to pressure as it is forced through the die, and giving any desired shape. In some embodiments, the carbonate precipitate is mixed with fresh water and then placed into the feed section of a rotating screw extruder. The extruder and/or the exit die may be heated to further assist in the process. The turning of the screw conveys the material along its length and compresses it as the flute depth of the screw decreases. The screw and barrel of the extruder may further include vents in the barrel with decompression zones in the screw coincident with the barrel vent openings. Particularly in the case of a heated extruder, these vented areas allow for the release of steam from the conveyed mass, removing water from the material.

The screw conveyed material is then forced through a die section which further compresses the material and shapes it. Typical openings in the die can be circular, oval, square, rectangular, trapezoidal, etc., although any shape which the final aggregate is desired in could be made by adjusting the shape of the opening. The material exiting the die may be cut to any convenient length by any convenient method, such as by a fly knife. Use of a heated die section may further assist in the formation of the product by accelerating the transition of the carbonate mineral to a hard, stable form. Heated dies may also be used in the case of binders to harden or set the binder. Temperatures of 100° C. to 600° C. are commonly used in the heated die section.

In yet other embodiments, the precipitate may be employed for in situ or form-in-place structure fabrication. For example, roads, paved areas, or other structures may be fabricated from the precipitate by applying a layer of precipitate, e.g., as described above, to a substrate, e.g., ground, roadbed, etc., and then hydrating the precipitate, e.g., by allowing it to be exposed to naturally applied water, such as in the form of rain, or by irrigation. Hydration solidifies the precipitate into a desired in situ or form-in-place structure, e.g., road, paved over area, etc. (other examples of product A as in figures). The process may be repeated, e.g., where thicker layers of in-situ formed structures are desired.

In some embodiments, the resultant dewatered precipitation material such as the wet cake material is directly used to make the products described herein (product A in figures). For example, the wet cake of the dewatered precipitation material is mixed with one or more additives, described herein, and is spread out on the conveyer belt where the reactive vaterite or PCC in the precipitation material transforms to aragonite and sets and hardens (and ammonium salt gets thermally removed). The hardened material is then cut into desired shapes such as boards or panels described herein. In some embodiments, the wet cake is poured onto a sheet of paper on top of the conveyer belt. Another sheet of paper may be put on top of the wet cake which is then pressed to remove excess water. After the setting and hardening of the precipitation material (e.g. the reactive vaterite transformation to the aragonite), the material is cut into desired shapes, such as, cement siding boards and drywall etc. In some embodiments, the amount of the one or more additives may be optimized depending on the desired time required for the transformation of the reactive vaterite to the aragonite (described below). For example, for some applications, it may be desired that the material transform rapidly and in certain other instance, a slow transformation may be desired. In some embodiments, the wet cake may be heated on the conveyer belt to hasten the transformation of the reactive vaterite to the aragonite. In some embodiments, the wet cake may be poured in the molds of desired shape and the molds are then heated in the autoclave to hasten the transformation of the reactive vaterite to the aragonite (and to remove residual ammonium salt). Accordingly, the continuous flow process, batch process or semi-batch process, all are well within the scope of the invention.

In some embodiments, the calcium carbonate cake, as described above, may contain impurities (e.g., 1-2% by weight or more) of ammonium ($NH_4^+$) ions, sulfur ions, and/or chloride (Cl⁻) ions. While rinsing of the filter cake of the precipitated $CaCO_3$, as described above, may remove some or all of the ammonium salts and/or sulfur compounds, it may result in a dilute concentration of ammonium salts (in the supernatant) which may need concentrating before recycling it back to the process.

The resultant supernatant of the precipitation process, or a slurry of precipitation material may also be processed as desired. For example, the supernatant or slurry may be returned to step B of the process, or to another location. In some embodiments, the supernatant may be contacted with the clean $CO_2$, as described above, to sequester additional clean $CO_2$. For example, in embodiments in which the supernatant is to be returned to the contacting/precipitation reactor, the supernatant may be contacted with the stream of clean $CO_2$ in a manner sufficient to increase the concentration of carbonate ion present in the supernatant. As described above, contact may be conducted using any convenient protocol. In some embodiments, the supernatant has an alkaline pH, and contact with the stream of clean $CO_2$ is carried out in a manner sufficient to reduce the pH to a range between pH 5 and 9, pH 6 and 8.5, or pH 7.5 to 8.2.

In some embodiments, the calcium carbonate slurry may be subjected to dewatering and optionally rinsed to form calcium carbonate slurry (with reduced water) or calcium carbonate cake (as illustrated in FIGS. 1-3) and the water or the supernatant containing residual ammonium salt solution. The residual ammonium chloride solution obtained from the dewatering as well as the rinsing stream may optionally be concentrated before being recycled back for the treatment with the mixture comprising calcium oxide (shown in FIGS. 1-3). Additional ammonium chloride and/or ammonia (anhydrous or aqueous solution) may be added to the recycled solution to make up for the loss of the ammonium chloride during the process and bring the concentration of ammonium chloride to the optimum level.

In some embodiments, the residual ammonium salt such as the ammonium chloride solution illustrated in FIGS. 1-3, may be recovered from the supernatant aqueous solution and concentrated using recovery process, such as, but not limited to, thermal decomposition, pH adjustment, reverse osmosis, multi-stage flash, multi-effect distillation, vapor recompression, distillation, or combinations thereof. The systems configured to carry out these processes are available commercially. For example, the pH of the solution may be raised (e.g. with a strong base like NaOH). This may shift the equilibrium towards volatile ammonia ($NH_3$(aq)/$NH_3$(g)). Rates and total removal could both be improved by heating the solution.

In some embodiments, the residual ammonium salts may be separated and recovered from the calcium carbonate precipitate by thermal decomposition process. This process may be incorporated in the processes illustrated in FIGS. 1-3 at the separation of the $CaCO_3$ precipitate (step E) and/or after the step of the dried $CaCO_3$ precipitate or powder (step F).

Typically, at 338° C., solid $NH_4Cl$ may decompose into ammonia ($NH_3$) and hydrogen chloride (HCl) gases. While at 840° C., solid $CaCO_3$ decomposes to calcium oxide (CaO) solid and carbon dioxide ($CO_2$) gas.

$$NH_4Cl_{(s)} \leftrightarrow NH_{3(g)} + HCl_{(g)}$$

$$CaCO_{3(s)} \leftrightarrow CaO_{(s)} + CO_{2(g)}$$

In some embodiments, the residual ammonium salt in the $CaCO_3$ precipitate and/or dried $CaCO_3$ precipitate such as, but not limited to, ammonium chloride, ammonium sulfate, ammonium sulfite, ammonium hydrosulfide, ammonium thiosulfate, or combinations thereof may be removed by thermal decomposition at a temperature between 338-840° C. This may be done either during the normal filter cake drying process and/or as a second post-drying heat treatment. A temperature range is desirable that decomposes residual ammonium salts in the precipitation while preserving the cementitious properties of the reactive vaterite in the precipitation material such that the reactive vaterite stays as reactive vaterite after heating, and after combination with water, successfully transforms to aragonite to form cementitious products. In some embodiments of the foregoing aspect and embodiments, the step of removing and optionally recovering the residual ammonium salt from the precipitation material comprises heating the precipitation material between about 100-360° C. or between about 150-360° C. or between about 200-360° C. or between about 250-360° C. or between about 300-360° C. or between about 150-200° C. or between about 100-200° C. or between about 200-300° C. or between about 290-375° C. or between about 300-350°

C. or between about 310-345° C. or between about 320-345° C. or between about 330-345° C. or between about 300-345° C., to evaporate the ammonium salt from the precipitation material with optional recovery by condensation of the ammonium salt. In some embodiments of the foregoing aspect and embodiments, the step of removing and optionally recovering the residual ammonium salt from the precipitation material comprises heating the precipitation material, for a duration of more than about 10 min or of more than about 15 min or for than about 5 min or of between about 10 min to about 1 hour or of between about 10 min to about 1.5 hour or of between about 10 min to about 2 hours or of between about 10 min to about 5 hours or of between about 10 min to about 10 hours.

Step F: Drying of the Precipitate Comprising Vaterite, Aragonite, Calcite, or Combinations Thereof In some embodiments, the resultant dewatered precipitation material obtained from the separation station is dried at the drying station to produce a powder form of the precipitation material comprising vaterite (stable or reactive), aragonite, calcite, or combinations thereof or PCC (Step F in figures). Drying may be achieved by air-drying the precipitation material. In certain embodiments, drying is achieved by freeze-drying (i.e., lyophilization), wherein the precipitation material is frozen, the surrounding pressure is reduced, and enough heat is added to allow the frozen water in the precipitation material to sublime directly into gas. In yet another embodiment, the precipitation material is spray-dried to dry the precipitation material, wherein the liquid containing the precipitation material is dried by feeding it through a hot gas (such as the gaseous waste stream from the power plant), and wherein the liquid feed is pumped through an atomizer into a main drying chamber and a hot gas is passed as a co-current or counter-current to the atomizer direction.

Calcium carbonate slurry may be pumped via pump to drying system, which in some embodiments includes a filtration step followed by spray drying. The water separated from the drying system may be discharged or may be recirculated to the reactor. The resultant solid or powder from drying system is utilized as cement or aggregate to produce building materials, effectively sequestering the clean $CO_2$. The solid or powder may also be used as a PCC filler in non-cementitious products such as paper, plastic, paint etc. The solid or powder may also be used in forming formed building materials, such as drywall, cement boards, etc.

Depending on the particular drying protocol of the system, the drying station may include a filtration element, freeze-drying structure, spray-drying structure, etc. In some embodiments, the precipitate may be dried by fluid bed dryer. In certain embodiments, waste heat from a power plant or similar operation may be used to perform the drying step when appropriate. For example, in some embodiments, dry product is produced by the use of elevated temperature (e.g., from power plant waste heat), pressure, or a combination thereof. Following the drying of the precipitation material, the material may be then subjected to heating at elevated temperatures to remove ammonium salts as described herein.

In some embodiments, the precipitation material is dewatered (to remove the supernatant aqueous solution) and dried to remove water (e.g. by heating at about or above 100° C.) before subjecting the precipitation material to the heating step to remove and optionally recover the ammonium salt. In some embodiments, the precipitation material is partially dewatered (to remove bulk of the supernatant aqueous solution) and partially dried to remove water (or avoid the drying step) before subjecting the precipitation material to the heating step to remove and optionally recover the ammonium salt. In some embodiments, the reactive vaterite in the precipitation material stays as reactive vaterite after heating. In some embodiments of the foregoing embodiments, it is desirable that the reactive vaterite in the precipitation material stays as reactive vaterite such that the cementitious properties of the material are conserved. In some embodiments, the ammonium salt evaporates from the precipitation material in a form comprising ammonia gas, hydrogen chloride gas, chlorine gas, or combinations thereof.

Applicants have found that in some embodiments, maintaining a combination of the amount of temperature and duration of heating may be critical to removing ammonium salt from the precipitation material yet preserving the cementitious properties of the reactive vaterite material. Traditionally, reactive vaterite is highly unstable and transforms readily to aragonite/calcite. However, Applicants have found temperature ranges coupled optionally with duration of heating that minimizes the transformation of the reactive vaterite yet removes residual ammonium salts from the material. In some embodiments of the foregoing embodiments, the vaterite in the precipitation material, after removal of the ammonium salt, stays as reactive vaterite which when combined with water transforms to aragonite (dissolution-reprecipitation process) which sets and cements to form cementitious products. The cementitious products, thus formed, possess minimal or no chloride content and have no foul smell of ammonia or sulfur. In some embodiments, the chloride content is around or below acceptable ASTM standards for the cementitious products.

In some embodiments, the above recited temperature conditions optionally coupled with duration of heating, may be combined with pressure conditions that provide a driving force to improve the thermodynamics of the decomposition of the residual ammonium salt. For example, the heating of the precipitation material may be carried out in a system in which the headspace is at a pressure lower than atmospheric pressure. The pressure lower than the atm pressure may create a driving force for heating reaction that involves gas phase products (such as, but not limited to, ammonia gas, hydrogen chloride gas, chlorine gas, or combinations thereof), by reducing the partial pressure of the reactant in the vapor phase. Another advantage of operating under reduced pressure or vacuum may be that at lower pressure some sublimation reactions may occur at lower temperatures thereby improving the energy requirements of the heating reaction.

In some embodiments of the above described thermal decomposition process, the separated ammonium chloride in the form of ammonia and HCl gases, may be recovered for reuse by either recrystallization of the combined thermally evolved gases or by absorbing the gases into an aqueous medium. Both mechanisms may result in the $NH_4Cl$ product that may be concentrated enough for reuse in the processes as shown in FIGS. 1-3.

In some embodiments, the ammonium salt may be separated and recovered in the processes described herein (or as illustrated in FIGS. 1-3) by pH adjusted evolution of $NH_3$ gas from the ammonium salt. This process may be incorporated in the processes herein illustrated in FIGS. 1-3 at the separation and/or drying of the $CaCO_3$ cake. The final pH of the water in the filter cake may typically be about 7.5. At this pH, $NH_4^+$ (pKa=9.25) may be the predominant species. Increasing the pH of this water may drive the acid base equilibrium toward $NH_3$ gas, as described in the following equation:

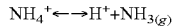

Any source of alkalinity may be used to increase the pH of the filter cake water. In some embodiments, the first aqueous solution of the calcium oxide and/or hydroxide or the limestone slurry may provide the source of high alkalinity. In some embodiments, the aqueous fraction of the calcium oxide may be integrated into the rinsing stage of the dewatering process (e.g. filter cake step) to raise the pH of the system, and drive the evolution of $NH_3$ gas. As ammonia has substantial solubility in water, heat and/or vacuum pressure may be applied to drive the equilibrium further toward the gaseous phase. The ammonia may be recovered for reuse by either recrystallization of ammonia with chloride or by absorbing the ammonia into an aqueous medium. Both mechanisms may result in the ammonia solution or $NH_4Cl$ product that may be concentrated enough for reuse in the processes described herein.

In one aspect, the systems provided herein further comprise a recovering system to recover the residual ammonium salt from the aqueous solution to recycle back to the contacting reactor. The recovering system is the system configured to carry out thermal decomposition, reverse osmosis, multi-stage flash, multi-effect distillation, vapor recompression, distillation, and combinations thereof.

The calcium carbonate cake (e.g. vaterite or PCC) may be sent to the dryer (step F in FIGS. 1-3) to form calcium carbonate powder containing stable vaterite, reactive vaterite, aragonite, calcite, or combinations thereof or PCC. The powder form of the precipitation material comprising stable vaterite, reactive vaterite, aragonite, calcite, or combinations thereof or PCC may be used further in applications to form products, as described herein. The cake may be dried using any drying techniques known in the art such as, but not limited to fluid bed dryer or swirl fluidizer. The resulting solid powder may be then mixed with additives to make different products described herein. In some embodiments, the slurry form with reduced water or the cake form of the precipitation material is directly used to form products, such as construction panel, as described herein.

In some embodiments, the production of the precipitation material and the products is carried out in the same facility. In some embodiments, the precipitation material is produced in one facility and is transported to another facility to make the end product. The precipitation material may be transported in the slurry form, wet cake form, or dry powder form.

In some embodiments of the foregoing aspects and embodiments, the vaterite composition or the precipitation material comprising vaterite (after precipitation in step D, after separation in step E and/or after drying in step F) includes at least 10% w/w vaterite; or at least 20% w/w vaterite; or at least 30% w/w vaterite; or at least 40% w/w vaterite; or at least 50% w/w vaterite; or at least 60% w/w vaterite; or at least 70% w/w vaterite; or at least 80% w/w vaterite; or at least 90% w/w vaterite; or at least 95% w/w vaterite; or at least 99% w/w vaterite; or from 10% w/w to 99% w/w vaterite; or from 10% w/w to 90% w/w vaterite; or from 10% w/w to 80% w/w vaterite; or from 10% w/w to 70% w/w vaterite; or from 10% w/w to 60% w/w vaterite; or from 10% w/w to 50% w/w vaterite; or from 10% w/w to 40% w/w vaterite; or from 10% w/w to 30% w/w vaterite; or from 10% w/w to 20% w/w vaterite; or from 20% w/w to 99% w/w vaterite; or from 20% w/w to 95% w/w vaterite; or from 20% w/w to 90% w/w vaterite; or from 20% w/w to 75% w/w vaterite; or from 20% w/w to 50% w/w vaterite; or from 30% w/w to 99% w/w vaterite; or from 30% w/w to 95% w/w vaterite; or from 30% w/w to 90% w/w vaterite; or from 30% w/w to 75% w/w vaterite; or from 30% w/w to 50% w/w vaterite; or from 40% w/w to 99% w/w vaterite; or from 40% w/w to 95% w/w vaterite; or from 40% w/w to 90% w/w vaterite; or from 40% w/w to 75% w/w vaterite; or from 50% w/w to 99% w/w vaterite; or from 50% w/w to 95% w/w vaterite; or from 50% w/w to 90% w/w vaterite; or from 50% w/w to 75% w/w vaterite; or from 60% w/w to 99% w/w vaterite; or from 60% w/w to 95% w/w vaterite; or from 60% w/w to 90% w/w vaterite; or from 70% w/w to 99% w/w vaterite; or from 70% w/w to 95% w/w vaterite; or from 70% w/w to 90% w/w vaterite; or from 80% w/w to 99% w/w vaterite; or from 80% w/w to 95% w/w vaterite; or from 80% w/w to 90% w/w vaterite; or from 90% w/w to 99% w/w vaterite; or 10% w/w vaterite; or 20% w/w vaterite; or 30% w/w vaterite; or 40% w/w vaterite; or 50% w/w vaterite; or 60% w/w vaterite; or 70% w/w vaterite; or 75% w/w vaterite; or 80% w/w vaterite; or 85% w/w vaterite; or 90% w/w vaterite; or 95% w/w vaterite; or 99% w/w vaterite. The above vaterite may be stable vaterite or reactive vaterite and/or PCC. In some embodiments, the remaining amount may be aragonite, calcite, or combinations thereof.

In some embodiments, the precipitation material comprising vaterite, aragonite, calcite, or combinations thereof, does not comprise or has no gaseous or non-gaseous components from combustion of fuel.

In some embodiments, the precipitation material comprising vaterite (after precipitation in step D, after separation in step E and/or after drying in step F) is a particulate composition with an average particle size of 0.1-100 microns. The average particle size (or average particle diameter) may be determined using any conventional particle size determination method, such as, but not limited to, multi-detector laser scattering or laser diffraction or sieving. In certain embodiments, unimodel or multimodal, e.g., bimodal or other, distributions are present. Bimodal distributions may allow the surface area to be minimized, thus allowing a lower liquids/solids mass ratio when vaterite composition is mixed with water yet providing smaller reactive particles for early reaction. In some embodiments, the vaterite composition or the precipitation material provided herein is a particulate composition with an average particle size of 0.1-1000 microns; or 0.1-500 microns; or 0.1-100 microns; or 0.1-50 microns; or 0.1-20 microns; or 0.1-10 microns; or 0.1-5 microns; or 1-50 microns; or 1-25 microns; or 1-20 microns; or 1-10 microns; or 1-5 microns; or 5-70 microns; or 5-50 microns; or 5-20 microns; or 5-10 microns; or 10-100 microns; or 10-50 microns; or 10-20 microns; or 10-15 microns; or 15-50 microns; or 15-30 microns; or 15-20 microns; or 20-50 microns; or 20-30 microns; or 30-50 microns; or 40-50 microns; or 50-100 microns; or 50-60 microns; or 60-100 microns; or 60-70 microns; or 70-100 microns; or 70-80 microns; or 80-100 microns; or 80-90 microns; or 0.1 microns; or 0.5 microns; or 1 microns; or 2 microns; or 3 microns; or 4 microns; or 5 microns; or 8 microns; or 10 microns; or 15 microns; or 20 microns; or 30 microns; or 40 microns; or 50 microns; or 60 microns; or 70 microns; or 80 microns; or 100 microns. For example, in some embodiments, the vaterite composition or the precipitation material provided herein is a particulate composition with an average particle size of 0.1-20 micron; or 0.1-15 micron; or 0.1-10 micron; or 0.1-8 micron; or 0.1-5 micron; or 1-25 micron; or 1-20 micron; or 1-15 micron; or 1-10 micron; or 1-5 micron; or 5-20 micron; or 5-10 micron. In some embodiments, the vaterite composition or the precipitation material includes two or more, or three or more, or four or more, or five or more, or ten or more, or 20 or more, or 3-20, or 4-10 different sizes of the particles in the composition or the precipitation material. For example, the vaterite composition or the precipitation material may include two or more, or three or more, or between 3-20 particles ranging from 0.1-10 micron, 10-50 micron, 50-100 micron, 100-200 micron, 200-500 micron, 500-1000 micron, and/or sub-micron sizes of the particles. In some embodiments, the PCC in the precipitation material may have average particle size below 0.1 micron, such as between 0.001 micron to 1 micron or more. In some embodiments, the PCC may be in nanometer particle size.

Transformation of the Reactive Vaterite to the Aragonite and Compositions

As illustrated in FIGS. 1-3, the processes produce the precipitation material (in wet, slurry or dry form) comprising stable vaterite, reactive vaterite, aragonite, calcite, or combinations thereof or PCC. The "composition," "precipitate," and "precipitation material," are used interchangeably herein. The precipitation material formed in the processes and systems after the optional removal of the residual ammonium salt, as described herein, comprises vaterite, aragonite, calcite, or combinations thereof or PCC. The "stable vaterite" includes vaterite that does not transform to aragonite and/or calcite during and/or after dissolution-re-precipitation process. The "reactive vaterite" or "activated vaterite" includes vaterite that results in aragonite and/or calcite formation during and/or after dissolution-re-precipitation process. In some embodiments, the PCC formed is in vaterite form. In some embodiments, the precipitation material comprises vaterite and further comprises aragonite, calcite, or combinations thereof. In some embodiments, the precipitation material comprises aragonite and further comprises vaterite, calcite, or combinations thereof. In some embodiments, the precipitation material comprises calcite and further comprises vaterite, aragonite, or combinations thereof. In some embodiments, the precipitation material comprises vaterite wherein the vaterite is stable vaterite and/or reactive vaterite. In some embodiments, the precipitation material comprises aragonite. In some embodiments, the precipitation material comprises calcite.

In some embodiments, the processes described herein further include contacting the precipitation material (in dried or wet form) with water and transforming the reactive vaterite to aragonite. In some embodiments, the stable vaterite when contacted with water does not transform to aragonite and stays either in the vaterite form or transforms over a long period of time to calcite.

In some embodiments, the precipitation material comprising reactive vaterite (optionally including solids) upon contact with water undergoes transformation (dissolution-reprecipitation) to aragonite and sets and hardens into cementitious products (shown as products A and B in FIGS. 1-3).

In some embodiments, the solids (as described herein) may get incorporated in the cementitious products. This provides an additional advantage of one less step of removal of the solids, minimizing $NH_4Cl$ loss as well as eliminating a potential waste stream thereby increasing the efficiency and improving the economics of the process. In some embodiments, the solid impurities do not adversely affect the transformation and/or reactivity of the vaterite to the aragonite. In some embodiments, the solid impurities do not adversely affect the strength (such as compressive strength or flexural strength) of the cementitious products. In fact, it has been contemplated that the impurities from limestone such as silica which constitutes the solids may facilitate pozzolanic properties during cementation process.

The precipitation material comprising aragonite or the transformation of the reactive vaterite to the aragonite may impart one or more unique characteristics to the product including, but not limited to, high compressive strength, complex microstructure network, neutral pH etc. In some embodiments, the vaterite in the precipitation material may be formed under suitable conditions so that the vaterite is stable and is used as filler in various applications. In some embodiments, the PCC in the precipitation material may be formed under suitable conditions so that the PCC is highly pure and is of a very small size particle.

Figure 4:
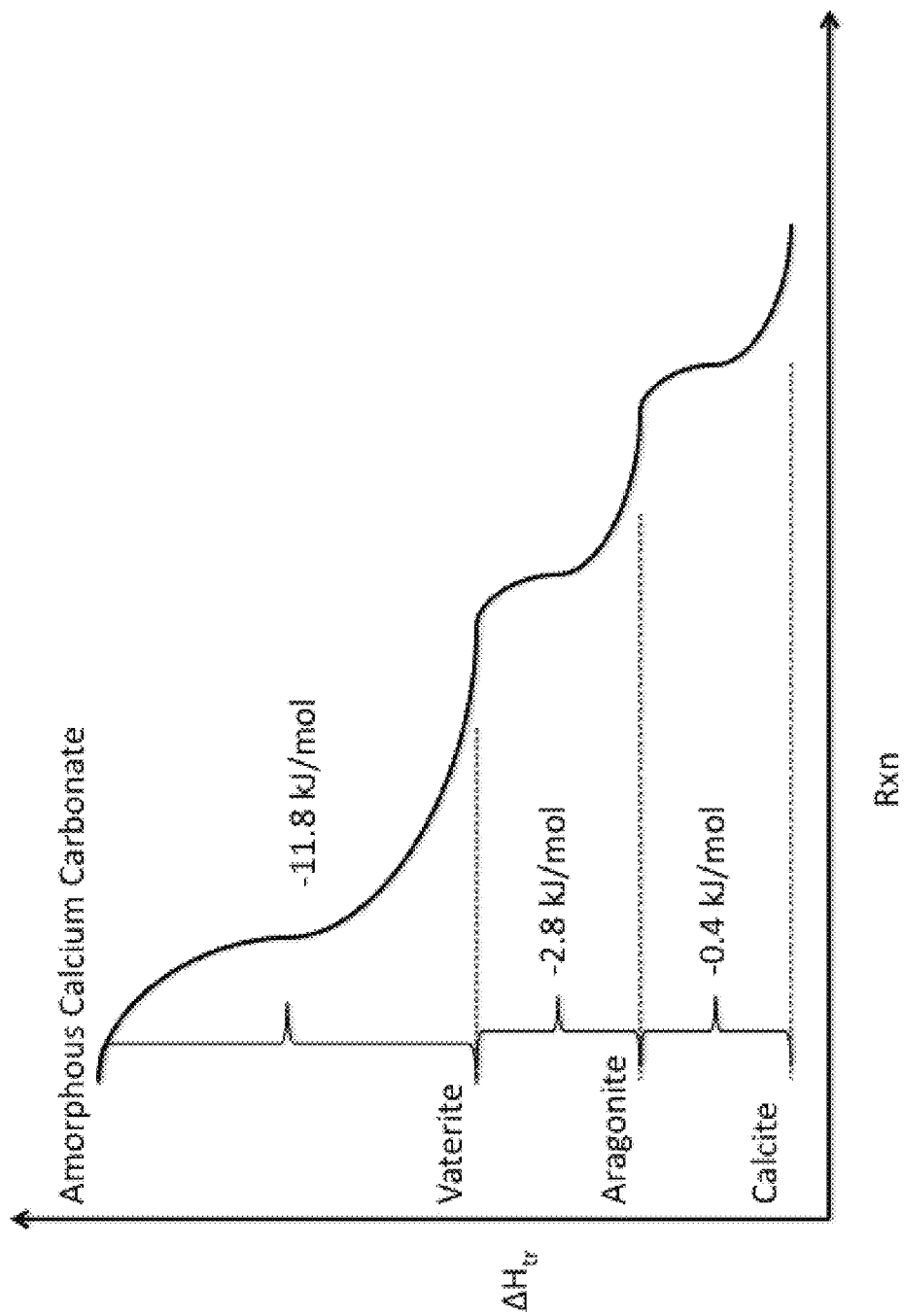
FIG. 4 illustrates a Gibbs free energy diagram of the transition from vaterite to aragonite.

Typically, upon precipitation of the calcium carbonate, amorphous calcium carbonate (ACC) may initially precipitate and transform into one or more of its three more stable phases (vaterite, aragonite, or calcite). A thermodynamic driving force may exist for the transformation from unstable phases to more stable phases. For this reason, calcium carbonate phases transform in the order: ACC to vaterite, aragonite, and calcite where intermediate phases may or may not be present. During this transformation, excesses of energy are released, as exhibited by FIG. 4. This intrinsic energy may be harnessed to create a strong aggregation tendency and surface interactions that may lead to agglomeration and setting or cementing. It is to be understood that the values reported in FIG. 4 are well known in the art and may vary.

The processes and systems provided herein produce or isolate the precipitation material comprising vaterite, aragonite, calcite, or combinations thereof or in the form of PCC which may be present in vaterite, aragonite, or calcite form. The precipitation material may be in a wet form, slurry form, or a dry powder form. This precipitation material may have a stable vaterite form that does not transform readily to any other polymorph or may have a reactive vaterite form that transforms to aragonite form. The aragonite form may not convert further to more stable calcite form. The product containing the aragonite form of the precipitate shows one or more unexpected properties, including but not limited to, high compressive strength, high porosity (low density or light weight), neutral pH (useful as artificial reef described below), microstructure network, etc.

Other minor polymorph forms of calcium carbonate that may be present in the precipitation material include, but not limited to, amorphous calcium carbonate, a precursor phase of vaterite, a precursor phase of aragonite, an intermediary phase that is less stable than calcite, polymorphic forms in between these polymorphs or combination thereof.

Vaterite may be present in monodisperse or agglomerated form, and may be in spherical, ellipsoidal, plate like shape, or hexagonal system. Vaterite typically has a hexagonal crystal structure and forms polycrystalline spherical particles upon growth. The precursor form of vaterite comprises nanoclusters of vaterite and the precursor form of aragonite comprises sub-micron to nanoclusters of aragonite needles. Aragonite, if present in the composition may be needle shaped, columnar, or crystals of the rhombic system. Calcite, if present in the composition may be cubic, spindle, or crystals of hexagonal system. An intermediary phase that is less stable than calcite may be a phase that is between vaterite and calcite, a phase between precursor of vaterite and calcite, a phase between aragonite and calcite, and/or a phase between precursor of aragonite and calcite.

The transformation between calcium carbonate polymorphs may occur via solid-state transition, may be solution mediated, or both. In some embodiments, the transformation is solution-mediated as it may require less energy than the thermally activated solid-state transition. Vaterite is metastable and the difference in thermodynamic stability of calcium carbonate polymorphs may be manifested as a difference in solubility, where the least stable phases are the most soluble (Ostwald, supra). Therefore, vaterite may dissolve readily in solution and transform favorably towards a more stable polymorph, such as aragonite. In a polymorphic system like calcium carbonate, two kinetic processes may exist simultaneously in solution: dissolution of the metastable phase and growth of the stable phase. In some embodiments, the aragonite crystals may be growing while vaterite is undergoing dissolution in the aqueous medium.

In some embodiments, the precipitation material comprising vaterite, as prepared by the processes described above, transforms to aragonite and sets and hardens after treatment with the aqueous medium under one or more suitable conditions. The aqueous medium includes, but is not limited to, fresh water optionally containing additives or brine. In some embodiments, the one or more suitable conditions include, but are not limited to, temperature, pressure, time period for setting, a ratio of the aqueous medium to the composition, and combination thereof. The temperature may be related to the temperature of the aqueous medium. In some embodiments, the temperature is in a range of 0-110° C.; or 0-80° C.; or 0-60° C.; or 0-40° C.; or 25-100° C.; or 25-75° C.; or 25-50° C.; or 37-100° C.; or 37-60° C.; or 40-100° C.; or 40-60° C.; or 50-100° C.; or 50-80° C.; or 60-100° C.; or 60-80° C.; or 80-100° C. In some embodiments, the pressure is atmospheric pressure or above atm. pressure. In some embodiments, the time period for setting the cement product is 30 min. to 48 hrs; or 30 min. to 24 hrs; or 30 min. to 12 hrs; or 30 min. to 8 hrs; or 30 min. to 4 hrs; or 30 min. to 2 hrs; 2 to 48 hrs; or 2 to 24 hrs; or 2 to 12 hrs; or 2 to 8 hrs; or 2 to 4 hrs; 5 to 48 hrs; or 5 to 24 hrs; or 5 to 12 hrs; or 5 to 8 hrs; or 5 to 4 hrs; or 5 to 2 hrs; 10 to 48 hrs; or 10 to 24 hrs; or 24 to 48 hrs.

In one aspect, the reactive vaterite may be activated such that the reactive vaterite leads to aragonitic pathway and not calcite pathway during dissolution-reprecipitation process. In some embodiments, the reactive vaterite containing composition is activated in such a way that after the dissolution-reprecipitation process, aragonite formation is enhanced and calcite formation is suppressed. The activation of the reactive vaterite containing composition may result in control over the aragonite formation and crystal growth. The activation of the vaterite containing composition may be achieved by various processes. Various examples of the activation of vaterite, such as, but not limited to, nuclei activation, thermal activation, mechanical activation, chemical activation, or combination thereof, are described herein. In some embodiments, the vaterite is activated through various processes such that aragonite formation and its morphology and/or crystal growth can be controlled upon reaction of vaterite containing composition with water. The aragonite formed results in higher tensile strength and fracture tolerance to the products formed from the reactive vaterite.

In some embodiments, the reactive vaterite may be activated by mechanical means, as described herein. For example, the reactive vaterite containing compositions may be activated by creating surface defects on the vaterite composition such that the aragonite formation is accelerated. In some embodiments, the activated vaterite is a ball-milled reactive vaterite or is a reactive vaterite with surface defects such that aragonite formation pathway is facilitated.

The reactive vaterite containing compositions may also be activated by providing chemical or nuclei activation to the vaterite composition. Such chemical or nuclei activation may be provided by one or more of aragonite seeds, inorganic additive, or organic additive. The aragonite seed present in the compositions provided herein may be obtained from natural or synthetic sources. The natural sources include, but not limited to, reef sand, limestone, hard skeletal material of certain fresh-water and marine invertebrate organisms, including pelecypods, gastropods, mollusk shell, and calcareous endoskeleton of warm- and cold-water corals, pearls, rocks, sediments, ore minerals (e.g., serpentine), and the like. The synthetic sources include, but not limited to, precipitated aragonite, such as formed from sodium carbonate and calcium chloride; or aragonite formed by the transformation of vaterite to aragonite, such as transformed vaterite described herein.

In some embodiments, the inorganic additive or the organic additive in the compositions provided herein can be any additive that activates reactive vaterite. Some examples of inorganic additive or organic additive in the compositions provided herein, include, but not limited to, sodium decyl sulfate, lauric acid, sodium salt of lauric acid, urea, citric acid, sodium salt of citric acid, phthalic acid, sodium salt of phthalic acid, taurine, creatine, dextrose, poly(n-vinyl-1-pyrrolidone), aspartic acid, sodium salt of aspartic acid, magnesium chloride, acetic acid, sodium salt of acetic acid, glutamic acid, sodium salt of glutamic acid, strontium chloride, gypsum, lithium chloride, sodium chloride, glycine, sodium citrate dehydrate, sodium bicarbonate, magnesium sulfate, magnesium acetate, sodium polystyrene, sodium dodecylsulfonate, poly-vinyl alcohol, or combination thereof. In some embodiments, inorganic additive or organic additive in the compositions provided herein, include, but not limited to, taurine, creatine, poly(n-vinyl-1-pyrrolidone), lauric acid, sodium salt of lauric acid, urea, magnesium chloride, acetic acid, sodium salt of acetic acid, strontium chloride, magnesium sulfate, magnesium acetate, or combination thereof. In some embodiments, inorganic additive or organic additive in the compositions provided herein, include, but not limited to, magnesium chloride, magnesium sulfate, magnesium acetate, or combination thereof.

Without being limited by any theory, it is contemplated that the activation of vaterite by ball-milling or by addition of aragonite seed, inorganic additive or organic additive or combination thereof may result in the control of the formation of the aragonite during dissolution-reprecipitation process of the activated reactive vaterite including control of properties, such as, but not limited to, polymorph, morphology, particle size, cross-linking, agglomeration, coagulation, aggregation, sedimentation, crystallography, inhibiting growth along a certain face of a crystal, allowing growth along a certain face of a crystal, or combination thereof. For example, the aragonite seed, inorganic additive or organic additive may selectively target the morphology of aragonite, inhibit calcite growth and promote the formation of aragonite that may generally not be favorable kinetically.

In some embodiments, one or more inorganic additives may be added to facilitate transformation of the vaterite to the aragonite. The one or more additives may be added during any step of the process. For example, the one or more additives may be added during contact of the first aqueous solution with the stream comprising clean carbon dioxide, after contact of the first aqueous solution with the stream comprising clean carbon dioxide, during precipitation of the precipitation material, after precipitation of the precipitation material in the slurry, in the slurry after the dewatering of the precipitation material, in the powder after the drying of the slurry, in the aqueous solution to be mixed with the powder precipitation material, or in the slurry made from the powdered precipitation material with water, or any combination thereof. In some embodiments, the water used in the process of making the precipitation material may already contain the one or more additives or the one or more additive ions. For example, if sea water is used in the process, then the additive ion may already be present in the sea water.

In some embodiments, in the foregoing methods, the amount of the one or more additives added during the process is more than 0.1% by weight, or more than 0.5% by weight, or more than 1% by weight, or more than 1.5% by weight, or more than 1.6% by weight, or more than 1.7% by weight, or more than 1.8% by weight, or more than 1.9% by weight, or more than 2% by weight, or more than 2.1% by weight, or more than 2.2% by weight, or more than 2.3% by weight, or more than 2.4% by weight, or more than 2.5% by weight, or more than 2.6% by weight, or more than 2.7% by weight, or more than 2.8% by weight, or more than 2.9% by weight, or more than 3% by weight, or more than 3.5% by weight, or more than 4% by weight, or more than 4.5% by weight, or more than 5% by weight, or between 0.5-5% by weight, or between 0.5-4% by weight, or between 0.5-3% by weight, or 0.5-2% by weight, or 0.5-1% by weight, or 1-3% by weight, or 1-2.5% by weight, or 1-2% by weight, or 1.5-2.5% by weight, or 2-3% by weight, or 2.5-3% by weight, or 0.5% by weight, or 1% by weight, or 1.5% by weight, or 2% by weight, or 2.5% by weight, or 3% by weight, or 3.5% by weight, or 4% by weight, or 4.5% by weight, or 5% by weight. In some embodiments, in the foregoing methods, the amount of the one or more additives added during the process is between 0.5-3% by weight or between 1.5-2.5% by weight.

In some embodiments, the precipitation material or the vaterite composition is in a powder form. In some embodiments, the precipitation material or the vaterite composition is in a dry powder form. In some embodiments, the precipitation material or the vaterite composition is disordered or is not in an ordered array or is in the powdered form. In still some embodiments, the precipitation material or the vaterite composition is in a partially or wholly hydrated form. In still some embodiments, the precipitation material or the vaterite composition is in saltwater or fresh water. In still some embodiments, the precipitation material or the vaterite composition is in water containing sodium chloride. In still some embodiments, the precipitation material or the vaterite composition is in water containing alkaline earth metal ions, such as, but are not limited to, calcium, magnesium, etc. In some embodiments, the precipitation material or the vaterite compositions are non-medical or are not for medical procedures.

Formation of Products A or B from the Precipitation Material

The precipitation material comprising vaterite, aragonite, calcite, or combinations thereof (in wet cake form or the dry form) may be combined with other materials to form compositions that may be used in the formation of products A and B. The products A or B (as shown in the figures) made from the compositions or the precipitation material provided herein show one or more properties, such as, high compressive strength, high durability, high porosity (light weight), high flexural strength, and less maintenance costs. In some embodiments, the compositions or the precipitation material upon combination with water, setting, and hardening (e.g. the reactive vaterite transformation to the aragonite), have a compressive strength of at least 3 MPa (megapascal), or at least 7 MPa, or at least 10 MPa or in some embodiments, between 3-30 MPa, or between 14-80 MPa or 14-35 MPa.

The product produced by the methods described herein may be an aggregate or building material or a pre-cast material or a formed building material. In some embodiments, the product produced by the methods described herein includes non-cementitous materials such as paper, paint, PVC etc. In some embodiments, the product produced by the methods described herein includes artificial reefs. These products have been described herein.

In some embodiments of the foregoing aspects and the foregoing embodiments, the precipitation material comprising vaterite, aragonite, calcite, or combinations thereof after combination with water, setting, and hardening (e.g. the reactive vaterite transformation to the aragonite) or the stable vaterite mixed with cement and water and after setting and hardening to form products A or B, has a compressive strength of at least 3 MPa; at least 7 MPa; at least 14 MPa; or at least 16 MPa; or at least 18 MPa; or at least 20 MPa; or at least 25 MPa; or at least 30 MPa; or at least 35 MPa; or at least 40 MPa; or at least 45 MPa; or at least 50 MPa; or at least 55 MPa; or at least 60 MPa; or at least 65 MPa; or at least 70 MPa; or at least 75 MPa; or at least 80 MPa; or at least 85 MPa; or at least 90 MPa; or at least 95 MPa; or at least 100 MPa; or from 3-50 MPa; or from 3-25 MPa; or from 3-15 MPa; or from 3-10 MPa; or from 14-25 MPa; or from 14-100 MPa; or from 14-80 MPa; or from 14-75 MPa; or from 14-50 MPa; or from 14-25 MPa; or from 17-35 MPa; or from 17-25 MPa; or from 20-100 MPa; or from 20-75 MPa; or from 20-50 MPa; or from 20-40 MPa; or from 30-90 MPa; or from 30-75 MPa; or from 30-60 MPa; or from 40-90 MPa; or from 40-75 MPa; or from 50-90 MPa; or from 50-75 MPa; or from 60-90 MPa; or from 60-75 MPa; or from 70-90 MPa; or from 70-80 MPa; or from 70-75 MPa; or from 80-100 MPa; or from 90-100 MPa; or from 90-95 MPa; or 14 MPa; or 3 MPa; or 7 MPa; or 16 MPa; or 18 MPa; or 20 MPa; or 25 MPa; or 30 MPa; or 35 MPa; or 40 MPa; or 45 MPa. For example, in some embodiments of the foregoing aspects and the foregoing embodiments, the composition after setting, and hardening to form products A or B has a compressive strength of 3 MPa to 25 MPa; or 14 MPa to 40 MPa; or 17 MPa to 40 MPa; or 20 MPa to 40 MPa; or 30 MPa to 40 MPa; or 35 MPa to 40 MPa. In some embodiments, the compressive strengths described herein are the compressive strengths after 1 day, or 3 days, or 7 days, or 28 days, or 56 days, or longer.

In some embodiments, the precipitation material produced by the processes described herein is employed as a building material (e.g., a construction material for some type of man-made structure such as buildings, roads, bridges, dams, and the like), such that the clean $CO_2$ is effectively sequestered in the built environment. Any man made structure, such as foundations, parking structures, houses, office buildings, commercial offices, governmental buildings, infrastructures (e.g., pavements; roads; bridges; overpasses; walls; footings for gates, fences and poles; and the like) is considered a part of the built environment. Mortars find use in binding construction blocks (e.g., bricks) together and filling gaps between construction blocks. Mortars can also be used to fix existing structure (e.g., to replace sections where the original mortar has become compromised or eroded), among other uses.

In some embodiments, an aggregate is produced from the resultant precipitation material. In such embodiments, where the drying process produces particles of the desired size, little if any additional processing is required to produce the aggregate. In yet other embodiments, further processing of the precipitation material is performed in order to produce the desired aggregate. For example, the dried form of the vaterite may be combined with fresh water in a manner sufficient to cause the vaterite to form a solid product, where the reactive vaterite converts to the aragonite. By controlling the water content of the wet material, the porosity, and eventual strength and density of the final aggregate may be controlled. Typically a wet cake may be 40-60 volume % water. For denser aggregates, the wet cake may be <50% water, for less dense cakes, the wet cake may be >50% water. After hardening, the resultant solid product may then be mechanically processed, e.g., crushed or otherwise broken up and sorted to produce aggregate of the desired characteristics, e.g., size, particular shape, etc.

In these processes the setting and mechanical processing steps may be performed in a substantially continuous fashion or at separate times. In certain embodiments, large volumes of the composition comprising vaterite, aragonite, calcite, or combinations thereof may be stored in the open environment where the composition is exposed to the atmosphere. For the setting step, the vaterite may be irrigated in a convenient fashion with fresh water, or allowed to be rained on naturally in order to produce the set product. The set product may then be mechanically processed as described above. Following production of the vaterite, the vaterite is processed to produce the desired aggregate. In some embodiment the vaterite may be left outdoors, where rainwater can be used as the freshwater source, to cause the meteoric water stabilization reaction to occur, hardening the precipitate to form aggregate.

In some embodiments, the composition provided herein comprises the precipitation material comprising vaterite, aragonite, calcite, or combinations thereof and Ordinary Portland Cement (OPC) or Portland cement clinker. The amount of Portland cement component may vary and range from 10 to 95% w/w; or 10 to 90% w/w; or 10 to 80% w/w; or 10 to 70% w/w; or 10 to 60% w/w; or 10 to 50% w/w; or 10 to 40% w/w; or 10 to 30% w/w; or 10 to 20% w/w; or 20 to 90% w/w; or 20 to 80% w/w; or 20 to 70% w/w; or 20 to 60% w/w; or 20 to 50% w/w; or 20 to 40% w/w; or 20 to 30% w/w; or 30 to 90% w/w; or 30 to 80% w/w; or 30 to 70% w/w; or 30 to 60% w/w; or 30 to 50% w/w; or 30 to 40% w/w; or 40 to 90% w/w; or 40 to 80% w/w; or 40 to 70% w/w; or 40 to 60% w/w; or 40 to 50% w/w; or 50 to 90% w/w; or 50 to 80% w/w; or 50 to 70% w/w; or 50 to 60% w/w; or 60 to 90% w/w; or 60 to 80% w/w; or 60 to 70% w/w; or 70 to 90% w/w; or 70 to 80% w/w. For example, the vaterite composition comprises a blend of 75% OPC and 25% vaterite; or 80% OPC and 20% vaterite; or 85% OPC and 15% vaterite; or 90% OPC and 10% vaterite; or 95% OPC and 5% vaterite.

In certain embodiments, the composition comprises the precipitation material comprising vaterite, aragonite, calcite, or combinations thereof and an aggregate. Aggregate may be included in the composition or the precipitation material to provide for mortars which include fine aggregate and concretes which also include coarse aggregate. The fine aggregates are materials that almost entirely pass through a Number 4 sieve (ASTM C 125 and ASTM C 33), such as silica sand. The coarse aggregate are materials that are predominantly retained on a Number 4 sieve (ASTM C 125 and ASTM C 33), such as silica, quartz, crushed round marble, glass spheres, granite, limestone, calcite, feldspar, alluvial sands, sands or any other durable aggregate, and mixtures thereof. As such, the term "aggregate" is used broadly to refer to a number of different types of both coarse and fine particulate material, including, but are not limited to, sand, gravel, crushed stone, slag, and recycled concrete. The amount and nature of the aggregate may vary widely. In some embodiments, the amount of aggregate may range from 25 to 80%, such as 40 to 70% and including 50 to 70% w/w of the total composition made up of both the composition and the aggregate.

During the mixing of the composition or the precipitation material comprising vaterite, aragonite, calcite, or combinations thereof with the aqueous medium (e.g. for transformation of the reactive vaterite to the aragonite), the precipitate may be subjected to high shear mixer. After mixing, the precipitate may be dewatered again and placed in preformed molds to make formed building materials or may be used to make formed building materials using the processes well known in the art or as described herein. Alternatively, the precipitate may be mixed with water and may be allowed to set. The precipitate may set over a period of days and may be then placed in the oven for drying, e.g., at 40° C., or from 40° C.-60° C., or from 40° C.-50° C., or from 40° C.-100° C., or from 50° C.-60° C., or from 50° C.-80° C., or from 50° C.-100° C., or from 60° C.-80° C., or from 60° C.-100° C. The precipitate may be subjected to curing at high temperature, such as, from 50° C.-60° C., or from 50° C.-80° C., or from 50° C.-100° C., or from 60° C.-80° C., or from 60° C.-100° C., or 60° C., or 80° C.-100° C., in high humidity, such as, in 30%, or 40%, or 50%, or 60% humidity.

In some embodiments, the composition comprises the precipitation material in wet or dried form, mixed with one or more admixtures to impart one or more properties to the product including, but not limited to, strength, flexural strength, compressive strength, porosity, thermal conductivity, etc. The amount of admixture that is employed may vary depending on the nature of the admixture. In some embodiments, the amount of the one or more admixtures range from 1 to 50% w/w, such as 1-30% w/w, or 1-25% w/w, or 1-20% w/w/, or 2 to 10% w/w. Examples of the admixtures include, but not limited to, set accelerators, set retarders, air-entraining agents, foaming agents, defoamers, alkali-reactivity reducers, bonding admixtures, dispersants, coloring admixtures, corrosion inhibitors, damp-proofing admixtures, gas formers, permeability reducers, pumping aids, shrinkage compensation admixtures, fungicidal admixtures, germicidal admixtures, insecticidal admixtures, rheology modifying agents, finely divided mineral admixtures, pozzolans, aggregates, wetting agents, strength enhancing agents, water repellents, reinforced material such as fibers, and any other admixture. When using an admixture, the composition or the precipitation material, to which the admixture raw materials are introduced, is mixed for sufficient time to cause the admixture raw materials to be dispersed relatively uniformly throughout the composition.

Set accelerators may be used to accelerate the setting and early strength development of cement. Examples of set accelerators that may be used include, but are not limited to, POZZOLITH®NC534, non-chloride type set accelerator and/or RHEOCRETE®CNI calcium nitrite-based corrosion inhibitor, both sold under the above trademarks by BASF Admixtures Inc. of Cleveland, Ohio. Set retarding, also known as delayed-setting or hydration control, admixtures are used to retard, delay, or slow the rate of setting of cement. Most set retarders may also act as low level water reducers and can also be used to entrain some air into product. An example of a retarder is DELVO® by BASF Admixtures Inc. of Cleveland, Ohio. The air entrainer includes any substance that will entrain air in the compositions. Some air entrainers can also reduce the surface tension of a composition at low concentration. Air-entraining admixtures are used to purposely entrain microscopic air bubbles into cement. Air entrainment may increase the workability of the mix while eliminating or reducing segregation and bleeding. Materials used to achieve these desired effects can be selected from wood resin, natural resin, synthetic resin, sulfonated lignin, petroleum acids, proteinaceous material, fatty acids, resinous acids, alkylbenzene sulfonates, sulfonated hydrocarbons, vinsol resin, anionic surfactants, cationic surfactants, nonionic surfactants, natural rosin, synthetic rosin, an inorganic air entrainer, synthetic detergents, and their corresponding salts, and mixtures thereof. Air entrainers are added in an amount to yield a desired level of air in a cementitious composition. Examples of air entrainers that can be utilized in the admixture system include, but are not limited to MB AE 90, MB VR and MICRO AIR®, all available from BASF Admixtures Inc. of Cleveland, Ohio.

In some embodiments, the precipitation material is mixed with foaming agent. The foaming agents incorporate large quantities of air voids/porosity and facilitate reduction of the material's density. Examples of foaming agents include, but not limited to, soap, detergent (alkyl ether sulfate), Millifoam™ (alkyl ether sulfate), Cedepal™ (ammonium alkyl ethoxy sulfate), Witcolate™ 12760, and the like.

Also of interest as admixtures are defoamers. Defoamers are used to decrease the air content in the cementitious composition. Also of interest as admixtures are dispersants. The dispersant includes, but is not limited to, polycarboxylate dispersants, with or without polyether units. The term dispersant is also meant to include those chemicals that also function as a plasticizer, water reducer such as a high range water reducer, fluidizer, antiflocculating agent, or superplasticizer for compositions, such as lignosulfonates, salts of sulfonated naphthalene sulfonate condensates, salts of sulfonated melamine sulfonate condensates, beta naphthalene sulfonates, sulfonated melamine formaldehyde condensates, naphthalene sulfonate formaldehyde condensate resins for example LOMAR D® dispersant (Cognis Inc., Cincinnati, Ohio), polyaspartates, or oligomeric dispersants. Polycarboxylate dispersants can be used, by which is meant a dispersant having a carbon backbone with pendant side chains, wherein at least a portion of the side chains are attached to the backbone through a carboxyl group or an ether group.

Natural and synthetic admixtures may be used to color the product for aesthetic and safety reasons. These coloring admixtures may be composed of pigments and include carbon black, iron oxide, phthalocyanine, umber, chromium oxide, titanium oxide, cobalt blue, and organic coloring agents. Also of interest as admixtures are corrosion inhibitors. Corrosion inhibitors may serve to protect embedded reinforcing steel from corrosion. The materials commonly used to inhibit corrosion are calcium nitrite, sodium nitrite, sodium benzoate, certain phosphates or fluorosilicates, fluoroaluminites, amines and related chemicals. Also of interest are damp-proofing admixtures. Damp-proofing admixtures reduce the permeability of the product that has low cement contents, high water-cement ratios, or a deficiency of fines in the aggregate. These admixtures retard moisture penetration into dry products and include certain soaps, stearates, and petroleum products. Also of interest are gas former admixtures. Gas formers, or gas-forming agents, are sometimes added to the mix to cause a slight expansion prior to hardening. The amount of expansion is dependent upon the amount of gas-forming material used and the temperature of the fresh mixture. Aluminum powder, resin soap and vegetable or animal glue, saponin or hydrolyzed protein can be used as gas formers. Also of interest are permeability reducers. Permeability reducers may be used to reduce the rate at which water under pressure is transmitted through the mix. Silica fume, fly ash, ground slag, natural pozzolans, water reducers, and latex may be employed to decrease the permeability of the mix.

Also of interest are rheology modifying agent admixtures. Rheology modifying agents may be used to increase the viscosity of the compositions. Suitable examples of rheology modifier include firmed silica, colloidal silica, hydroxyethyl cellulose, starch, hydroxypropyl cellulose, fly ash (as defined in ASTM C618), mineral oils (such as light naphthenic), clay such as hectorite clay, polyoxyalkylenes, polysaccharides, natural gums, or mixtures thereof. Some of the mineral extenders such as, but not limited to, sepiolite clay are rheology modifying agents.

Also of interest are shrinkage compensation admixtures. TETRAGUARD® is an example of a shrinkage reducing agent and is available from BASF Admixtures Inc. of Cleveland, Ohio. Bacterial and fungal growth on or in hardened product may be partially controlled through the use of fungicidal and germicidal admixtures. The materials for these purposes include, but are not limited to, polyhalogenated phenols, dialdrin emulsions, and copper compounds. Also of interest in some embodiments is workability improving admixtures. Entrained air, which acts like a lubricant, can be used as a workability improving agent. Other workability agents are water reducers and certain finely divided admixtures.

In some embodiments, the composition comprises the precipitation material comprising vaterite, aragonite, calcite, or combinations thereof and reinforced material such as fibers, e.g., where fiber-reinforced product is desirable. Fibers can be made of zirconia containing materials, aluminum, glass, steel, carbon, ceramic, grass, bamboo, wood, fiberglass, or synthetic materials, e.g., polypropylene, polycarbonate, polyvinyl chloride, polyvinyl alcohol, nylon, polyethylene, polyester, rayon, high-strength aramid, (i.e. Kevlar®), or mixtures thereof. The reinforced material is described in U.S. patent application Ser. No. 13/560,246, filed Jul. 27, 2012, which is incorporated herein in its entirety in the present disclosure.

The components of the composition can be combined using any suitable protocol. Each material may be mixed at the time of work, or part of or all of the materials may be mixed in advance. Alternatively, some of the materials are mixed with water with or without admixtures, such as high-range water-reducing admixtures, and then the remaining materials may be mixed therewith. As a mixing apparatus, any conventional apparatus can be used. For example, Hobart mixer, slant cylinder mixer, Omni Mixer, Henschel mixer, V-type mixer, and Nauta mixer can be employed.

The processes and systems provided herein may be carried out at land (e.g., at a location where the cement plant calcining the limestone is present, or is easily and economically transported in), at sea, or in the ocean. In some embodiments, the cement plants calcining the limestone may be retro-fitted with the systems described herein to form the precipitation material and further to form products from the precipitation material.

Aspects include systems, including processing plants or factories, for practicing the processes as described herein. Systems may have any configuration that enables practice of the particular production method of interest.

As indicated above, the system may be present on land or sea. For example, the system may be land-based system that is in a coastal region, e.g., close to a source of seawater, or even an interior location, where water is piped into the system from a salt-water source, e.g., ocean. Alternatively, the system is a water based system, i.e., a system that is present on or in water. Such a system may be present on a boat, ocean based platform etc., as desired.

In some embodiments, the systems may include a control station, configured to control the amount of the clean carbon dioxide and/or the amount of first aqueous solution conveyed to the precipitator or the charger; the amount of the precipitate conveyed to the separator; the amount of the precipitate conveyed to the drying station; and/or the amount of the precipitate conveyed to the refining station. A control station may include a set of valves or multi-valve systems which are manually, mechanically or digitally controlled, or may employ any other convenient flow regulator protocol. In some instances, the control station may include a computer interface, (where regulation is computer-assisted or is entirely controlled by computer) configured to provide a user with input and output parameters to control the amount, as described above.

II. Products

Provided herein, are processes and systems to form various cementitious and non-cementitious products from the precipitation material comprising stable vaterite, reactive vaterite, aragonite, calcite, or combinations thereof. In some embodiments, the reactive vaterite transforms to aragonite and forms cement. The products A and B include storage-stable forms, e.g., materials for the construction of structures such as buildings and infrastructure, as well as the structures themselves or formed building materials such as drywall, or non-cementitious materials such as paper, paint, plastic, etc. or artificial reefs.

In one aspect, there is provided zero carbon dioxide ($CO_2$) emission process, comprising:

a) calcining limestone in a cement plant in an electric kiln to form a mixture comprising calcium oxide and a first gaseous stream comprising clean carbon dioxide, wherein the clean carbon dioxide comprises no gaseous or non-gaseous components from combustion of fuel;

b) treating the mixture comprising calcium oxide with a N-containing salt solution under one or more dissolution conditions to produce a first aqueous solution comprising calcium salt;

c) contacting the first aqueous solution with the first gaseous stream comprising clean carbon dioxide under one or more precipitation conditions to produce a precipitation material comprising vaterite, aragonite, calcite, or combinations thereof; and d) adding water to the precipitation material, setting and hardening to form cement or cementitious product.

In one aspect, there is provided zero carbon dioxide ($CO_2$) emission process, comprising:

a) calcining limestone in a cement plant in an electric kiln to form a mixture comprising calcium oxide and a first gaseous stream comprising clean carbon dioxide, wherein the clean carbon dioxide comprises no gaseous or non-gaseous components from combustion of fuel;

b) treating the mixture comprising calcium oxide with a N-containing salt solution under one or more dissolution conditions to produce a first aqueous solution comprising calcium salt;

c) contacting the first aqueous solution with the first gaseous stream comprising clean carbon dioxide under one or more precipitation conditions to produce a precipitation material comprising reactive vaterite; and d) adding water to the precipitation material comprising reactive vaterite and transforming the reactive vaterite to aragonite wherein the aragonite sets and hardens to form cement or cementitious product.

In some embodiments of the aforementioned aspect, the precipitation material further comprises stable vaterite, aragonite, calcite, or combinations thereof. The cementitious product may be a building material or a formed building material as described herein below.

Building Material

The "building material" used herein includes cementitious material used in construction. In one aspect, there is provided a structure or a building material comprising the set and hardened form of the precipitation material e.g. the vaterite composition e.g. where the reactive vaterite has converted to aragonite or PCC that sets and hardens. The product containing the aragonite form of the transformed precipitate shows one or more unexpected properties, including but not limited to, high compressive strength, high porosity (low density or light weight), neutral pH (e.g. useful as artificial reef), microstructure network, etc.

In some embodiments, there is provided zero carbon dioxide ($CO_2$) emission process, comprising:

a) calcining limestone in a cement plant in an electric kiln to form a mixture comprising calcium oxide and a first gaseous stream comprising clean carbon dioxide, wherein the clean carbon dioxide comprises no gaseous or non-gaseous components from combustion of fuel;

b) treating the mixture comprising calcium oxide with a N-containing salt solution under one or more dissolution conditions to produce a first aqueous solution comprising calcium salt;

c) contacting the first aqueous solution with the first gaseous stream comprising clean carbon dioxide under one or more precipitation conditions to produce a precipitation material comprising vaterite, aragonite, calcite, or combinations thereof; and d) adding water to the precipitation material, setting and hardening to form building material.

In some embodiments, there is provided zero carbon dioxide ($CO_2$) emission process, comprising:

a) calcining limestone in a cement plant in an electric kiln to form a mixture comprising calcium oxide and a first gaseous stream comprising clean carbon dioxide, wherein the clean carbon dioxide comprises no gaseous or non-gaseous components from combustion of fuel;

b) treating the mixture comprising calcium oxide with a N-containing salt solution under one or more dissolution conditions to produce a first aqueous solution comprising calcium salt;

c) contacting the first aqueous solution with the first gaseous stream comprising clean carbon dioxide under one or more precipitation conditions to produce a precipitation material comprising reactive vaterite; and d) adding water to the precipitation material comprising reactive vaterite and transforming the reactive vaterite to aragonite wherein the aragonite sets and hardens to form building material.

Examples of such structures or the building materials include, but are not limited to, building, driveway, foundation, kitchen slab, furniture, pavement, road, bridges, motorway, overpass, parking structure, brick, block, wall, footing for a gate, fence, or pole, and combination thereof.

Formed Building Material

The "formed building material" used herein includes materials shaped (e.g., molded, cast, cut, or otherwise produced) into structures with defined physical shape. The formed building material may be a pre-cast building material, such as, a pre-cast cement or concrete product. The formed building materials and the methods of making and using the formed building materials are described in U.S. application Ser. No. 12/571,398, filed Sep. 30, 2009, which is incorporated herein by reference in its entirety.

In some embodiments, there is provided zero carbon dioxide ($CO_2$) emission process, comprising:

a) calcining limestone in a cement plant in an electric kiln to form a mixture comprising calcium oxide and a first gaseous stream comprising clean carbon dioxide, wherein the clean carbon dioxide comprises no gaseous or non-gaseous components from combustion of fuel;

b) treating the mixture comprising calcium oxide with a N-containing salt solution under one or more dissolution conditions to produce a first aqueous solution comprising calcium salt;

c) contacting the first aqueous solution with the first gaseous stream comprising clean carbon dioxide under one or more precipitation conditions to produce a precipitation material comprising vaterite, aragonite, calcite, or combinations thereof; and d) adding water to the precipitation material, setting and hardening to form one or more of formed building material.

In some embodiments, there is provided zero carbon dioxide ($CO_2$) emission process, comprising:

a) calcining limestone in a cement plant in an electric kiln to form a mixture comprising calcium oxide and a first gaseous stream comprising clean carbon dioxide, wherein the clean carbon dioxide comprises no gaseous or non-gaseous components from combustion of fuel;

b) treating the mixture comprising calcium oxide with a N-containing salt solution under one or more dissolution conditions to produce a first aqueous solution comprising calcium salt;

c) contacting the first aqueous solution with the first gaseous stream comprising clean carbon dioxide under one or more precipitation conditions to produce a precipitation material comprising reactive vaterite; and d) adding water to the precipitation material comprising reactive vaterite and transforming the reactive vaterite to aragonite wherein the aragonite sets and hardens to form one or more of formed building material.

Various examples of the formed building material have been described herein below.

The formed building materials may vary greatly and include materials shaped (e.g., molded, cast, cut, or otherwise produced) into structures with defined physical shape, i.e., configuration. Formed building materials are distinct from amorphous building materials (e.g., powder, paste, slurry, etc.) that do not have a defined and stable shape, but instead conform to the container in which they are held, e.g., a bag or other container. Formed building materials are also distinct from irregularly or imprecisely formed materials (e.g., aggregate, bulk forms for disposal, etc.) in that formed building materials are produced according to specifications that allow for use of formed building materials in, for example, buildings. Formed building materials may be prepared in accordance with traditional manufacturing protocols for such structures, provided the precipitation material provided herein is employed in making such materials.

In some embodiments, the processes provided herein further include setting and hardening the precipitation material comprising reactive vaterite where the reactive vaterite has converted to aragonite, or the PCC that has set and hardened and forming a formed building material.

In some embodiments, the formed building materials made from the precipitation material have a compressive strength or the flexural strength of at least 3 MPa, at least 10 MPa, or at least 14 MPa, or between 3-30 MPa, or between about 14-100 MPa, or between about 14-45 MPa; or the compressive strength of the precipitation material after setting, and hardening, as described herein.

Examples of the formed building materials that can be produced by the foregoing processes, include, but not limited to, masonry units, for example only, bricks, blocks, and tiles including, but not limited to, ceiling tiles; construction panels, for example only, cement board (boards traditionally made from cement such as fiber cement board) and/or drywall (boards traditionally made from gypsum); conduits; basins; beam; column, slab; acoustic barrier; insulation material; or combinations thereof. Construction panels are formed building materials employed in a broad sense to refer to any non-load-bearing structural element that are characterized such that their length and width are substantially greater than their thickness. As such the panel may be a plank, a board, shingles, and/or tiles. Exemplary construction panels formed from the precipitation material comprising the vaterite include cement boards and/or drywall. Construction panels are polygonal structures with dimensions that vary greatly depending on their intended use. The dimensions of construction panels may range from 50 to 500 cm in length, including 100 to 300 cm, such as 250 cm; width ranging from 25 to 200 cm, including 75 to 150 cm, such as 100 cm; thickness ranging from 5 to 25 mm, including 7 to 20 mm, including 10 to 15 mm.

In some embodiments, the cement board and/or the drywall may be used in making different types of boards such as, but not limited to, paper-faced board (e.g. surface reinforcement with cellulose fiber), fiberglass-faced or glass mat-faced board (e.g. surface reinforcement with glass fiber mat), fiberglass mesh reinforced board (e.g. surface reinforcement with glass mesh), and/or fiber-reinforced board (e.g. cement reinforcement with cellulose, glass, fiber etc.). These boards may be used in various applications including, but not limited to, sidings such as, fiber-cement sidings, roofing, soffit, sheathing, cladding, decking, ceiling, shaft liner, wall board, backer, trim, frieze, shingle, and fascia, and/or underlayment.

The cement boards traditionally are made from cement such as Ordinary Portland cement (OPC), magnesium oxide cement and/or calcium silicate cement. The cement boards made by the methods provided herein are made from the precipitation material that partially or wholly replaces the traditional cement in the board. In some embodiments, the cement boards may comprise construction panels prepared as a combination of aragonitic cement (setting and hardening when reactive vaterite transforms to aragonite) and fiber and/or fiberglass and may possess additional fiber and/or fiberglass reinforcement at both faces of the board.

The cement boards are formed building materials which in some embodiments, are used as backer boards for ceramics that may be employed behind bathroom tiles, kitchen counters, backsplashes, etc. and may have lengths ranging from 100 to 200 cm. Cement boards may vary in physical and mechanical properties. In some embodiments, the flexural strength may vary, ranging between 1 to 7.5 MPa, including 2 to 6 MPa, such as 5 MPa. The compressive strengths may also vary, ranging from 5 to 50 MPa, including 10 to 30 MPa, such as 15 to 20 MPa. In some embodiments, cement boards may be employed in environments having extensive exposure to moisture (e.g., commercial saunas). The composition or the precipitation material described herein may be used to produce the desired shape and size to form a cement board. In addition, a variety of further components may be added to the cement boards which include, but are not limited to, plasticizers, clay, foaming agents, accelerators, retarders and air entrainment additives. The composition is then poured out into sheet molds or a roller may be used to form sheets of a desired thickness. The shaped composition may be further compacted by roller compaction, hydraulic pressure, vibrational compaction, or resonant shock compaction. The sheets are then cut to the desired dimensions of the cement boards.

Another type of construction panel formed from the composition or the precipitation material described herein is backer board. The backer board may be used for the construction of interior, and/or exterior floors, walls and ceilings. In the embodiments, the backer board is made partially or wholly from the precipitation material.

Another type of construction panel formed from the compositions or the precipitation material is drywall. The "drywall" as used herein, includes board that is used for construction of interior, and/or exterior floors, walls and ceilings. Traditionally, drywall is made from gypsum (called paper-faced board). In the embodiments, the drywall is made partially or wholly from the carbonate precipitation material thereby replacing gypsum from the drywall product. In some embodiments, the drywall may comprise construction panels prepared as a combination of aragonitic cement (setting and hardening when reactive vaterite transforms to aragonite) and cellulose, fiber and/or fiberglass and may possess additional paper, fiber, fiberglass mesh and/or fiberglass mat reinforcement at both faces of the board. Various processes for making the drywall product are well known in the art and are well within the scope of the invention. Some examples include, but not limited to, wet process, semi dry process, extrusion process, Wonderborad® process, etc., that have been described herein.

In some embodiments, the drywall is panel made of a paper liner wrapped around an inner core. For example, in some embodiments, during the process of making the drywall product from the precipitation material, the slurry of the precipitation material comprising reactive vaterite is poured over a sheet of paper. Another sheet of paper is then put on top of the precipitation material such that the precipitation material is flanked by the paper on both sides (the resultant composition sandwiched between two sheets of outer material, e.g., heavy paper or fiberglass mats). The reactive vaterite in the precipitation material is then transformed to aragonite (using additives and/or heat) which then sets and hardens. When the core sets and is dried in a large drying chamber, the sandwich becomes rigid and strong enough for use as a building material. The drywall sheets are then cut and separated.

The flexural and compressive strengths of the drywall formed from the precipitation material are equal to or higher than conventional drywall prepared with gypsum plaster, which is known to be a soft construction material. In some embodiments, the flexural strength may range between 0.1 to 3 MPa, including 0.5 to 2 MPa, such as 1.5 MPa. The compressive strengths may also vary, in some instances ranging from 1 to 20 MPa, including 5 to 15 MPa, such as 8 to 10 MPa. In some embodiments, the formed building materials such as, the construction panels such as, but not limited to, cement boards and drywall produced by the methods described herein, have low density and high porosity making them suitable for lightweight and insulation applications.

The high porosity and light weight of the formed building materials, for example only, construction panels may be due to the development of the aragonitic microstructure when the reactive vaterite transforms to the aragonite. The transformation of the reactive vaterite during dissolution/re-precipitation process may lead to micro porosity generation while at the same time the voids created between the aragonitic crystals formed may provide nano porosity thereby leading to highly porous and light weight structure. Certain admixtures may be added during the transformation process such as, but not limited to, foaming agents, rheology modifiers and mineral extenders, such as, but not limited to, clay, starch, etc. which may add to the porosity in the product as the foaming agent may entrain air in the mixture and lower the overall density and mineral extender such as sepiolite clay may increase the viscosity of the mixture thereby preventing segregation of the precipitation material and water.

One of the applications of the cement board or drywall is fiber cement siding. Fiber-cement sidings formed by the processes provided herein comprise construction panels prepared as a combination of aragonitic cement, aggregate, interwoven cellulose, and/or polymeric fibers and may possess a texture and flexibility that resembles wood.

In some embodiments, the formed building materials are masonry units. Masonry units are formed building materials used in the construction of load-bearing and non-load-bearing structures that are generally assembled using mortar, grout, and the like. Exemplary masonry units formed from the compositions include bricks, blocks, and tiles.

Another formed building material formed from the precipitation material described herein is a conduit. Conduits are tubes or analogous structures configured to convey a gas or liquid, from one location to another. Conduits can include any of a number of different structures used in the conveyance of a liquid or gas that include, but are not limited to, pipes, culverts, box culverts, drainage channels and portals, inlet structures, intake towers, gate wells, outlet structures, and the like.

Another formed building material formed from the precipitation material described herein is basins. The term basin may include any configured container used to hold a liquid, such as water. As such, a basin may include, but is not limited to structures such as wells, collection boxes, sanitary manholes, septic tanks, catch basins, grease traps/separators, storm drain collection reservoirs, etc.

Another formed building material formed from the precipitation material described herein is a beam, which, in a broad sense, refers to a horizontal load-bearing structure possessing large flexural and compressive strengths. Beams may be rectangular cross-shaped, C-channel, L-section edge beams, I-beams, spandrel beams, H-beams, possess an inverted T-design, etc. Beams may also be horizontal load-bearing units, which include, but are not limited to joists, lintels, archways and cantilevers.

Another formed building material formed from the precipitation material described herein is a column, which, in a broad sense, refers to a vertical load-bearing structure that carries loads chiefly through axial compression and includes structural elements such as compression members. Other vertical compression members may include, but are not limited to pillars, piers, pedestals, or posts.

Another formed building material formed from the precipitation material described herein is a concrete slab. Concrete slabs are those building materials used in the construction of prefabricated foundations, floors and wall panels. In some instances, a concrete slab may be employed as a floor unit (e.g., hollow plank unit or double tee design).

Another formed building material formed from the precipitation material described herein is an acoustic barrier, which refers to a structure used as a barrier for the attenuation or absorption of sound. As such, an acoustic barrier may include, but is not limited to, structures such as acoustical panels, reflective barriers, absorptive barriers, reactive barriers, etc.

Another formed building material formed from the precipitation material described herein is an insulation material, which refers to a material used to attenuate or inhibit the conduction of heat. Insulation may also include those materials that reduce or inhibit radiant transmission of heat.

In some embodiments, the other formed building materials such as pre-cast concrete products include, but not limited to, bunker silo; cattle feed bunk; cattle grid; agricultural fencing; H-bunks; J-bunks; livestock slats; livestock watering troughs; architectural panel walls; cladding (brick); building trim; foundation; floors, including slab on grade; walls; double wall precast sandwich panel; aqueducts; mechanically stabilized earth panels; box culverts; 3-sided culverts; bridge systems; RR crossings; RR ties; sound walls/barriers; Jersey barriers; tunnel segments; reinforced concrete box; utility protection structure; hand holes; hollow core product; light pole base; meter box; panel vault; pull box; telecom structure; transformer pad; transformer vault; trench; utility vault; utility pole; controlled environment vaults; underground vault; mausoleum; grave stone; coffin; haz mat storage container; detention vaults; catch basins; manholes; aeration system; distribution box; dosing tank; dry well; grease interceptor; leaching pit; sand-oil/oil-water interceptor; septic tank; water/sewage storage tank; wet wells; fire cisterns; floating dock; underwater infrastructure; decking; railing; sea walls; roofing tiles; pavers; community retaining wall; res. retaining wall; modular block systems; and segmental retaining walls.

Non-Cementitious Compositions

In some embodiments, the processes described herein include making other products from the precipitation material described herein including, but not limited to, non-cementitious compositions including paper, polymer product, lubricant, adhesive, rubber product, chalk, asphalt product, paint, abrasive for paint removal, personal care product, cosmetic, cleaning product, personal hygiene product, ingestible product, agricultural product, soil amendment product, pesticide, environmental remediation product, and combination thereof. Such compositions have been described in U.S. Pat. No. 7,829,053, issued Nov. 9, 2010, which is incorporated herein by reference in its entirety.

In some embodiments, there is provided zero carbon dioxide ($CO_2$) emission process, comprising:

a) calcining limestone in a cement plant in an electric kiln to form a mixture comprising calcium oxide and a first gaseous stream comprising clean carbon dioxide, wherein the clean carbon dioxide comprises no gaseous or non-gaseous components from combustion of fuel;

b) treating the mixture comprising calcium oxide with a N-containing salt solution under one or more dissolution conditions to produce a first aqueous solution comprising calcium salt;

c) contacting the first aqueous solution with the first gaseous stream comprising clean carbon dioxide under one or more precipitation conditions to produce a precipitation material comprising vaterite, aragonite, calcite, or combinations thereof; and d) adding water to the precipitation material, setting and hardening to form one or more of non-cementitious compositions.

In some embodiments, there is provided zero carbon dioxide ($CO_2$) emission process, comprising:

a) calcining limestone in a cement plant in an electric kiln to form a mixture comprising calcium oxide and a first gaseous stream comprising clean carbon dioxide, wherein the clean carbon dioxide comprises no gaseous or non-gaseous components from combustion of fuel;

b) treating the mixture comprising calcium oxide with a N-containing salt solution under one or more dissolution conditions to produce a first aqueous solution comprising calcium salt;

c) contacting the first aqueous solution with the first gaseous stream comprising clean carbon dioxide under one or more precipitation conditions to produce a precipitation material comprising reactive vaterite; and d) adding water to the precipitation material comprising reactive vaterite and transforming the reactive vaterite to aragonite wherein the aragonite sets and hardens to form one or more of non-cementitious compositions.

In some embodiments, the non-cementitious compositions are produced from the precipitation material comprising stable vaterite where the stable vaterite acts as a filler.

Accordingly, there are provided zero carbon dioxide ($CO_2$) emission process, comprising:

a) calcining limestone in a cement plant in an electric kiln to form a mixture comprising calcium oxide and a first gaseous stream comprising clean carbon dioxide, wherein the clean carbon dioxide comprises no gaseous or non-gaseous components from combustion of fuel;

b) treating the mixture comprising calcium oxide with a N-containing salt solution under one or more dissolution conditions to produce a first aqueous solution comprising calcium salt;

c) contacting the first aqueous solution with the first gaseous stream comprising clean carbon dioxide under one or more precipitation conditions to produce a precipitation material comprising stable vaterite; and d) using the precipitation material comprising stable vaterite as a filler to form one or more of non-cementitious compositions.

Artificial Marine Structures

In some embodiments, the methods described herein include making artificial marine structures from the precipitation material described herein including, but not limited to, artificial corals and reefs. In some embodiments, the artificial structures can be used in the aquariums or sea. In some embodiments, these products are made from the precipitated material comprising reactive vaterite that transforms to aragonite after setting and hardening. The aragonitic cement provides neutral or close to neutral pH which may be conducive for maintenance and growth of marine life. The aragonitic reefs may provide suitable habitat for marine species.

In some embodiments, there is provided zero carbon dioxide ($CO_2$) emission process, comprising:

a) calcining limestone in a cement plant in an electric kiln to form a mixture comprising calcium oxide and a first gaseous stream comprising clean carbon dioxide, wherein the clean carbon dioxide comprises no gaseous or non-gaseous components from combustion of fuel;

b) treating the mixture comprising calcium oxide with a N-containing salt solution under one or more dissolution conditions to produce a first aqueous solution comprising calcium salt;

c) contacting the first aqueous solution with the first gaseous stream comprising clean carbon dioxide under one or more precipitation conditions to produce a precipitation material comprising vaterite, aragonite, calcite, or combinations thereof; and d) adding water to the precipitation material, setting and hardening to form one or more of artificial marine structures.

In some embodiments, there is provided zero carbon dioxide ($CO_2$) emission process, comprising:

a) calcining limestone in a cement plant in an electric kiln to form a mixture comprising calcium oxide and a first gaseous stream comprising clean carbon dioxide, wherein the clean carbon dioxide comprises no gaseous or non-gaseous components from combustion of fuel;

b) treating the mixture comprising calcium oxide with a N-containing salt solution under one or more dissolution conditions to produce a first aqueous solution comprising calcium salt;

c) contacting the first aqueous solution with the first gaseous stream comprising clean carbon dioxide under one or more precipitation conditions to produce a precipitation material comprising reactive vaterite; and d) adding water to the precipitation material comprising reactive vaterite and transforming the reactive vaterite to aragonite wherein the aragonite sets and hardens to form one or more of artificial marine structures.

The following examples are put forth so as to provide those of ordinary skill in the art with a complete disclosure and description of how to make and use the invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

In the examples and elsewhere, abbreviations have the following meanings:

| | |
|---|---|
| M = | Molar |
| MPa = | Megapascal |
| psi = | Per square inch |
| rpm = | Revolutions per minute |
| slpm = | Standard liter per minute |
| um = | Micron |

EXAMPLES

Example 1

Formation and Transformation of the Precipitation Material from Calcined Limestone $NH_4Cl$ is dissolved into water. Limestone is calcined in an electric kiln at 950° C., cooled to room temperature and added to the aqueous solution of $NH_4Cl$ and mixed for a few hours. The resultant mixture is decanted to remove any impurities. The filtered solution is transferred to an airtight vessel. The solution is fed through a heat-exchanger which preheats the solution to 40° C. The carbonation reactor is an acrylic cylinder, equipped with baffles, gas diffuser, pH electrode, thermocouple, turbine impeller, and inlet and outlet ports for liquid, gases, and slurry. Mass flow controllers proportion a clean $CO_2$ (no pollutants from fossil fuel) inlet gas. During startup, the solution in the vessel is pumped into the reactor through the heat exchanger. The mixer is stirred while the clean $CO_2$ gas is introduced through the gas diffuser. The continuous inlet flow of the fresh reactant solution is controlled by maintaining the reactor pH at 8. The resultant reactive vaterite slurry is continuously collected into a holding container. The slurry is vacuum filtered. The reactive vaterite filter cake is oven dried at 100° C. The cake shows 100% vaterite with a mean particle size of 9 um. The clear filtrate containing regenerated $NH_4Cl$ is recycled in subsequent experiments.

The dried reactive vaterite solid is mixed into a paste. The X-ray diffraction (XRD) of the paste after 1 day shows 99.9% aragonite (the reactive vaterite fully converted to the aragonite). The pastes are cast into 2"×2"×2" cubes, which set and harden in a humidity chamber set to 60° C. and 80% of relative humidity for 7 days. The cemented cubes are dried in a 100° C. oven. Destructive testing determines the compressive strength of the cubes to be 4600 psi (~31 MPa).

Example 2

Effect of the Concentration of the Clean $CO_2$ on the Precipitation Material

Two reactor studies were conducted to analyze the impact of increasing the gas feed concentration of $CO_2$ from 12% to 20% on the final particle size of the precipitation material. The base conditions for each run included a feed solution composed of 1.86 M $NH_4Cl$ and 0.7 M CaO. The reactor pH was between 8 and 8.1. The reactor temperature was maintained at about 40° C. The impeller rotation speed was 1500 rpm. The total gas flow was 5 slpm and in Test A the $CO_2$ level was 12% by volume and in Test B the $CO_2$ level was 20% by volume. The remainder was made up of nitrogen.

Figure 5:
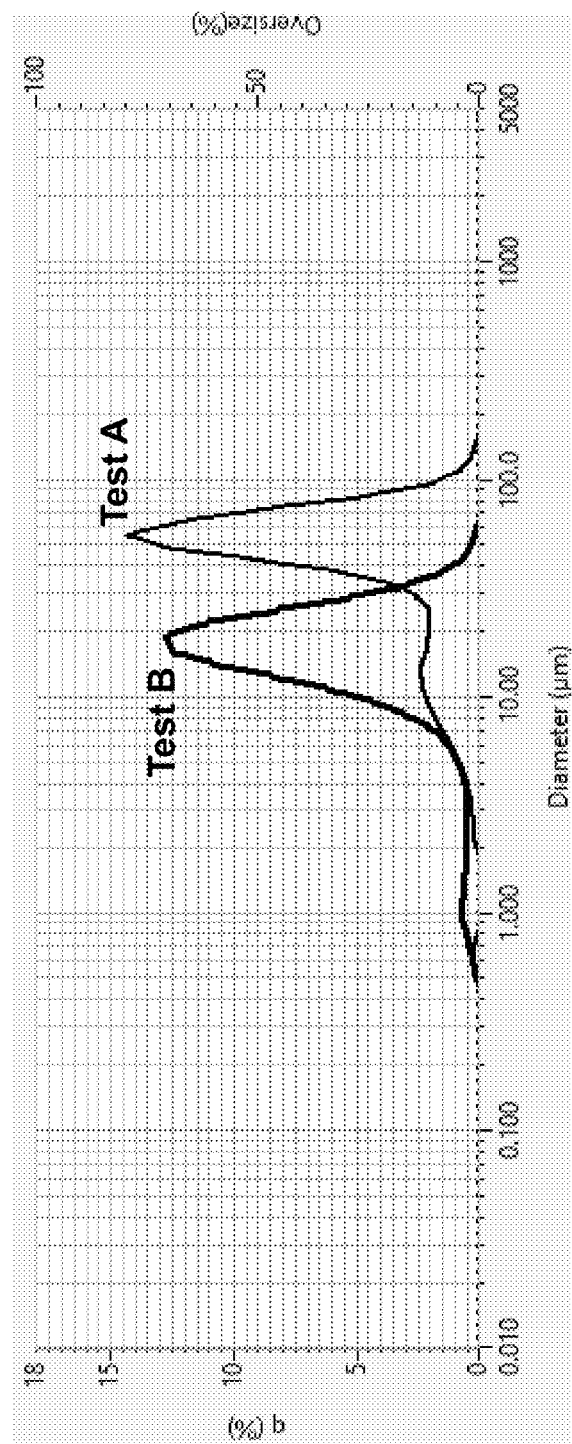
FIG. 5 illustrates data showing effect of the clean $CO_2$ on the particle size and distribution in the precipitate, as described in Example 2 herein.

As illustrated in FIG. 5, results showed that the Test A conditions at 12% $CO_2$ by volume produced vaterite particles ranging in size from 19 to over 40 um, often in a bimodal distribution (two peaks curve). Test B conditions at 20% $CO_2$ by volume produced about 16 um vaterite particles with a consistent unimodal distribution (single peak curve). There was a clear decrease in average particle size from increasing the $CO_2$ concentration from 12% to 20% by volume. There was also a clear change in size distribution from increasing the $CO_2$ concentration from 12% to 20% by volume.

Example 3

Effect of the Concentration of the Clean $CO_2$ and the Precipitation Conditions on the Precipitation Material A test was conducted using 100% $CO_2$ by volume as the gas feed. The base conditions for the run included a feed solution composed of 6 M $NH_4Cl$ and 2.3 M CaO. The reactor pH was between 8 and 8.1. The reactor temperature was maintained at about 40° C. The impeller rotation speed was 1500 rpm. The total gas flow was 5 slpm. The results showed that about 4.9 um particles of calcite were generated under these reaction conditions using 100% $CO_2$.

Although the foregoing invention has been described in some detail by way of illustration and example for purposes of clarity of understanding, it should be readily apparent to those of ordinary skill in the art in light of the teachings of this invention that certain changes and modifications may be made thereto without departing from the spirit or scope of the appended claims. Accordingly, the preceding merely illustrates the principles of the invention. It will be appreciated that those skilled in the art will be able to devise various arrangements, which, although not explicitly described or shown herein, embody the principles of the invention, and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein. It is intended that the following claims define the scope of the invention and that methods and structures within the scope of these claims and their equivalents be covered thereby.

What is claimed is:

1. A zero carbon dioxide ($CO_2$) emission process, comprising:
   a) calcining limestone in a cement plant in an electric kiln to form a mixture comprising calcium oxide and a first gaseous stream comprising clean carbon dioxide, wherein the clean carbon dioxide comprises no gaseous or non-gaseous components from combustion of fossil fuel;
   b) treating the mixture comprising calcium oxide with a N-containing salt solution under one or more dissolution conditions to produce a first aqueous solution comprising calcium salt and a second gaseous stream comprising ammonia;
   c) recovering the first gaseous stream comprising clean carbon dioxide and the second gaseous stream comprising ammonia and subjecting the first and the second gaseous streams to a cooling process under one or more cooling conditions to condense a second aqueous solution comprising ammonium bicarbonate, ammonium carbonate, ammonia, or combinations thereof; and
   d) contacting the first aqueous solution comprising calcium salt with the second aqueous solution comprising ammonium bicarbonate, ammonium carbonate, ammonia, or combinations thereof under one or more precipitation conditions to form a precipitation material comprising vaterite, aragonite, calcite, or combinations thereof.

2. The process of claim 1, wherein the first gaseous stream comprises less than 20% of at least one component selected from the group consisting of SOx; NOx; carbon monoxide; metal; volatile organic matter; particulate matter; and combinations thereof, thereby comprising clean carbon dioxide.

3. The process of claim 1, wherein the first gaseous stream comprises between about 20-95 vol % carbon dioxide.

4. The process of claim 1, wherein the first gaseous stream comprising clean carbon dioxide does not need scrubbing or needs a smaller scrubbing vent compared to a process using regular kiln.

5. The process of claim 1, wherein the mixture comprising calcium oxide and/or the first aqueous solution comprising calcium salt further comprises between 1-40 wt % of solids selected from the group consisting of silicate, iron oxide, aluminum oxide, other particulate matter; and combinations thereof.

6. The process of claim 5, further comprising:
   (i) separating the solids from the first aqueous solution after the treatment step; or
   (ii) wherein the solids are not separated from the first aqueous solution and the first aqueous solution is subjected to the contacting step to produce the precipitation material further comprising the solids.

7. The process of claim 1, wherein the mixture comprises more than 40 wt % calcium oxide, wherein the calcium oxide is an underburnt lime, low reactive lime, high reactive lime, or combinations thereof.

8. The process of claim 1, wherein the N-containing salt is N-containing inorganic salt, N-containing organic salt, or combination thereof.

9. The process of claim 8, wherein the N-containing inorganic salt is selected from the group consisting of ammonium halide, ammonium acetate, ammonium sulfate, ammonium sulfite, ammonium nitrate, ammonium nitrite, and combinations thereof.

10. The process of claim 8, wherein the N-containing salt is N-containing organic salt that has N-containing organic compound selected from the group consisting of aliphatic amine, alicyclic amine, heterocyclic amine, and combinations thereof.

11. The process of claim 1, wherein the one or more dissolution conditions are selected from the group consisting of temperature between about 20-200° C.; pressure between about 0.5-50 atm; N-containing salt wt % in water between about 0.5-50%; or combinations thereof.

12. The process of claim 1, wherein the first and/or the second gaseous streams further comprise water vapor.

13. The process of claim 1, wherein no external water is added to the cooling process.

14. The process of claim 1, wherein the one or more cooling conditions comprise temperature between about 0-100° C.; pressure between about 0.5-50 atm; or combination thereof.

15. The process of claim 1, wherein the one or more precipitation conditions are selected from the group consisting of pH of the first aqueous solution of between 7-8.5, temperature of the solution between 20-80° C., residence time of between 2-60 minutes, or combinations thereof.

16. The process of claim 1, wherein the vaterite is reactive vaterite and the process further comprises adding water to the precipitation material comprising reactive vaterite and transforming the reactive vaterite to aragonite wherein the aragonite sets and hardens to form cement or cementitious product.

17. The process of claim 16, wherein the cementitious product is a building material, formed building material, and/or artificial marine structure.

18. A zero carbon dioxide ($CO_2$) emission system, comprising:
   (i) a calcining system in a cement plant configured for calcining limestone in an electric kiln to form a mixture comprising calcium oxide and a first gaseous stream comprising clean carbon dioxide, wherein the clean carbon dioxide comprises no gaseous or non-gaseous components from combustion of fossil fuel;

(ii) a treatment reactor operably connected to the calcining system configured for receiving the mixture comprising calcium oxide and configured for dissolving the mixture comprising calcium oxide in a N-containing salt solution under one or more dissolution conditions to produce a first aqueous solution comprising calcium salt, and a second gaseous stream comprising ammonia;

(iii) a cooling reactor operably connected to the calcining system and the treatment reactor and configured for receiving the first gaseous stream comprising clean carbon dioxide and the second gaseous stream comprising ammonia, and configured for subjecting the first and the second gaseous streams to a cooling process under one or more cooling conditions to condense a second aqueous solution comprising ammonium bicarbonate, ammonium carbonate, ammonia, or combinations thereof; and (iv) a contacting reactor operably connected to the treatment reactor and the cooling reactor and configured for receiving the first aqueous solution comprising calcium salt and the second aqueous solution comprising ammonium bicarbonate, ammonium carbonate, ammonia, or combinations thereof, and configured for treating the first aqueous solution with the second aqueous solution under one or more precipitation conditions to form a precipitation material comprising vaterite, aragonite, calcite, or combinations thereof.

* * * * *